US010121200B1

(12) United States Patent
Rapaport

(10) Patent No.: US 10,121,200 B1
(45) Date of Patent: Nov. 6, 2018

(54) AUTOMATED SYSTEMS FOR CALIBRATING AND MANAGING A SECURITY-BASED DEFERRED COMPENSATION INCENTIVE PLAN

(71) Applicant: Rapaport Financial GmbH, Uitikon (CH)

(72) Inventor: Avihay Rapaport, Uitikon (CH)

(73) Assignee: Avihay Rapaport, Zurich (CH)

( * ) Notice: Subject to any disclaimer, the term of this patent is extended or adjusted under 35 U.S.C. 154(b) by 402 days.

(21) Appl. No.: 14/943,148

(22) Filed: Nov. 17, 2015

Related U.S. Application Data

(63) Continuation-in-part of application No. 14/812,474, filed on Jul. 29, 2015.

(60) Provisional application No. 62/035,435, filed on Aug. 10, 2014.

(51) Int. Cl.
*G06Q 40/06* (2012.01)
*G06Q 10/10* (2012.01)
*G06Q 40/04* (2012.01)

(52) U.S. Cl.
CPC ......... *G06Q 40/06* (2013.01); *G06Q 10/1057* (2013.01); *G06Q 40/04* (2013.01)

(58) Field of Classification Search
CPC ......... G06Q 40/06; G06Q 40/00; G06Q 40/04
See application file for complete search history.

(56) References Cited

U.S. PATENT DOCUMENTS

| 5,999,917 | A | * | 12/1999 | Facciani | ............... G06Q 40/00 |
| | | | | | 705/35 |
| 6,766,303 | B2 | | 7/2004 | Marshall | |
| 7,689,491 | B2 | | 3/2010 | Coates | |
| 7,881,998 | B2 | | 2/2011 | Finn et al. | |
| 8,121,925 | B1 | * | 2/2012 | Ives, Jr. | ............... G06Q 40/06 |
| | | | | | 705/35 |
| 8,290,849 | B2 | | 10/2012 | Eisler et al. | |
| 8,515,849 | B2 | | 8/2013 | Sagi et al. | |
| 8,706,599 | B1 | | 4/2014 | Koenig et al. | |

(Continued)

FOREIGN PATENT DOCUMENTS

WO WO-2004104726 A2 * 12/2004 ............. G06Q 40/00

OTHER PUBLICATIONS

Blank et al.: Hedging Nonqualified Deferred Compensation Plan, Apr. 2012, BNY Mellon, pp. 1-22. (Year: 2012).*

(Continued)

*Primary Examiner* — Bijendra K Shrestha

(57) ABSTRACT

Three fully automated systems and methods for a security-based deferred compensation incentive plan, wherein the plan includes as a first element a long investment position in a security issued by the awarding company (sponsor security), such as its own equity shares, as a second element a short investment position in a plurality of securities that are distinct from the sponsor security, and which are economically related and statistically correlated to the sponsor security (peer securities), wherein the quantities of peer securities in which a short investment position is established are determined via a disclosed computer implemented statistical procedure, and as a third element a long investment position in at least one investment asset that is freely chosen by the deferred compensation plan participant out of a menu made available via a computerized user interface.

35 Claims, 34 Drawing Sheets

(56) References Cited

U.S. PATENT DOCUMENTS

2008/0215500 A1\* 9/2008 De La Motte ......... G06Q 40/00
                                                    705/36 R
2017/0323388 A1\* 11/2017 Eisler .................... G06Q 40/10

OTHER PUBLICATIONS

State of Florida: Deferred Compensation Plan: Investment Policy for Product Selection and Retention, Jan. 2013, pp. 1-10 (Year: 2013).\*
Meulbroek, Lisa:Company Stock in Pension Plans: How Costly Is It?, 2002, Harvard Business School, pp. 1-51. (Year: 2002).\*
Rosen, Corey, "Equity Alternatives: Restricted Stock Performance Adwards, Phantom Stock, SARs, and More, $13^{th}$ Edition," ed S. Rodrick, The National Center for Employee Ownershhip, Oakland, California, Mar. 2015, Introduction (pp. 1-3), Chapter 1 (pp. 5-43).
Meulbroek, L. (2005), Company Stock in Pension Plans: How Costly Is It? *Journal of Law and Economics*, 48(2), 443-474.

\* cited by examiner

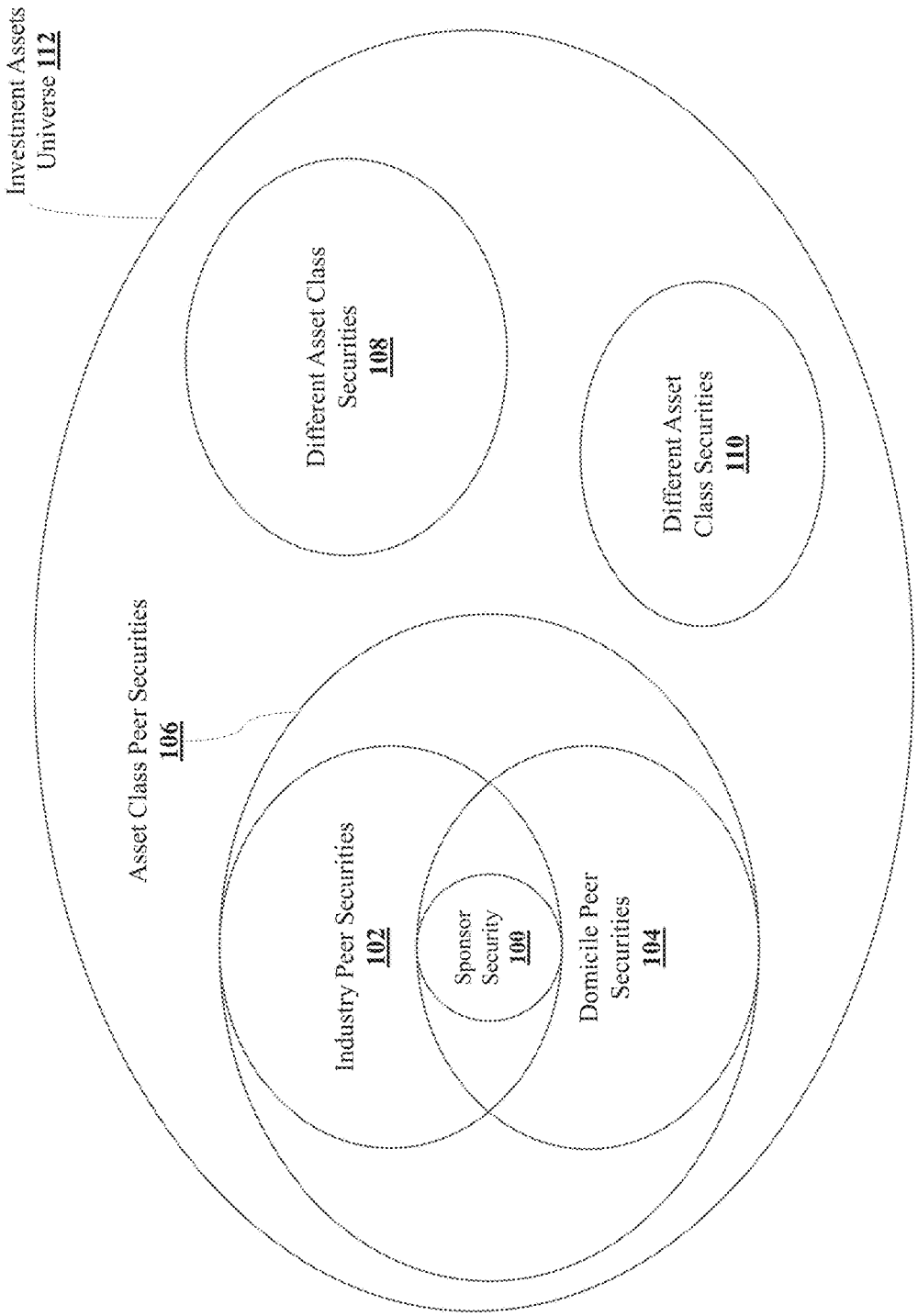

Figure 1b: Sponsor Securities, Peer Securities, Investment Assets

| | Sponsor Securities 101 | Peer Securities 103 | Investment Assets 105 |
|---|---|---|---|
| Investment Position | Long | Short | Long |

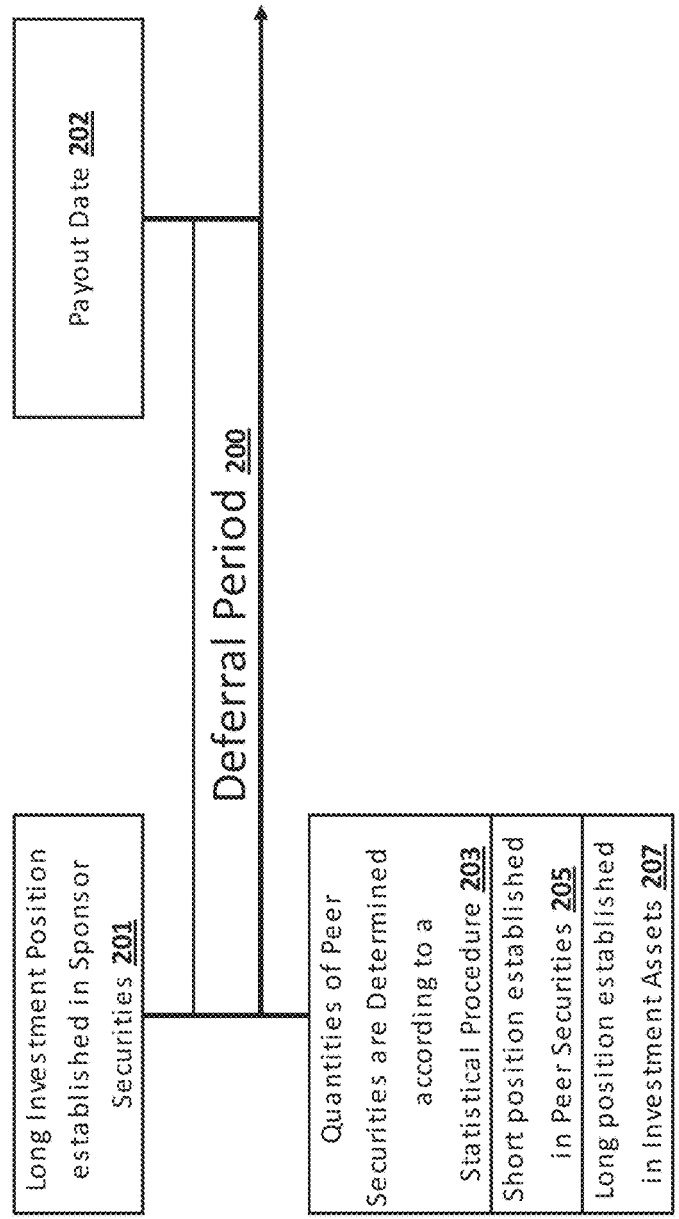
Figure 2a: Compensation Time Schedule
A Securities-Based Deferred Compensation Incentive Plan under the Invention

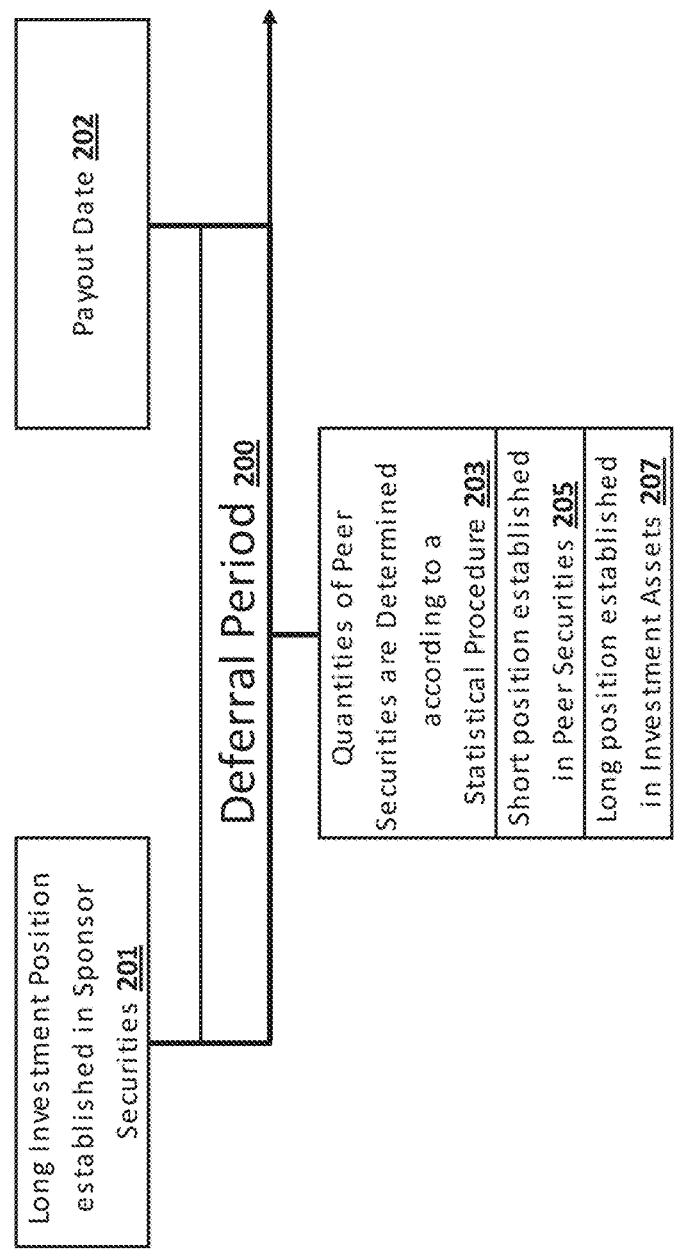
Figure 2b: Compensation Time Schedule
*A Securities-Based Deferred Compensation Incentive Plan under the Invention*

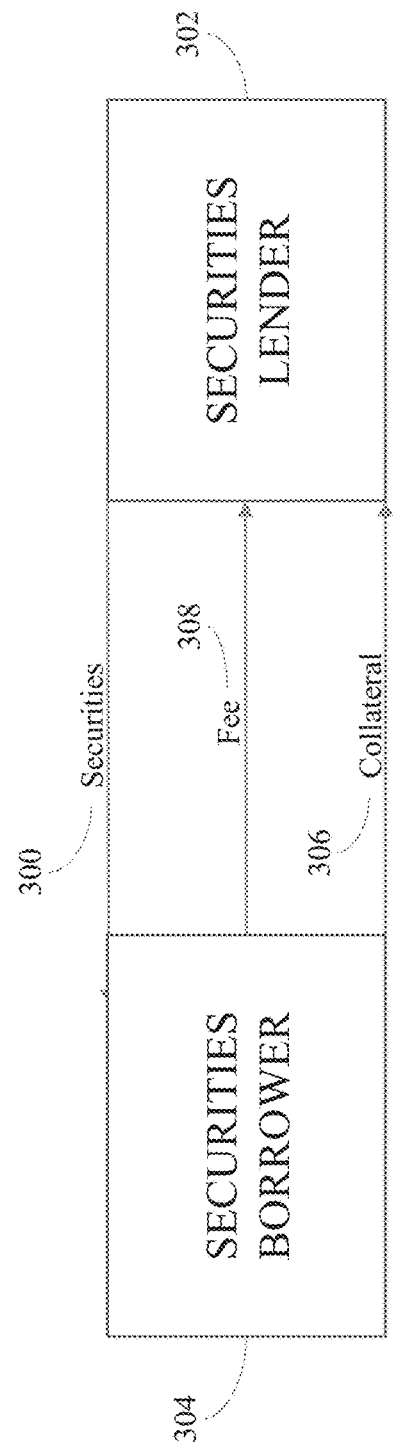
FIGURE 3a: SECURITIES BORROWING MECHANICS ("prior art")

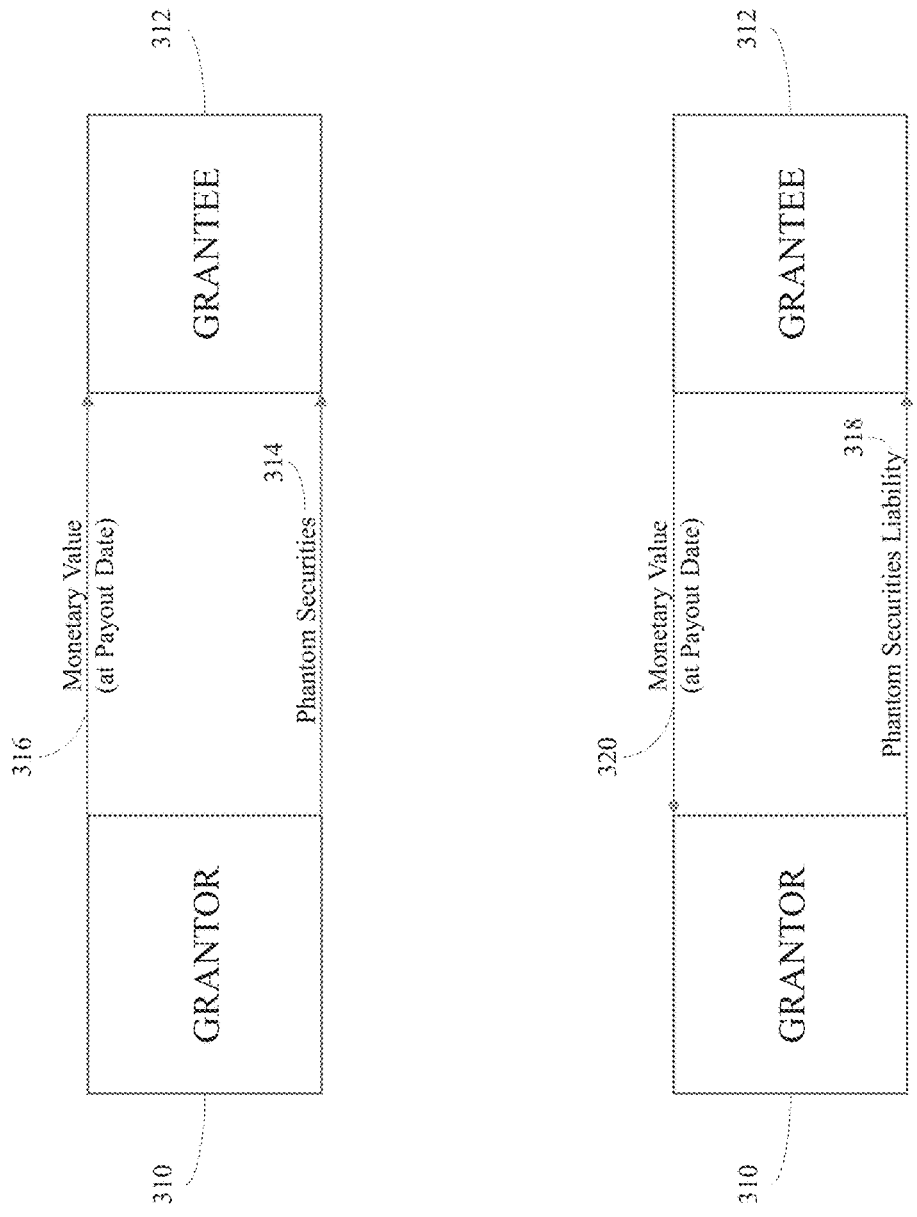

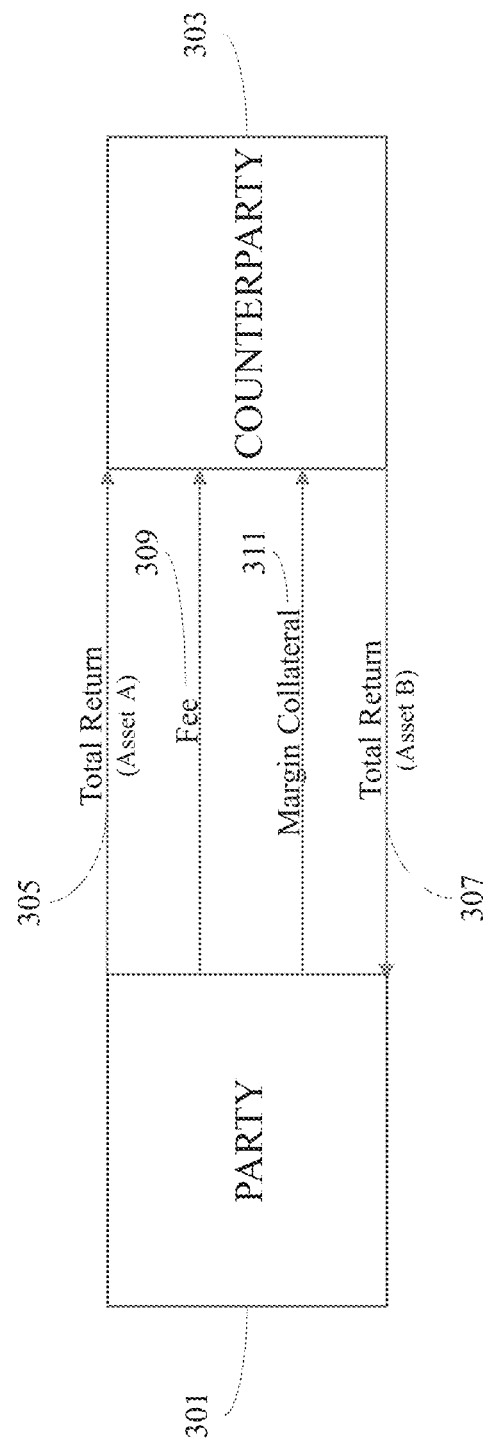
FIGURE 3c: SWAP MECHANICS ("prior art")

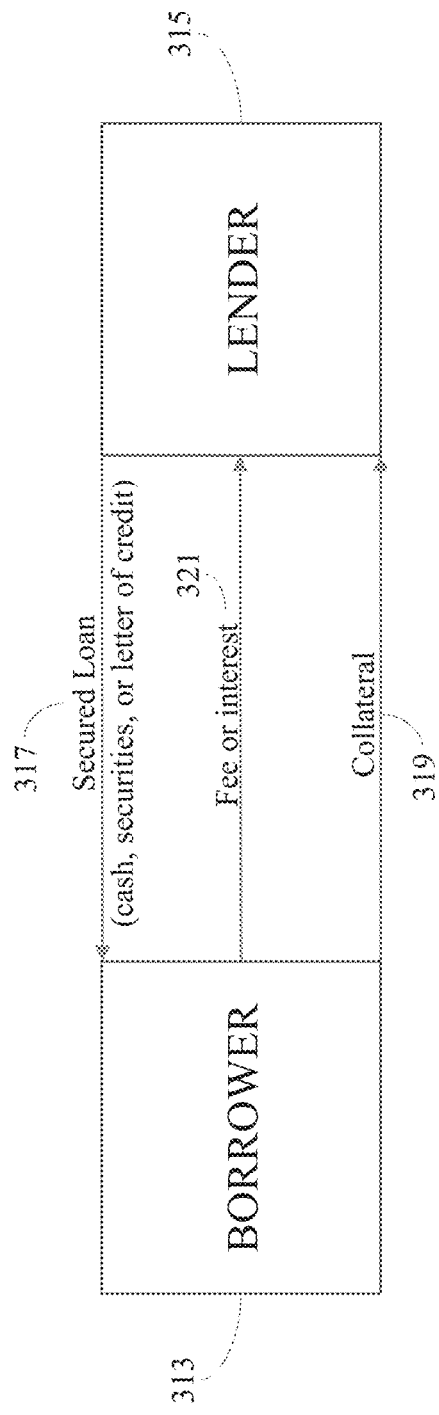
FIGURE 3d: SECURED LOAN MECHANICS ("prior art")

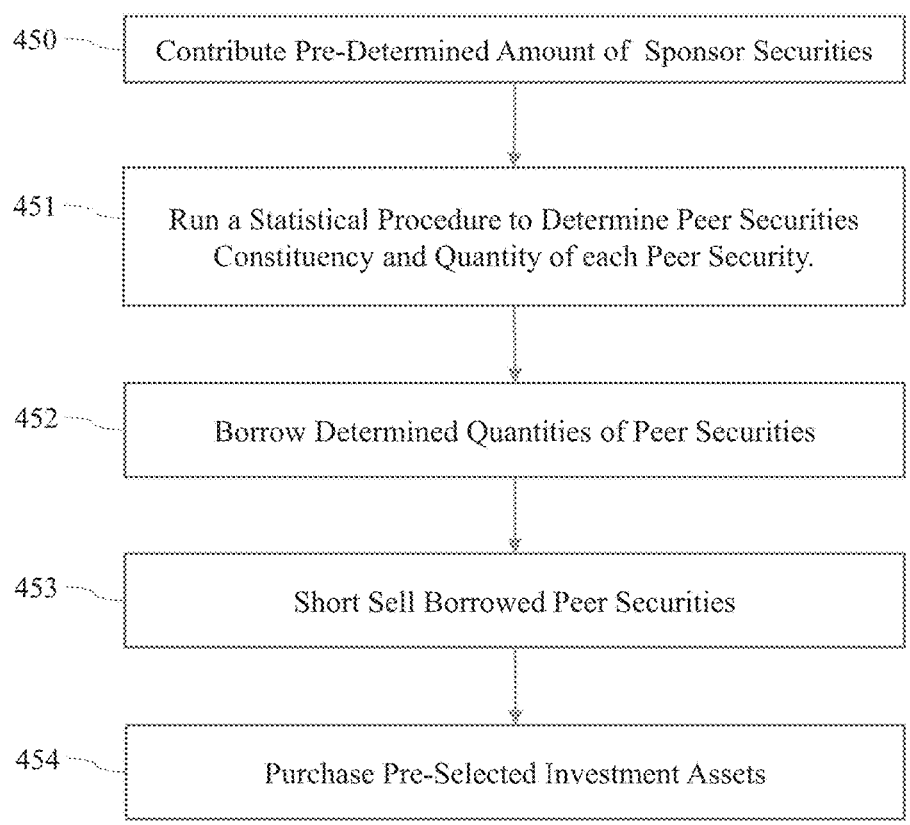
FIGURE 4a: SYSTEM 100
SECURITIES example

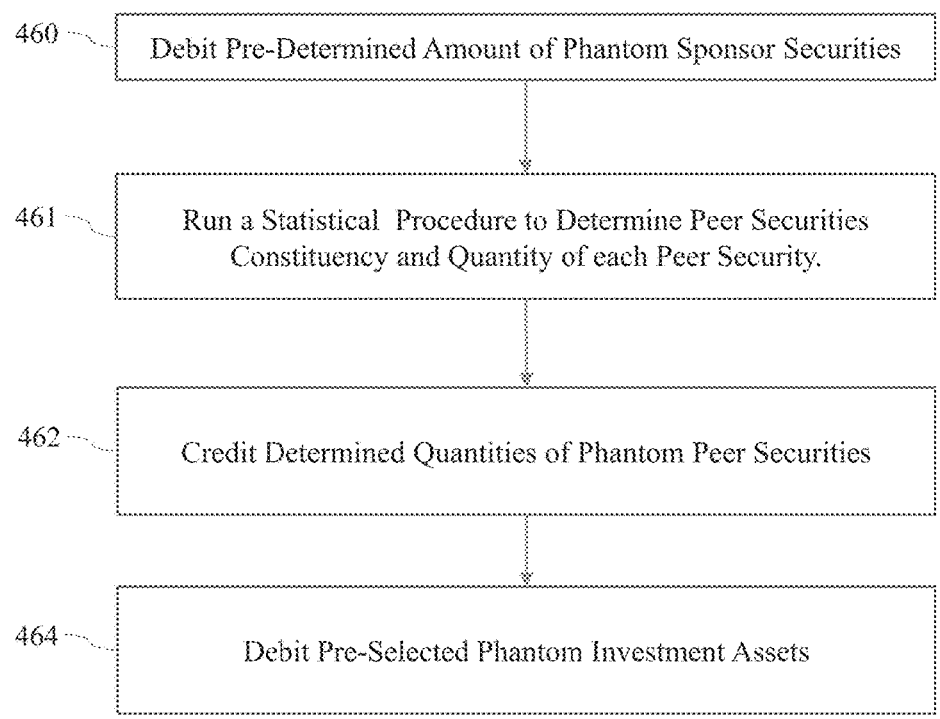
FIGURE 4b: SYSTEM 200
PHANTOM SECURITIES example

FIGURE 4c: SYSTEM 300
SWAP example
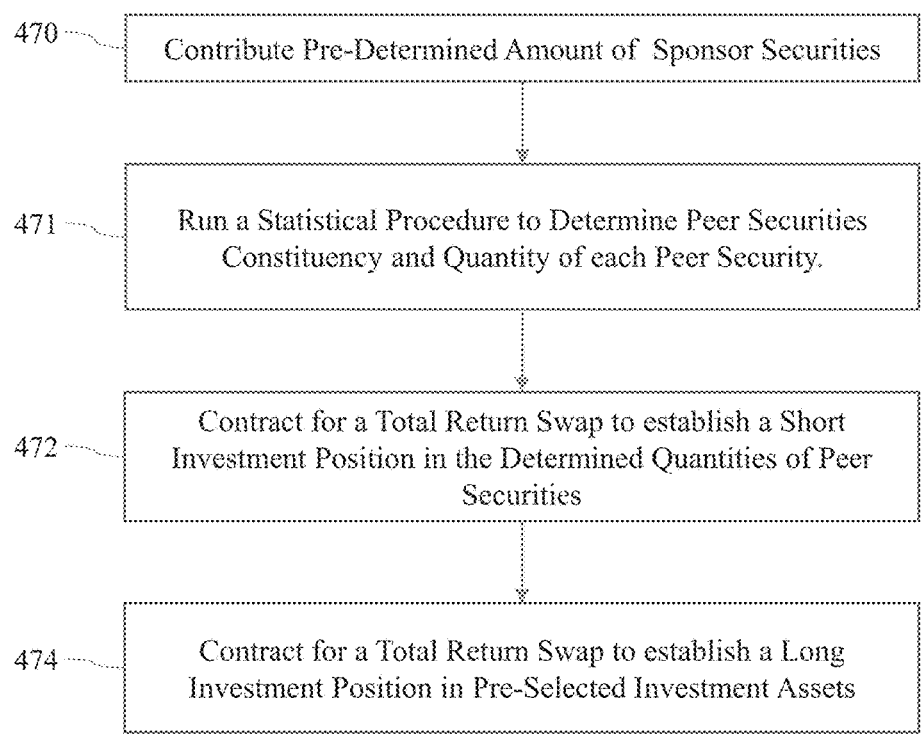

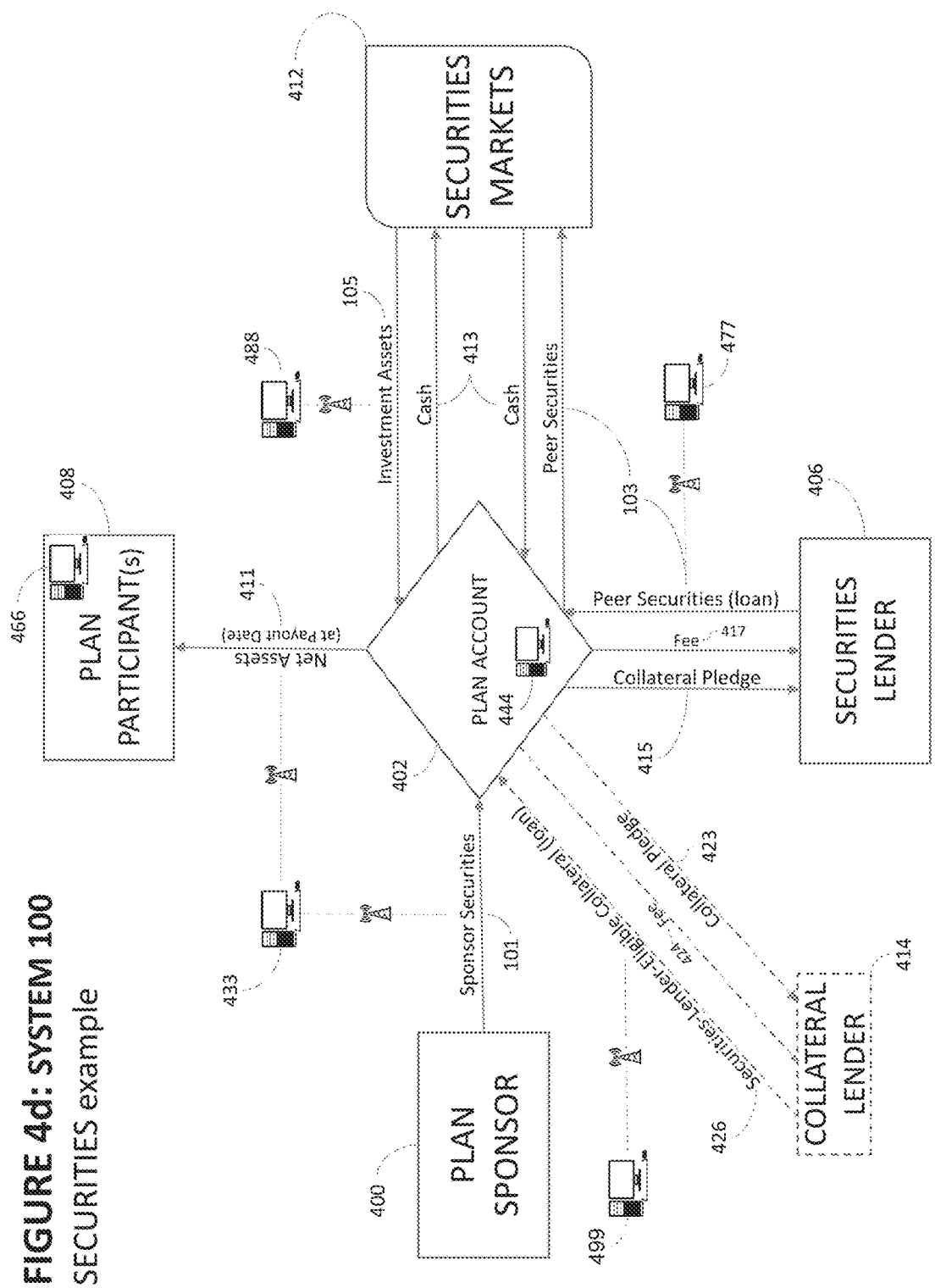

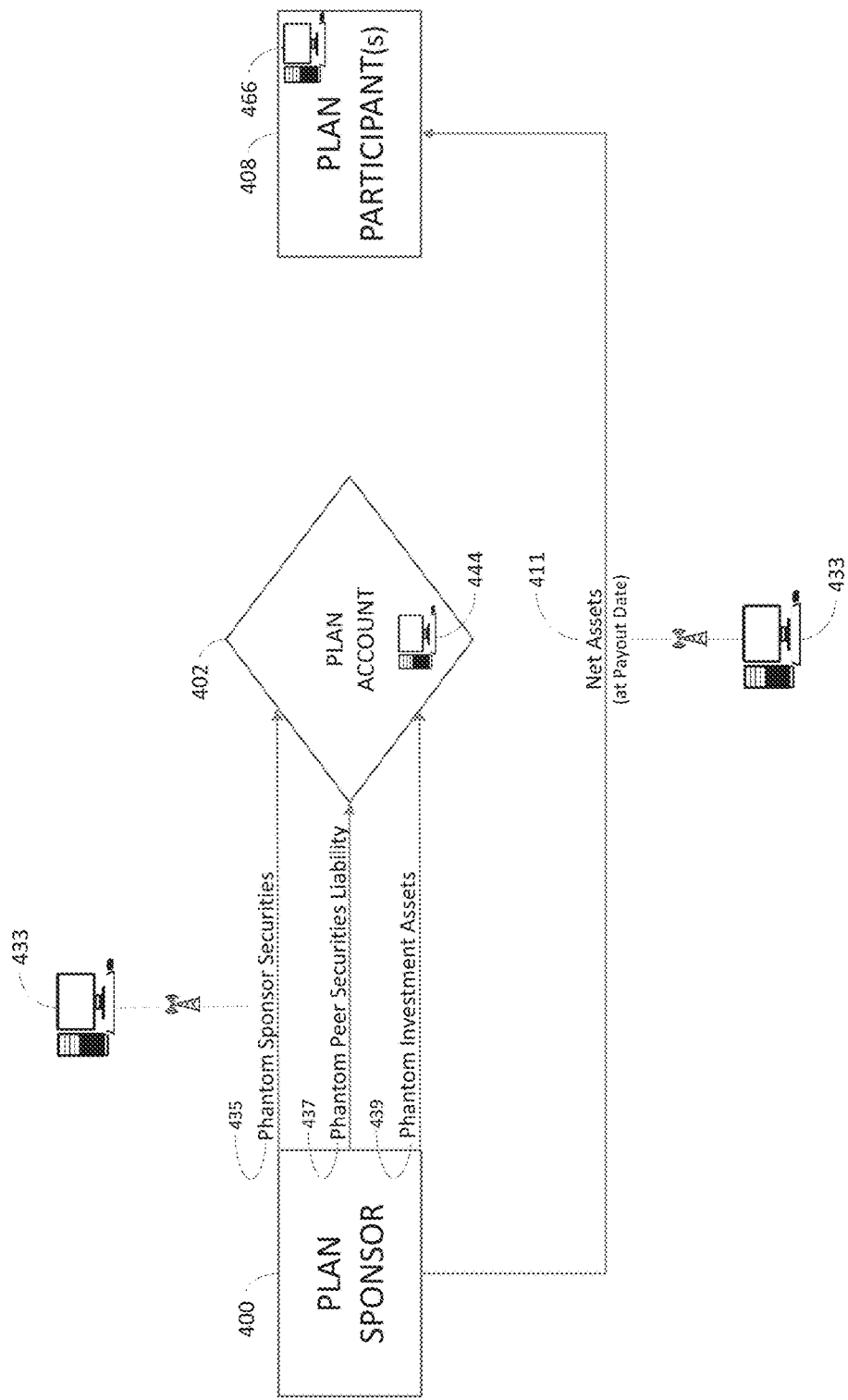

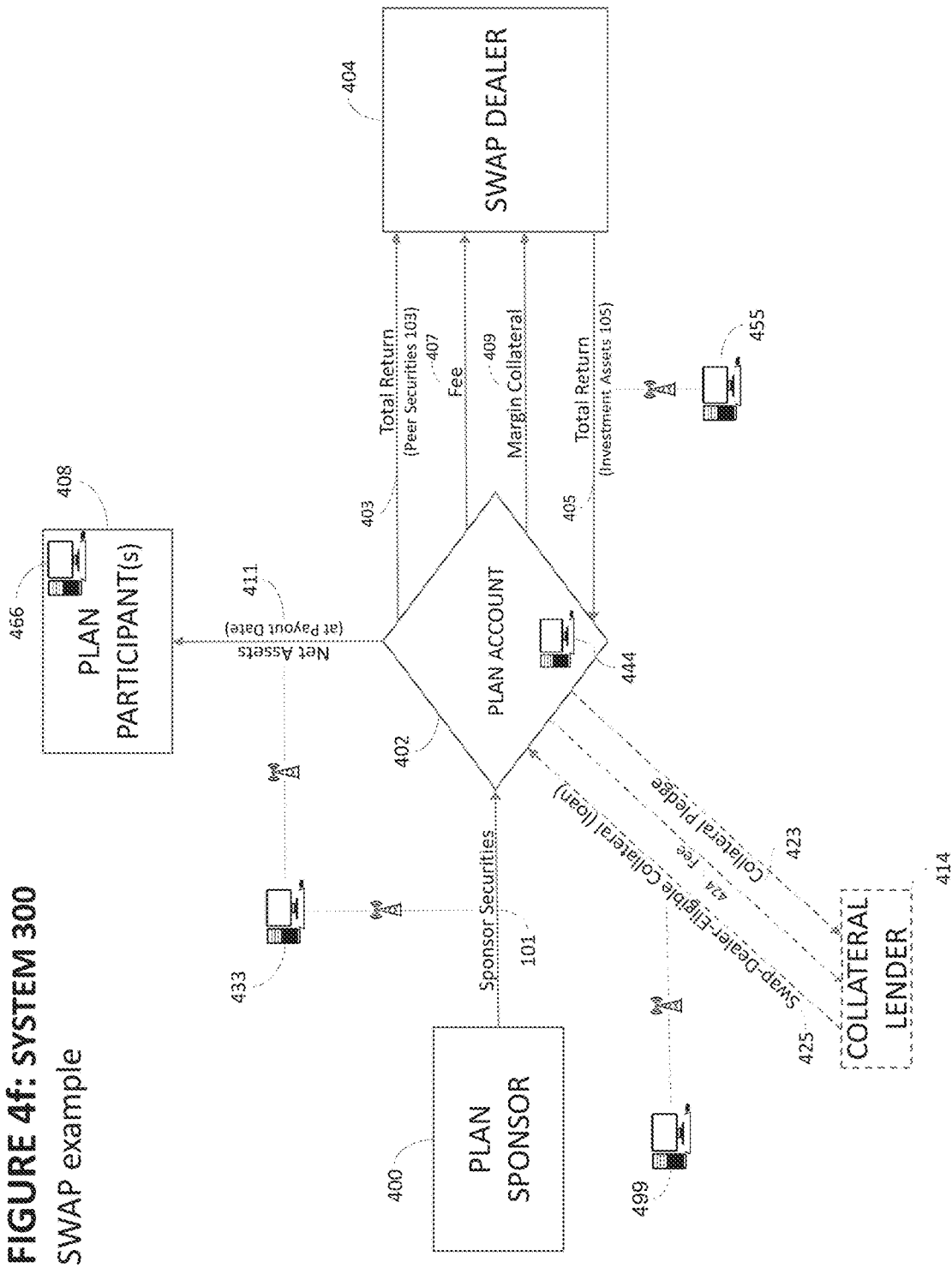
FIGURE 4f: SYSTEM 300
SWAP example

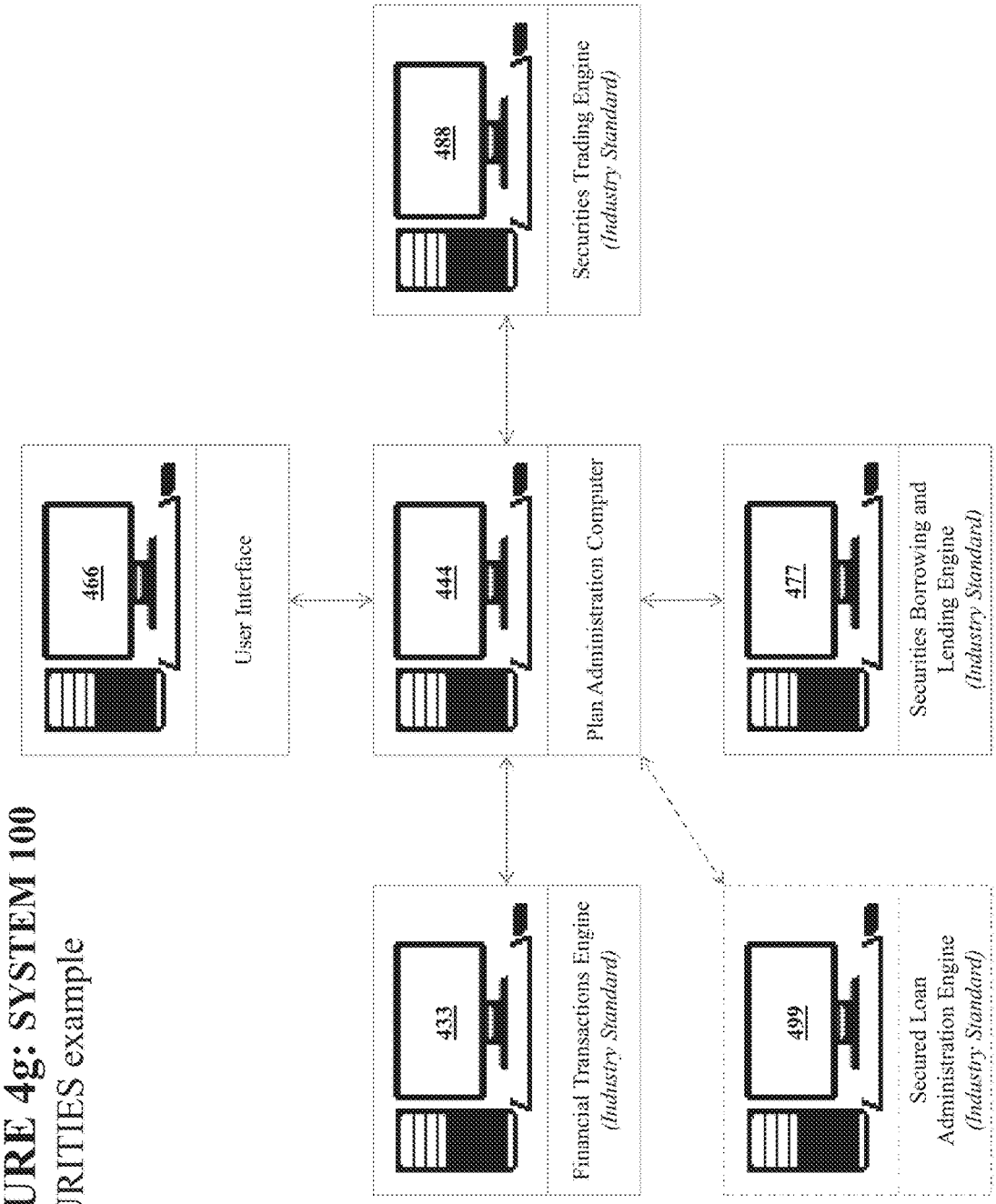
FIGURE 4g: SYSTEM 100
SECURITIES example

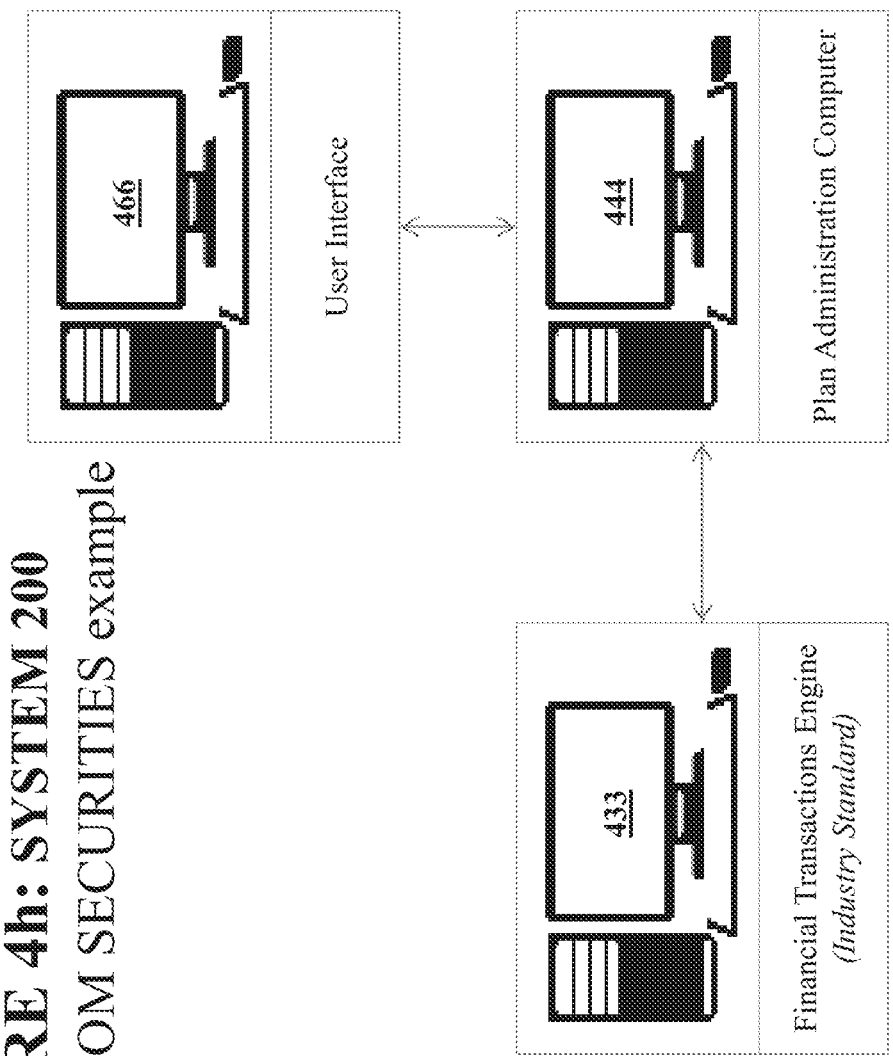

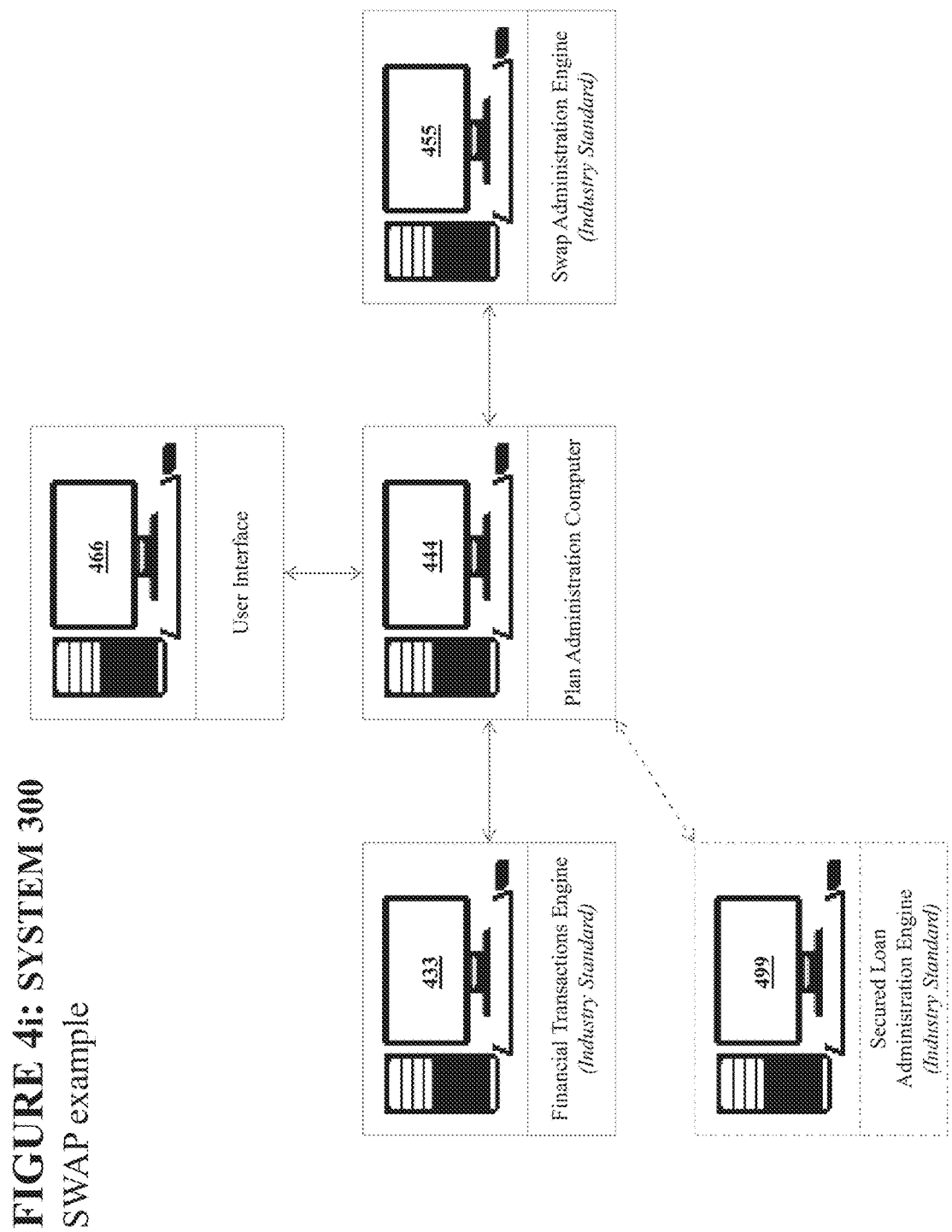
FIGURE 4i: SYSTEM 300
SWAP example

FIGURE 5: Plan Administration Computer
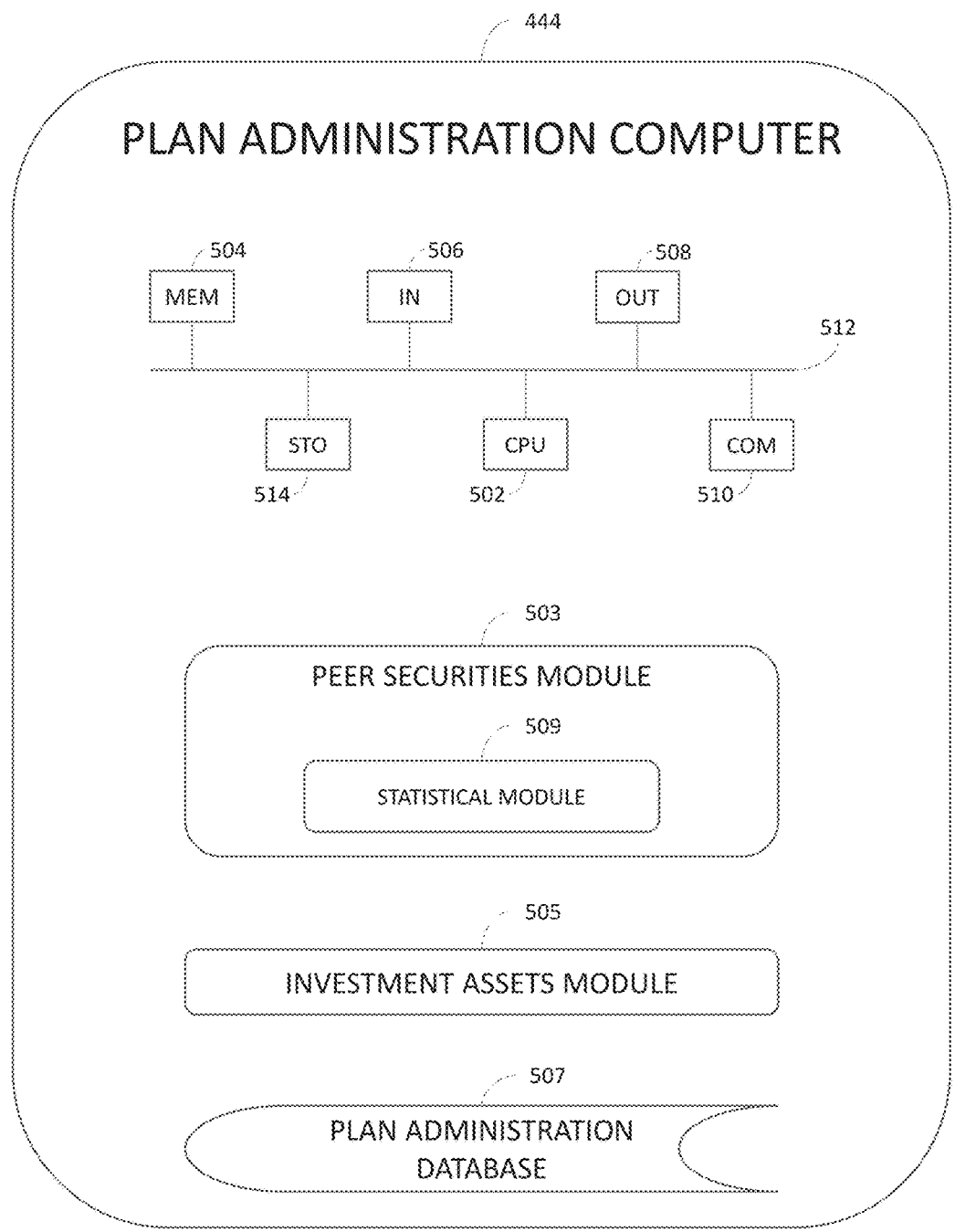

PEER SECURITIES MODULE

Figure 9: Sponsor Security Database 604
Boston Properties Inc. ("example")

| | |
|---:|:---|
| ISIN | US1011211018 |
| Ticker | BXP |
| Asset Class | Equity |
| Currency | USD |
| Issuer | Boston Properties Inc. |
| Domicile | United States |
| Industry | Real Estate Investment Trusts |
| Sector Code (ICB™) | 8670 |
| Competitors | SPG, EQR, AVB, SLG, FRT, … |
| Constituent of | Dow Jones US Real Estate Index, … |
| date | Historical Return |
| 02.26.2002 | 1.61% |
| 02.27.2002 | -0.90% |
| 02.28.2002 | 0.05% |
| … | … |
| 02.26.2007 | -0.57% |
| 02.27.2007 | -3.08% |
| 02.28.2007 | 1.55% |

Figure 10a: Securities and Issuers Vendor Database 606 - Published Index
Dow Jones U.S. Real Estate Index™ ("example")

| Ticker | ISIN | Name | Weight (%) | Asset Class | Sector |
|---|---|---|---|---|---|
| SPG | US8288061091 | SIMON PROPERTY GROUP REIT INC | 6.92 | Equity | Financials |
| AMT | US03027X1000 | AMERICAN TOWER REIT CORP | 4.84 | Equity | Financials |
| PSA | US74460D1090 | PUBLIC STORAGE REIT | 3.44 | Equity | Financials |
| CCI | US22822V1017 | CROWN CASTLE INTERNATIONAL REIT CO | 3.33 | Equity | Financials |
| EQR | US29476L1070 | EQUITY RESIDENTIAL REIT | 3.30 | Equity | Financials |
| HCN | US42217K1060 | HEALTH CARE REIT INC | 3.00 | Equity | Financials |
| AVB | US0534841012 | AVALONBAY COMMUNITIES REIT INC | 2.68 | Equity | Financials |
| VTR | US92276F1003 | VENTAS REIT INC | 2.56 | Equity | Financials |
| PLD | US74340W1036 | PROLOGIS REIT INC | 2.50 | Equity | Financials |
| BXP | US1011211018 | BOSTON PROPERTIES REIT INC | 2.44 | Equity | Financials |
| HCP | US40414L1098 | HCP REIT INC | 2.18 | Equity | Financials |
| GGP | US3700231034 | GENERAL GROWTH PROPERTIES REIT INC | 2.18 | Equity | Financials |
| VNO | US9290421091 | VORNADO REALTY TRUST REIT | 2.15 | Equity | Financials |
| WY | US9621661043 | WEYERHAEUSER REIT | 2.10 | Equity | Financials |
| HST | US44107P1049 | HOST HOTELS & RESORTS REIT INC | 1.84 | Equity | Financials |
| ESS | US2971781057 | ESSEX PROPERTY TRUST REIT INC | 1.78 | Equity | Financials |
| SLG | US78440X1019 | SL GREEN REALTY REIT CORP | 1.43 | Equity | Financials |
| MAC | US5543821012 | MACERICH REIT | 1.40 | Equity | Financials |
| CBG | US12504L1098 | CBRE GROUP INC | 1.30 | Equity | Financials |
| O | US7561091049 | REALTY INCOME REIT CORP | 1.26 | Equity | Financials |
| KIM | US49446R1095 | KIMCO REALTY REIT CORP | 1.22 | Equity | Financials |
| NLY | US0357104092 | ANNALY CAPITAL MANAGEMENT REIT INC | 1.19 | Equity | Financials |
| FRT | US3137472060 | FEDERAL REALTY INVESTMENT TRUST RE | 1.13 | Equity | Financials |
| DLR | US2538681030 | DIGITAL REALTY TRUST REIT INC TRUS | 1.09 | Equity | Financials |
| UDR | US9026531049 | UDR INC. | 1.04 | Equity | Financials |
| ARCP | US02917T1043 | AMERICAN REALTY CAPITAL PROPERTIES | 1.00 | Equity | Financials |
| EXR | US30225T1025 | EXTRA SPACE STORAGE INC. | 0.95 | Equity | Financials |
| JLL | US48020Q1076 | JONES LANG LASALLE INC. | 0.94 | Equity | Financials |
| PCL | US7292511083 | PLUM CREEK TIMBER COMPANY REIT INC | 0.89 | Equity | Financials |
| AGNC | US02503X1054 | AMERICAN CAPITAL AGENCY REIT CORP | 0.88 | Equity | Financials |
| RLGY | US75605Y1064 | REALOGY HOLDINGS CORP. | 0.84 | Equity | Financials |
| IRM | US46284V1017 | IRON MOUNTAIN INC | 0.83 | Equity | Financials |
| DRE | US2644115055 | DUKE REALTY REIT CORP | 0.83 | Equity | Financials |
| ARE | US0152711091 | ALEXANDRIA REAL ESTATE EQUITIES IN | 0.82 | Equity | Financials |
| CPT | US1331311027 | CAMDEN PROPERTY TRUST REIT | 0.80 | Equity | Financials |
| WPC | US92936U1097 | W. P. CAREY REIT INC | 0.75 | Equity | Financials |
| KRC | US49427F1084 | KILROY REALTY CORP. | 0.73 | Equity | Financials |
| REG | US7588491032 | REGENCY CENTERS REIT CORP | 0.73 | Equity | Financials |
| AIV | US03748R1014 | APARTMENT INVESTMENT & MANAGEMENT | 0.72 | Equity | Financials |
| MAA | US59522J1034 | MID-AMERICA APARTMENT COMMUNITIES | 0.71 | Equity | Financials |
| OHI | US6819361006 | OMEGA HEALTHCARE INVESTORS REIT IN | 0.69 | Equity | Financials |
| STWD | US85571B1052 | STARWOOD PROPERTY TRUST REIT INC | 0.69 | Equity | Financials |

Figure 10b: Securities and Issuers Vendor Database 606 - Published Index
Dow Jones U.S. Real Estate Index™ ("example")

| | | | | | |
|---|---|---|---|---|---|
| HHC | US44267D1072 | HOWARD HUGHES CORP. | 0.65 | Equity | Financials |
| LPT | US5311721048 | LIBERTY PROPERTY REIT TRUST | 0.64 | Equity | Financials |
| DDR | US23317H1023 | DDR CORP | 0.62 | Equity | Financials |
| NNN | US6374171063 | NATIONAL RETAIL PROPERTIES INC. | 0.61 | Equity | Financials |
| NRF | US66704R7044 | NORTHSTAR REALTY FINANCE REIT CORP | 0.60 | Equity | Financials |
| LAMR | US5128161099 | LAMAR ADVERTISING COMPANY ORD CLAS | 0.60 | Equity | Financials |
| SRC | US84860W1027 | SPIRIT REALTY CAPITAL REIT INC | 0.58 | Equity | Financials |
| SNH | US81721M1099 | SENIOR HOUSING PROPERTIES TRUST RE | 0.57 | Equity | Financials |
| TCO | US8766641034 | TAUBMAN CENTERS REIT INC | 0.57 | Equity | Financials |
| HPT | US44106M1027 | HOSPITALITY PROPERTIES TRUST REIT | 0.55 | Equity | Financials |
| FCE.A | US3455501078 | FOREST CITY ENTERPRISES INC. CL A | 0.55 | Equity | Financials |
| ELS | US29472R1086 | EQUITY LIFESTYLE PROPERTIES INC. | 0.53 | Equity | Financials |
| ACC | US0248351001 | AMERICAN CAMPUS COMMUNITIES INC. | 0.53 | Equity | Financials |
| HME | US4373061039 | HOME PROPERTIES INC. | 0.52 | Equity | Financials |
| BMR | US09063H1077 | BIOMED REALTY TRUST REIT INC | 0.50 | Equity | Financials |
| CXW | US22025Y4070 | CORRECTIONS CORPORATION OF AMERICA | 0.50 | Equity | Financials |
| LHO | US5179421087 | LASALLE HOTEL PROPERTIES | 0.50 | Equity | Financials |
| RLJ | US74965L1017 | RLJ LODGING TRUST REIT | 0.49 | Equity | Financials |
| DEI | US25960P1093 | DOUGLAS EMMETT INC. | 0.49 | Equity | Financials |
| HIW | US4312841087 | HIGHWOODS PROPERTIES INC. | 0.48 | Equity | Financials |
| CUBE | US2296631094 | CUBESMART | 0.48 | Equity | Financials |
| TWO | US90187B1017 | TWO HARBORS INVESTMENT REIT CORP | 0.48 | Equity | Financials |
| WRI | US9487411038 | WEINGARTEN REALTY INVESTORS REIT | 0.47 | Equity | Financials |
| OUT | US69007J1060 | OUTFRONT MEDIA INC | 0.46 | Equity | Financials |
| RPAI | US76131V2025 | RETAIL PROPERTIES OF AMERICA REIT | 0.44 | Equity | Financials |
| BEE | US86272T1060 | STRATEGIC HOTELS & RESORTS INC. | 0.41 | Equity | Financials |
| EQC | US2946281027 | EQUITY COMMONWEALTH REIT | 0.41 | Equity | Financials |
| GLPI | US36467J1088 | GAMING AND LEISURE PROPERTIES REIT | 0.40 | Equity | Financials |
| EPR | US26884U1097 | EPR PROPERTIES | 0.40 | Equity | Financials |
| RYN | US7549071030 | RAYONIER REIT INC | 0.40 | Equity | Financials |
| CXP | US1982872038 | COLUMBIA PROPERTY REIT INC TRUST | 0.40 | Equity | Financials |
| SSS | US84610H1086 | SOVRAN SELF STORAGE INC. | 0.39 | Equity | Financials |
| SKT | US8754651060 | TANGER FACTORY OUTLET CENTERS INC. | 0.39 | Equity | Financials |
| SHO | US8678921011 | SUNSTONE HOTEL INVESTORS INC. | 0.39 | Equity | Financials |
| SUI | US8666741041 | SUN COMMUNITIES INC. | 0.39 | Equity | Financials |
| CSAL | US20341J1043 | COMMUNICATIONS SALES AND LEASING I | 0.38 | Equity | Financials |
| PPS | US7374641071 | POST PROPERTIES INC. | 0.38 | Equity | Financials |
| HTA | US42225P5017 | HEALTHCARE TRUST OF AMERICA REIT C | 0.38 | Equity | Financials |
| PEB | US70509V1008 | PEBBLEBROOK HOTEL TRUST REIT | 0.37 | Equity | Financials |
| CBL | US1248301004 | CBL & ASSOCIATES PROPERTIES INC. | 0.37 | Equity | Financials |
| CIM | US16934Q2084 | CHIMERA INVESTMENT CORP | 0.36 | Equity | Financials |
| MFA | US55272X1028 | MFA FINANCIAL INC. | 0.35 | Equity | Financials |
| DCT | US2331532042 | DCT INDUSTRIAL TRUST REIT INC | 0.35 | Equity | Financials |
| RHP | US78377T1079 | RYMAN HOSPITALITY PROPERTIES REIT | 0.35 | Equity | Financials |

Figure 10c: Securities and Issuers Vendor Database 606 - Published Index
Dow Jones U.S. Real Estate Index™ ("example")

| Ticker | ISIN | Name | Weight | Type | Sector |
|---|---|---|---|---|---|
| MPW | US58463J3041 | MEDICAL PROPERTIES TRUST REIT INC | 0.35 | Equity | Financials |
| GEO | US36162J1060 | GEO GROUP REIT INC | 0.34 | Equity | Financials |
| CLNY | US19624R1068 | COLONY CAPITAL INC CLASS A | 0.34 | Equity | Financials |
| PGRE | US69924R1086 | PARAMOUNT GROUP REIT INC | 0.33 | Equity | Financials |
| PDM | US7201902068 | PIEDMONT OFFICE REALTY TRUST REIT | 0.33 | Equity | Financials |
| DRH | US2527843013 | DIAMONDROCK HOSPITALITY CO. | 0.32 | Equity | Financials |
| WPG | US92939N1028 | WP GLIMCHER INC | 0.32 | Equity | Financials |
| BDN | US1053682035 | BRANDYWINE REALTY TRUST REIT | 0.31 | Equity | Financials |
| XHR | US9840171030 | XENIA HOTELS RESORTS REIT INC | 0.31 | Equity | Financials |
| OFC | US22002T1088 | CORPORATE OFFICE PROPERTIES TRUST | 0.29 | Equity | Financials |
| HR | US4219461047 | HEALTHCARE REALTY TRUST REIT INC | 0.29 | Equity | Financials |
| AMH | US02665T3068 | AMERICAN HOMES RENT REIT CLASS A | 0.29 | Equity | Financials |
| KRG | US49803T3005 | KITE REALTY GROUP TRUST REIT | 0.28 | Equity | Financials |
| DFT | US26613Q1067 | DUPONT FABROS TECHNOLOGY INC. | 0.26 | Equity | Financials |
| UE | US91704F1049 | URBAN EDGE PROPERTIES | 0.25 | Equity | Financials |
| CUZ | US2227951066 | COUSINS PROPERTIES REIT INC | 0.24 | Equity | Financials |
| LXP | US5290431015 | LEXINGTON REALTY TRUST REIT | 0.24 | Equity | Financials |
| IVR | US4613181008 | INVESCO MORTGAGE CAPITAL INC. | 0.24 | Equity | Financials |
| ALEX | US0144911049 | ALEXANDER & BALDWIN INC. | 0.23 | Equity | Financials |
| EGP | US2772761019 | EASTGROUP PROPERTIES INC. | 0.22 | Equity | Financials |
| HTS | US41902R1032 | HATTERAS FINANCIAL CORP. | 0.21 | Equity | Financials |
| WRE | US9396531017 | WASHINGTON REAL ESTATE INVESTMENT | 0.20 | Equity | Financials |
| PCH | US7376301039 | POTLATCH CORP. | 0.18 | Equity | Financials |
| JOE | US7901481009 | ST. JOE CO. | 0.18 | Equity | Financials |
| CYS | US12673A1088 | CYS INVESTMENTS INC | 0.18 | Equity | Financials |
| CLI | US5544891048 | MACK-CALI REALTY REIT CORP | 0.17 | Equity | Financials |
| RWT | US7580754023 | REDWOOD TRUST REIT INC | 0.16 | Equity | Financials |
| ARR | US0423151010 | ARMOUR RESIDENTIAL REIT INC. | 0.13 | Equity | Financials |
| | | | 100.00 | | |

Figure 11: Peer Securities Database 608

| | | | | |
|---|---|---|---|---|
| ISIN | US8288061091 | US2947611070 | US0534841012 | US78440X1019 | US3137472060 |
| Ticker | SPG | EQR | AVB | SLG | FRT |
| Asset Class | Equity | Equity | Equity | Equity | Equity |
| Issuer | Simon Property Group | Equity Resid. Trust Prprts | Avalonbay Communities | SL Green Realty | Federal Realty Inv. Trust |
| Currency | USD | USD | USD | USD | USD |
| Industry | Real Estate Inv. Trusts | Real Estate Inv. Trusts | Real Estate Inv. Trusts | Real Estate Inv. Trusts | Real Estate Inv. Trusts |
| Domicile | United States | United States | United States | United States | United States |
| Sector Code (ICB™) | 8670 | 8670 | 8670 | 8670 | 8670 |
| Borrowing Cost | 0.25% | 0.25% | 0.25% | 0.25% | 0.25% |
| date | Historical Return | Historical Return | Historical Return | Historical Return | Historical Return |
| 02.26.2002 | 0.69% | -0.19% | 0.39% | 0% | -0.12% |
| 02.27.2002 | -0.13% | 0.11% | -0.24% | -0.68% | -0.08% |
| 02.28.2002 | 0.26% | -0.19% | -0.75% | -0.28% | -0.55% |
| ... | ... | ... | ... | ... | ... |
| 02.26.2007 | -1.54% | -0.81% | -0.84% | -0.37% | -0.23% |
| 02.27.2007 | -3.59% | -3.65% | -3.66% | -2.26% | -2.27% |
| 02.28.2007 | 1.14% | 1.89% | 1.83% | 1.73% | 1.05% |

Figure 12: Statistical Output Database 612

| | β coefficent | | | | | |
|---|---|---|---|---|---|---|
| subset | SPG | EQR | AVB | SLG | FRT | $R^2_{adj,OOS}$ |
| 1 | 1.0000 | - | - | - | - | 0.7976 |
| ... | ... | ... | ... | ... | ... | ... |
| 6 | 0.5480 | 0.4520 | - | - | - | 0.8418 |
| ... | ... | ... | ... | ... | ... | ... |
| 16 | 0.3940 | 0.2452 | 0.3607 | - | - | 0.8626 |
| ... | ... | ... | ... | ... | ... | ... |
| 26 | 0.2850 | 0.1808 | 0.2253 | 0.3089 | - | 0.8681 |
| ... | ... | ... | ... | ... | ... | ... |
| 31 | 0.2187 | 0.1439 | 0.2501 | 0.2624 | 0.1249 | 0.8810 |

Figure 13a: User Interface 466 associated with Investment Assets Database 801
Investment Assets Constituency Selection ("example")

| Investment Asset | S | ISIN | Type | Asset Class |
|---|---|---|---|---|
| Vanguard Total World Stock ETF |  | US9220427424 | ETF | equities |
| iShares Core S&P 500 ETF | √ | US4642872000 | ETF | equities |
| iShares MSCI EAFE ETF |  | US4642874659 | ETF | equities |
| iShares MSCI Emerging Markets ETF | √ | US4642872349 | ETF | equities |
| iShares Russell 1000 Growth ETF |  | US4642876142 | ETF | equities |
| iShares MSCI Japan ETF | √ | US4642868487 | ETF | equities |
| iShares Select Dividend ETF |  | US4642871689 | ETF | equities |
| iShares Core U.S. Aggregate Bond ETF | √ | US4642872265 | ETF | fixed income |
| iShares 1-3 Year Credit Bond ETF | √ | US4642886463 | ETF | fixed income |
| iShares 1-3 Year Treasury Bond ETF |  | US4642874576 | ETF | fixed income |
| iShares 7-10 Year Treasury Bond ETF | √ | US4642874402 | ETF | fixed income |
| iShares TIPS Bond ETF |  | US4642871762 | ETF | fixed income |
| iShares MBS ETF |  | US4642885887 | ETF | fixed income |
| iShares National AMT-Free Muni Bond ETF |  | US4642884146 | ETF | fixed income |
| iShares iBoxx $ High Yield Corporate Bond ETF |  | US4642885135 | ETF | fixed income |
| iShares Gold Trust |  | US4642851053 | ETF | commodities |
| iShares S&P GSCI Commodity-Indexed Trust |  | US46428R1077 | ETF | commodities |
| Vanguard Total Bond Market Index |  | US9219376038 | mutual fund | fixed income |
| Vanguard Index Trust Growth Portfolio |  | US9229085041 | mutual fund | equities |
| Bridgewater Pure Alpha Strategy 12% |  | VGG1358A2130 | hedge fund | multiple |
| Bridgewater Pure Alpha Strategy 18% |  | VGG136071096 | hedge fund | multiple |
| AQR Global Macro Fund |  | US00203H3701 | hedge fund | multiple |
| AQR Large Capital Momentum Style Fund |  | US00203H7017 | hedge fund | multiple |
| Vanguard Tax-Exempt Money Market |  | US9229062016 | money market | fixed income |
| Blackrock Money Market Portfolio | √ | US09253M1062 | money market | fixed income |

Figure 13b: User Interface 466 associated with Investment Assets Database 801
Investment Assets Relative Weights Selection ("example")

| Investment Asset | ISIN | type | asset class | % weight |
|---|---|---|---|---|
| iShares Core S&P 500 ETF | US4642872000 | ETF | equities | 50% |
| iShares MSCI Emerging Markets ETF | US4642872349 | ETF | equities | 5% |
| iShares MSCI Japan ETF | US4642868487 | ETF | equities | 5% |
| iShares Core U.S. Aggregate Bond ETF | US4642872265 | ETF | fixed income | 25% |
| iShares 1-3 Year Credit Bond ETF | US4642886463 | ETF | fixed income | 5% |
| iShares 7-10 Year Treasury Bond ETF | US4642874402 | ETF | fixed income | 5% |
| Vanguard Tax-Exempt Money Market | US09253M1062 | mutual fund | fixed income | 5% |
| Total | | | | 100% |

Figure 13c: User Interface 466 associated with Investment Assets Database 801
Investment Assets Pre-Constructed Portfolios Selection ("example")

| Investment Asset | ticker | asset class | "Safest" | "Safe" | "Balanced" % weight | "Risky" | "Riskiest" |
|---|---|---|---|---|---|---|---|
| Vanguard Total World Stock ETF | VT | equities | 10% | 20% | 35% | 50% | 70% |
| iShares Core U.S. Aggregate Bond ETF | AGG | fixed income | 80% | 70% | 60% | 50% | 30% |
| Blackrock Money Market Portfolio | PNPXX | fixed income | 10% | 10% | 5% | 0% | 0% |
| | | Total | 100% | 100% | 100% | 100% | 100% |
| | | SELECTION | | √ | | | |

FIGURE 14a: BALANCE REPORT associated with Plan Administration Database 507
SECURITIES example ("System 100")

Deferred Compensation Plan Account 402 Balance Report
Effective date Mar-01-2007

Securities Positions

| Sponsor Securities | Units | Price | MV | | Restriction |
|---|---|---|---|---|---|
| Boston Properties Inc. (BXP) | 8,423 | $118.73 | $1,000,063 | | Feb-28-2010 |
| | | | $1,000,063 | | |

| Peer Securities | Units | Price | MV | $\beta$ | Restriction |
|---|---|---|---|---|---|
| Simon Property Group (SPG) | -1,908 | $105.85 | -$201,962 | 0.2020 | non |
| Equity Residential (EQR) | -3,086 | $49.87 | -$153,899 | 0.1539 | non |
| Avalonbay Communities (AVB) | -1,222 | $134.07 | -$163,834 | 0.1639 | non |
| SL Green Realty (SLG) | -1,888 | $145.39 | -$274,496 | 0.2745 | non |
| Federal Realty Investment Trust (FRT) | -2,285 | $90.01 | -$205,673 | 0.2057 | non |
| | | | -$999,863 | 1.0000 | |

| Investment Assets | Units | Price | MV | | Restriction |
|---|---|---|---|---|---|
| iShares 7-10 Year Treasury Bond ETF (IEF) | 12,001 | $83.31 | $999,803 | | non |
| Cash | 60 | $1.00 | $60 | | non |
| | | | $999,863 | | |

Account Equity and Margin Requirements

| | |
|---|---|
| Equity Capital | $1,000,063 |
| Collateral Requirement (102%) | $1,019,861 |

Example in which Investment Assets and Sponsor Securities are accepted by the Securities Lender as Eligible Collateral

| Collateral Pledged to Securities Lender | Units | Price | MV | Haircut | MV*Haircut |
|---|---|---|---|---|---|
| iShares 7-10 Year Treasury Bond ETF (IEF) | 12,001 | $83.31 | $999,803 | 10% | $899,823 |
| Cash | 60 | $1.00 | $60 | 0% | $60 |
| Boston Properties Inc. (BXP) | 1,189 | $118.73 | $141,170 | 15% | $119,994 |
| | | | $1,141,033 | | $1,019,877 |

Example in which Cash Only is accepted by the Securities Lender as Eligible Collateral ("Collateral Transformation")

| Collateral Pledged to Securities Lender | Units |
|---|---|
| Cash | $1,019,861 |

| Collateral Borrowed from Collateral Lender | Units |
|---|---|
| Cash | $1,019,801 |

| Collateral Pledged to Collateral Lender | Units | Price | MV | Haircut | MV*Haircut |
|---|---|---|---|---|---|
| iShares 7-10 Year Treasury Bond ETF (IEF) | 12,001 | $83.31 | $999,803 | 10% | $899,823 |
| Boston Properties Inc. (BXP) | 1,189 | $118.73 | $141,170 | 15% | $119,994 |
| | | | $1,140,973 | | $1,019,817 |

FIGURE 14b: BALANCE REPORT associated with Plan Administration Database 507

PHANTOM SECURITIES example ("System 200")

Deferred Compensation Plan Account 402 Balance Report
Effective date Mar-01-2007

Phantom Securities Positions

| Phantom Sponsor Securities | Units | Price | MV | | Restriction |
|---|---|---|---|---|---|
| Boston Properties Inc. (BXP) | 8,423 | $118.73 | $1,000,063 | | Feb-28-2010 |
| | | | $1,000,063 | | |

| Phantom Peer Securities Liability | Units | Price | MV | β | Restriction |
|---|---|---|---|---|---|
| Simon Property Group (SPG) | -1,908 | $105.85 | -$201,962 | 0.2020 | non |
| Equity Residential (EQR) | -3,086 | $49.87 | -$153,899 | 0.1539 | non |
| Avalonbay Communities (AVB) | -1,222 | $134.07 | -$163,834 | 0.1639 | non |
| SL Green Realty (SLG) | -1,888 | $145.39 | -$274,496 | 0.2745 | non |
| Federal Realty Investment Trust (FRT) | -2,285 | $90.01 | -$205,673 | 0.2057 | non |
| | | | -$999,863 | 1.0000 | |

| Phantom Investment Assets | Units | Price | MV | Restriction |
|---|---|---|---|---|
| iShares 7-10 Year Treasury Bond ETF (IEF) | 12,001 | $83.31 | $999,803 | non |
| Cash | 60 | $1.00 | $60 | non |
| | | | $999,863 | |

Net Value of Phantom Securities

Equity Capital $1,000,063

FIGURE 14c: BALANCE REPORT associated with Plan Administration Database 507
SWAP example ("System 300")

Deferred Compensation Plan Account 402 Balance Report
Effective date Mar-01-2007

Securities Positions

| Sponsor Securities | Units | Price | MV | Restriction |
|---|---|---|---|---|
| Boston Properties Inc. (BXP) | 8,423 | $118.73 | $1,000,063 | Feb-28-2010 |
| | | | $1,000,063 | |

Total Return Swap Positions

| Peer Securities | Units | Price | MV | β | Restriction |
|---|---|---|---|---|---|
| Simon Property Group (SPG) | -1,908 | $105.85 | -$201,962 | 0.2020 | non |
| Equity Residential (EQR) | -3,086 | $49.87 | -$153,899 | 0.1539 | non |
| Avalonbay Communities (AVB) | -1,222 | $134.07 | -$163,834 | 0.1639 | non |
| SL Green Realty (SLG) | -1,888 | $145.39 | -$274,496 | 0.2745 | non |
| Federal Realty Investment Trust (FRT) | -2,285 | $90.01 | -$205,673 | 0.2057 | non |
| | | | -$999,863 | 1.0000 | |

| Investment Assets | Units | Price | MV | Restriction |
|---|---|---|---|---|
| iShares 7-10 Year Treasury Bond ETF (IEF) | 12,001 | $83.31 | $999,803 | non |
| Cash | 60 | $1.00 | $60 | non |
| | | | $999,863 | |

Account Equity and Margin Requirements

| | |
|---|---|
| Equity Capital | $1,000,063 |
| Margin Collateral Requirement | $299,959 |

Example in which Sponsor Securities are accepted by the Swap Dealer as Eligible Collateral

| Collateral Pledged to Swap Dealer | Units | Price | MV | Haircut | MV*Haircut |
|---|---|---|---|---|---|
| Boston Properties Inc. (BXP) | 2,973 | $118.73 | $352,984 | 15% | $300,037 |

Example in which Cash Only is accepted by the Swap Dealer as Eligible Collateral ("Collateral Transformation")

| Collateral Pledged to Swap Dealer | Units |
|---|---|
| Cash | $299,959 |

| Collateral Borrowed from Collateral Lender | Units |
|---|---|
| Cash | $299,959 |

| Collateral Pledged to Collateral Lender | Units | Price | MV | Haircut | MV*Haircut |
|---|---|---|---|---|---|
| Boston Properties Inc. (BXP) | 2,973 | $118.73 | $352,984 | 15% | $300,037 |

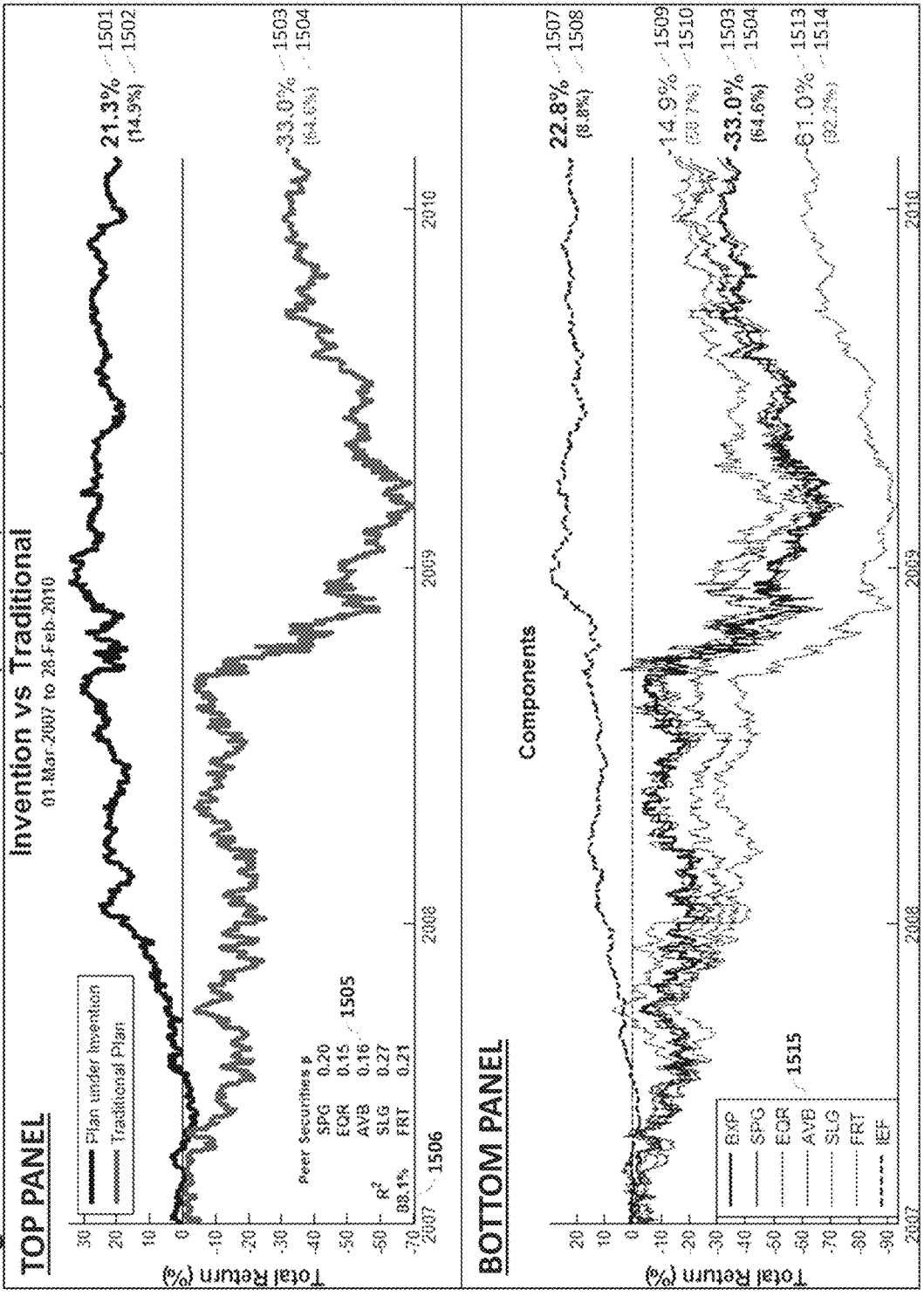

AUTOMATED SYSTEMS FOR CALIBRATING AND MANAGING A SECURITY-BASED DEFERRED COMPENSATION INCENTIVE PLAN

CROSS-REFERENCE TO RELATED APPLICATIONS

This continuation-in-part patent application claims priority to U.S. Non-Provisional application Ser. No. 14/812,474 filed Jul. 29, 2015, which claims priority to U.S. Provisional Patent Application No. 62/035,435 filed Aug. 10, 2014. The disclosures of the two above-identified applications are both incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

It is common practice for companies to provide a portion of their employees' compensation in deferred form, thus making it available to them only after a certain period of restriction. The most popular underlying instrument that is used to defer employee compensation, which is specific to the awarding company, is the awarding company's own shares. Under such arrangements, the value of the award upon full vesting and release of all restriction, henceforth referred to as the payout date, is a function of the investment performance of the company's shares during the deferral period.

Many overlaying instrument designs that refer to the underlying company's shares exist, such as phantom shares, stock options, stock appreciation rights, and variations thereof. Additionally, many features can be incorporated into a deferred compensation plan, such as conditioning the vesting of the award upon future performance of substantial services by the employee, or upon the employee meeting pre-specified performance targets. Further variations yet exist such as in the form of payment.

Other underlying instruments that are specific to the awarding company exist, such as the awarding company's own bonds, or identified pools of assets and liabilities. With these underlying instruments as well, the value of the award upon vesting and release of all restriction is a function of the investment performance of the chosen company-specific instrument.

An authoritative depiction of the state of the art in executive compensation design is described in the following document: Equity Alternatives: Restricted Stock, Performance Awards, Phantom Stock, SARs, and More, 13th Edition, ed. S. Rodrick (Oakland, Calif.: National Center for Employee Ownership, 2015), Introduction and Chapter 1.

The main objective of having the employee's deferred compensation be tied to the investment performance of the awarding company's securities is to increase the alignment of incentives between the employee and the awarding company's stakeholders, i.e., its shareholders, bondholders or others.

The main drawback of such security-based deferred compensation incentive plans is that the award often constitutes a significant portion of the employee's total wealth and constitutes an imposed concentration risk in the security issued by the plan sponsor (sponsor security), and in the industry the sponsor company is active in. The concentration risk in the sponsor security is compounded by its correlation to the employee's wage income, that is, by the fact that both the plan participant's current wage income and the value of her deferred compensation are driven to a large extent by the performance of the company that employs her, which in turn is driven to a large extent by the performance of the industry the company is active in.

The concentration in the sponsor security makes a given award be less valuable to an employee than an award of equal value that the employee can freely invest during the deferral period in a diversified portfolio of assets that is optimally chosen to suit her investment needs and risk tolerance. Conversely, the value the employee assigns to the sponsor securities is lower, due to the concentration and correlation risks, than the price the securities would fetch in the securities market if sold to well-diversified investors. The cost of the award that is expensed by the company equals the latter fair market value of the sponsor securities, and is higher than the former value the employee subjectively assigns to it. This difference between the cost and value of the deferred award constitutes an economic dead-weight cost that is borne by both the employee and the company. Meulbroek, L. (2005), Company Stock in Pension Plans: How Costly Is It? Journal of Law and Economics, 48(2), 443-474, estimates this economic dead-weight cost associated with restricted company shares at 42% of their value lost over a 10 year period.

SUMMARY

Preferred embodiments of the present invention (hereafter, referred to as "the disclosure") allow the alleviation of a large part of the dead-weight cost associated with the concentration and correlation risks embedded in traditional security-based deferred compensation incentive plans. The disclosure does so while identically maintaining the alignment of incentives between plan participant and plan sponsor, which is at the heart of such plans. The disclosure furthermore accommodates the same optional overlaying designs and additional features that are possible in existing plans.

In particular, the disclosure allows the alleviation of the part of the dead-weight cost that is associated with the industry-, domicile-, and asset-class-specific parts of the concentration risk embedded in the awarding company's securities.

To begin explaining, consider that a significant proportion of the variation in the investment returns of any given company's shares is attributable to, or correlated with, the variation in the returns of that company's industry and domicile peers' shares, and with the returns of the global equities market as a whole.

Similarly, a significant proportion of the variation in the investment returns of any given company's bonds is attributable to, or correlated with, the variation in the returns of that company's industry and domicile peers' bonds, and with the returns of the global bond market as a whole.

Similarly, a significant proportion of the variation in the investment returns of any given company's securitized pool of assets and liabilities, e.g., a securitized pool of residential mortgage backed securities (RMBS), is attributable to, or correlated with, the variation in the returns of distinct yet similar pools of securitized assets and liabilities.

This common source of investment return variation is referred to as a systematic risk component. The systematic risk component can be very meaningful, and for actively traded securities often amounts to more than 50% of the total return variation. The systematic risk component is beyond the control of the employee since she has no plausible way to affect the factors leading to the simultaneous variation in the returns of all securities in a given industry, domicile, or asset class.

The disclosure allows the exchange of the existing systematic risk component, embedded in any sponsor security, with the risk of a freely chosen portfolio of investment assets consisting for example of global equities, bonds, currencies, commodities, real estate, hedge funds, private equity funds, or cash, and which meets the employee's individual investment objectives and risk tolerance. At the same time, the disclosure maintains the variation in the value of the deferred award that is due to the company-specific performance, thus identically maintaining the original alignment of incentives that is at the heart of the deferred compensation arrangement.

As an example, consider a traditional equity-based deferred compensation incentive plan whereby $1,000,000-worth of shares of Boston Properties Inc (BXP), a US-based Real Estate Investment Trust (REIT), are set aside in a restricted account as deferred compensation for the future benefit of a high ranking Boston Properties Inc. executive. On average, more than 80% of the daily variation in the investment returns of BXP shares is attributable to, i.e., is correlated with, the variation in investment returns of five of BXP's industry peers: Simon Property Group (SPG), Equity Residential (EQR), Avalonbay Communities (AVB), SL Green Realty (SLG), and Federal Realty Investment Trust (FRT), all of which are US-based Real Estate Investment Trusts in competition with Boston Properties Inc. The remaining roughly 20% of BXP's share return variation may not be easily attributable to systematic risk factors and is viewed as being due to a combination of random noise and BXP-specific under- or over-performance.

The disclosure allows the removal of the real estate industry-, domicile-, and asset-class-specific systematic risk component and exchanging it with the systematic risk embedded in a freely chosen portfolio of investment assets.

In an example of a plan under the disclosure that is comparable to the above example traditional plan, the plan sponsor contributes the same $1,000,000-worth of BXP shares to the executive's restricted account as a first element; as a second element, a $1,000,000-worth of shares of Boston Properties Inc.'s five industry peers, SPG, EQR, AVB, SLG, and FRT, are borrowed and sold-short on behalf of the executive's account, wherein the quantities of each peer security (security issued by a company other than the plan sponsor and which is economically related and statistically correlated to the sponsor security) to be borrowed and sold short are determined via a computer-based statistical procedure so as to produce a maximal statistical offset between BXP's share return and the five peer securities share return; and as a third element, the $1,000,000 in short-sale cash proceeds are invested on behalf of the executive's account in a portfolio of investment assets which were freely selected by the executive out of menu made available to her.

Note the fair market value of the deferred award is $1,000,000 in the traditional plan as well as in the plan under the disclosure. Equivalently, note that no additional capital contributions into the plan account are required in the plan under the disclosure relative to the traditional plan. Lastly, note that the number of BXP shares that the executive is restricted to hold is the same in the plan under the disclosure as they are in the traditional plan.

The plan sponsor is indifferent between the example traditional plan and the comparable plan under the disclosure because the fair market value of the award is the same, because the quantity of BXP shares held by the plan participant is the same, and because the investment performance of the added short position in the five peer securities and the long position in the freely chosen portfolio of investment assets are beyond the control of the plan participant and therefore do not distort her incentives to create shareholder value.

The plan participant is bettered in the plan under the disclosure because she is shielded from the return variation in BXP shares that is common to the entire US real estate listed equities market, via the offsetting short position in the five peer securities, and is instead exposed to the return variation of a portfolio of investment assets of her choice. The benefit arises because the very large exposure to the US real estate listed equities market that is implicit in BXP shares may not be appropriate for the plan participant.

Under most circumstances, the embedded exposure to the US real estate listed equities market in this example is not appropriate for a given plan participant because:
  i. the plan participant may have a rational preference for other types of investment assets;
  ii. because it is a concentrated risk in a single industry, domicile, and asset class; and
  iii. because the investment risk in this industry is correlated with the plan participant's employment risk.

Generally, the benefits of exchanging the industry-, domicile-, and asset-class-risks, which are embedded in a sponsor security, in the context of a security-based deferred compensation incentive plan, with a portfolio of assets that are freely chosen by the plan participant to suit her investment needs are threefold:
  (1) Optimal Fit: by allowing the above, the plan sponsor may optimally cater to the plan participant's risk profile and market outlook.
  (2) Diversification: a well-diversified portfolio of investment assets is set to provide, ex-ante, a better risk-adjusted return than the portfolio of industry, domicile, and asset-class peer securities.
  (3) Employment Risk: the performance of the industry determines to a large extent both the value of the employee's security-based deferred compensation incentive award and her current income derived from employment. This correlation risk is not compensated for with additional expected investment return because the price of the sponsor security is determined in international markets by well-diversified investors who do not bear this concentration risk.

The disclosure allows the above benefits without detracting from the alignment of incentives between the participating employee and the sponsoring company's stakeholders. The reason is that both the investment position in the sponsor security and the fair market value of the deferred award are the same under the disclosure as would be under a comparable traditional plan. At the same time, the added short investment position in the peer securities and the long investment position in the freely chosen portfolio of investment assets do not change the participant's incentives to create shareholder value, since she has no plausible way to affect the investment returns of neither the peer securities nor the investment assets. The plan sponsor is happy to allow the above benefits to plan participants because the plan sponsor's interests are identically maintained, and especially so because this may help the plan sponsor attract and retain talented employees.

Explained in another way, consider for example what a recipient of a traditional deferred shares award would do were she allowed to sell the sponsor shares yet constrained to defer the cash proceeds until the intended restriction-lifting date. The rational participant would sell the shares immediately and purchase instead a diversified portfolio of assets that suits her investment needs and risk tolerance. But, the plan participant is not allowed to sell the shares, yet she can still benefit from short-selling the peer shares most correlated with the sponsor shares instead, and use the short-sale cash proceeds to finance the purchase of a suitable diversified portfolio of investment assets.

The procedures disclosed herein have not been practiced in the industry for deferred compensation plans. The concept of using a statistical procedure, necessarily rooted in computer technology, to determine appropriate quantities of peer securities in which to establish a short investment position with the purpose to offset the systematic risk component embedded in a sponsor security, and to replace it with a freely chosen portfolio of investment assets, is novel. The procedures disclosed override the traditional and conventional sequence of events that usually apply to deferred compensation plans as explained herein and provides for a non-routine approach to managing and calibrating a deferred compensation plan.

The difficulty is not in performing the series of steps to establish the respective short and long investment positions in the peer securities and investment assets. The difficulty, that even a skilled artisan may not overcome on her own without the assistance of a computer-implemented statistical procedure, lies in choosing the right peer securities to establish a short investment position in, and in choosing the right quantity of each peer security.

Another feature of the disclosure which may not be achieved without the aid of a computer algorithm is the periodical recalibration of the deferred compensation plan, so as to incorporate new information as it arrives, wherein the quantities of peer securities in which a short investment positions is maintained are periodically rebalanced such that they continue to serve the purpose of offsetting the systematic risk component embedded in the sponsor security as best as possible. The computer-implemented statistical procedure disclosed herein, which enables the determination of the quantities of peer securities, is the main inventive concept.

The current state of the art in executive compensation does not contemplate a deferred compensation plan that alleviates the dead-weight cost associated with security-based deferred compensation incentive plans, and furthermore it does not contemplate as a solution a short investment position in a plurality of peer securities the quantities of which are determined via a sophisticated computer-based algorithm.

The disclosure applies unconventional technical steps to solve a problem in prevalent security-based deferred compensation incentive plans. The problem simply is that the investment performance of traditional plans fluctuates too much with factors that are beyond the control of the plan participant. To offset a certain portion of the risk inherent in a traditional plan, short investment positions in peer securities, which are distinct from the sponsor security, are determined according to a statistical process performed by a specialized computer and using a series of automated functions that cannot be replicated by an unassisted human being. Hedging activity per-se would have entailed establishing a short investment position in substantially the same sponsor security, which the invention precludes. Furthermore, the technical steps performed are specialized for the purpose of managing and calibrating a security-based deferred compensation incentive plan, and they have no applicability in any other economic practice but the one narrowly disclosed herein.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 1a illustrates the universe of securities and delineates the sponsor security, peer securities, and investment assets.

FIG. 1b illustrates the investment positions held as part of a security-based deferred compensation incentive plan under the disclosure.

FIG. 2a illustrates a compensation timeline of a security-based deferred compensation incentive plan under the disclosure.

FIG. 2b illustrates another compensation timeline of a security-based deferred compensation incentive plan under the disclosure.

FIG. 3a illustrates the basic mechanics of a securities loan. ("prior art")

FIG. 3b illustrates the basic mechanics of a phantom security. ("prior art")

FIG. 3c illustrates the basic mechanics of a total return swap. ("prior art")

FIG. 3d illustrates the basic mechanics of a secured loan. ("prior art")

FIG. 4a illustrates the main steps performed by system 100 ("Securities example").

FIG. 4b illustrates the main steps performed by system 200 ("Phantom Securities example").

FIG. 4c illustrates the main steps performed by system 300 ("Swap example").

FIG. 4d is an illustration of the entities interacting with system 100 ("Securities example").

FIG. 4e is an illustration of the entities interacting with system 200 ("Phantom securities example").

FIG. 4f is an illustration of the entities interacting with system 300 ("Swap example").

FIG. 4g illustrates the computer engines comprising system 100 ("Securities example").

FIG. 4h illustrates the computer engines comprising system 200 ("Phantom securities example").

FIG. 4i illustrates the computer engines comprising system 300 ("Swap example").

FIG. 5 illustrates the plan administration computer.

FIG. 9 illustrates the sponsor security database.

FIGS. 10a-10c, taken together, illustrate a securities and issuers vendor database.

FIG. 11 illustrates the peer securities database.

FIG. 12 illustrates the statistical module output database.

FIG. 13a illustrates a component of the user interface: a menu of investment assets.

FIG. 13b illustrates a component of the user interface: a choice of relative weights of the investment assets.

FIG. 13c illustrates a component of the user interface: a menu of investment assets portfolios.

FIG. 14a illustrates the plan administration database and balance report for system 100 ("Securities example").

FIG. 14b illustrates the plan administration database and balance report for system 200 ("Phantom securities example").

FIG. 14c illustrates the plan administration database and balance report for system 300 ("Swap example").

FIG. 15 is an example of a historical simulation of the investment returns of a security-based deferred compensation incentive plan under the disclosure and a comparable traditional plan.

DETAILED DESCRIPTION OF THE INVENTION

Figure 6:
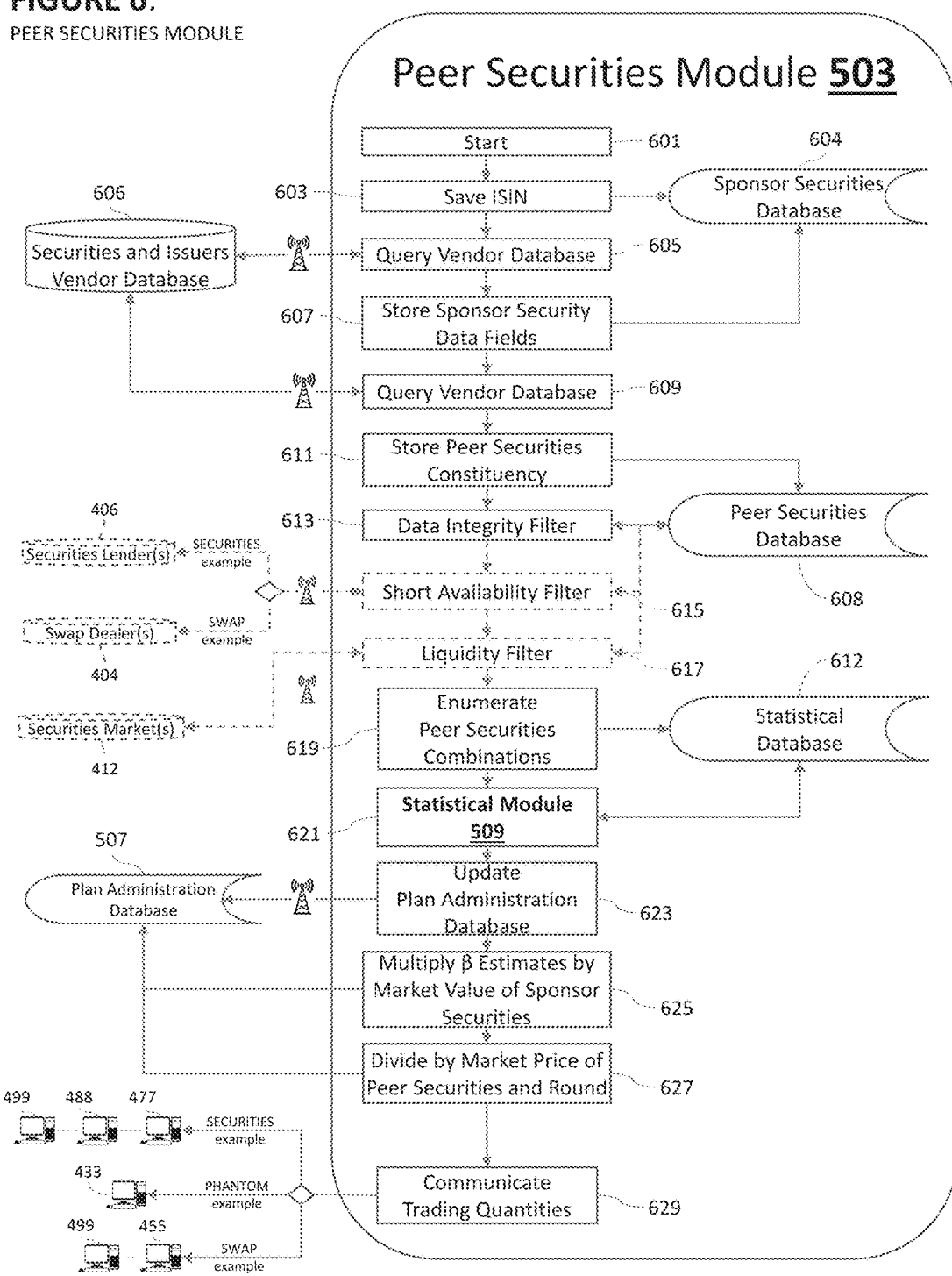
FIG. 6 illustrates the steps performed by the peer securities module.

Certain terminology is used herein for convenience only and is not to be taken as a limitation on the present invention. The following definitions are provided to promote understanding of the present invention.

Plan Sponsor—A company sponsoring a deferred compensation plan, e.g., a company sponsoring a deferred compensation plan for its employees.

Plan Participant—A participant of a deferred compensation plan sponsored by a plan sponsor, e.g., an employee of the company.

Sponsor Securities—Securities issued by the plan sponsor, e.g., equity shares issued by the plan sponsor.

Peer Securities—Securities issued by companies other than the plan sponsor, and which are economically related and statistically correlated to the sponsor security (e.g., equity shares issued by competitors of the plan sponsor, or by companies in the same industry or domicile as the plan sponsor, wherein estimation of a linear regression model implies that the total return variation of the sponsor security is to a significant extent explained by, or attributable to, the total return variation of the peer securities).

Investment Assets—Securities or any other property. For example, equities, bonds, cash, money market instruments, loans, currencies, commodities, real estate, hedge funds, or private equity. Cash in particular may be considered an investment asset under the disclosure, wherein the definition of cash is inclusive of circulated coins and notes or any on-demand deposit with a financial institution. The disclosure is inclusive of any investment vehicle. For example, actual securities, direct holdings, mutual or exchange traded funds, pooled investment trusts, and any derivative contract referring to an underlying investment asset.

Securities Lender—An entity serving as a counterparty lending securities in a securities loan transaction.

Swap Dealer—An entity serving as a counterparty to a swap or contract-for-difference agreement.

Collateral Lender—An entity lending collateral to yield loaned collateral, wherein the loaned collateral is then used by the borrower in a collateral pledge to a third party. The loaned collateral may be in the form of cash, United States notes and bills, a letter of credit, or other securities.

Securities-lender-eligible Collateral—Collateral in a form that is acceptable by the securities lender as a collateral pledge to secure a securities loan.

Swap-dealer-eligible Collateral—Collateral in a form that is acceptable by the swap dealer as a collateral pledge to secure a swap agreement.

Security-based Deferred Compensation Incentive Plan—A deferred compensation plan including sponsor securities or materially tied to the performance of sponsor securities. The definition is inclusive of a plan that includes sponsor securities, peer securities, and investment assets, as disclosed herein.

Financial Transactions Engine—A standard computer engine in the financial industry, e.g., a SWIFT-based financial transactions engine, facilitating the transfer of cash or securities from one account to another. The financial transactions engine under the disclosure has also the capabilities to enter bookkeeping debit and credit entries of phantom securities into a phantom account of a plan participant, wherein in another example the latter bookkeeping entries are performed by a designated computer engine that is distinct from the financial transactions engine.

Securities Transaction Engine—A standard computer engine in the financial industry, e.g., Sungard™ securities trading engine, facilitating the purchase and sale of securities on the securities markets.

Securities Borrowing and Lending Engine—A standard computer engine in the financial industry, e.g., 4Sight™, Sungard™, Equilend™, or AQS™ securities borrowing and lending engines, facilitating the borrowing and lending of securities in securities loans transactions, and facilitating the pledging and returning of collateral used to secure the securities loans.

Swap Administration Engine—A standard computer engine in the financial industry, e.g., 4Sight™ or Sungard™ swap administration engines, facilitating the contracting of swap agreements between two or more parties, and facilitating the pledging and returning of collateral used to secure any liability arising due to the swap agreements.

Secured Loan Administration Engine—A standard computer engine in the financial industry, e.g., 4Sight™ or Sungard™ Repo administration engines, facilitating the contracting of secured loan agreements between two or more parties, and facilitating the pledging and returning of collateral used to secure the secured loans.

FIG. 1a: Sponsor Security, Peer Securities Universe, Investment Assets Universe

FIG. 1a is an illustration of the universe of investable assets. Sponsor security 100 is a security issued by a company sponsoring a security-based deferred compensation incentive plan (e.g., equity shares of Boston Properties Inc., a U.S. real estate investment trust, contributed to participants of a deferred compensation plan sponsored by Boston Properties Inc.).

Industry peer securities 102 are securities issued by companies in the same industry as the plan sponsor (e.g., equity shares of other real estate investment trusts). Domicile peer securities 104 are securities issued by companies domiciled in the same jurisdiction as the sponsor company issuer of sponsor security 100 (e.g., equity shares of other U.S. companies). Asset class peer securities 106 are securities of the same type as sponsor security 100 (e.g., equity shares of global companies). In an example, the mathematic intersection of the industry, domicile, and asset-class peer securities sets is the peer securities universe.

Different asset class securities 108 are securities of an asset class that is different than the asset class of sponsor security 100 (e.g., fixed income securities). Different asset class securities 110 are securities of another asset class that is different than the asset class of the sponsor security 100

(e.g., commodities). Investment assets universe 112 illustrates the entire universe of investable assets comprised for example of global equities, bonds, cash, money market instrument, loans, currencies, commodities, real estate, hedge funds, and private equity funds.

FIG. 1b: Sponsor Securities, Peer Securities, Investment Assets

FIG. 1b is an illustration of the investment positions in each element of the deferred compensation instrument. The disclosure prescribes a long investment position in sponsor securities 101 (a pre-determined amount of sponsor security 100), a short investment position in peer securities 103 (determined according to a statistical procedure out of the peer securities universe), and a long investment position in investment assets 105 (freely chosen by the plan participant out of investment assets universe 112).

FIG. 2a: Compensation Time Schedule

FIG. 2a shows a timeline of a deferral period 200, during which a plan participant is restricted to have a long investment position in sponsor securities 101. In step 201, at the outset of deferral period 200, a long investment position in a pre-determined quantity of sponsor securities 101 is established on behalf of the plan participant, wherein the pre-determined quantity of sponsor securities constitutes a security-based deferred compensation incentive award.

In step 203, peer securities are selected from the peer securities universe and quantities of each in which to establish a short investment position are determined according to a statistical procedure disclosed herein.

In the example illustrated in FIG. 2a, a traditional security-based deferred compensation incentive plan is transformed to a security-based deferred compensation incentive plan under the invention at the time the long investment position in the sponsor securities is established.

In steps 205 and 207, a short investment position in the determined quantities of peer securities 103 and a long investment position in an amount of investment assets 105 which were previously selected by the plan participant are established on behalf of the plan participant.

During the deferral period 200, the investment performance of sponsor securities 101, peer securities 103, and investment assets 105 fluctuates with their respective market prices and securities income accrual (e.g., dividends). At payout date 202, the restrictions imposed on the plan participant are lifted and she may dispose of the sponsor securities or receive their equivalent monetary value.

FIG. 2b: Compensation Time Schedule

FIG. 2b shows a timeline of a deferral period 200, during which a plan participant is restricted to have a long investment position in sponsor securities 101. In step 201, at the outset of deferral period 200, a long investment position in a pre-determined quantity of sponsor securities 101 is established on behalf of the plan participant, wherein the pre-determined quantity of sponsor securities constitutes a security-based deferred compensation incentive award.

In step 203, peer securities are selected from the peer securities universe and quantities of each in which to establish a short investment position are determined according to a statistical procedure disclosed herein.

In the example illustrated in FIG. 2b, a traditional security-based deferred compensation incentive plan is transformed to a security-based deferred compensation incentive plan under the invention at a point in time during the deferral period 200.

In steps 205 and 207, a short investment position in the determined quantities of peer securities 103 and a long investment position in an amount of investment assets 105 which were previously selected by the plan participant are established on behalf of the plan participant at a point in time during the deferral period.

During the remainder of the deferral period 200, the investment performance of sponsor securities 101, peer securities 103, and investment assets 105 fluctuates with their respective market prices and securities income accrual (e.g., dividends). At payout date 202, the restrictions imposed on the plan participant are lifted and she may dispose of the sponsor securities or receive their equivalent monetary value.

In an example, a security-based deferred compensation incentive award under the disclosure is applied with respect to a plan sponsor, i.e., a company sponsoring such a plan offers it to a plurality of plan participants of the plan sponsor.

In another example, a security-based deferred compensation incentive award under the disclosure is applied with respect to a single plan participant.

FIG. 3a: Securities Borrowing and Lending Basic Mechanics

Securities lending refers to the lending of securities 300 by a securities lender 302 to a securities borrower 304. The terms of the loan will be governed by a "Securities Lending Agreement", which requires that the borrower provides the lender with a collateral 306 of value equal to or greater than the loaned securities.

Securities lenders domiciled in the United States accept collateral in the form of cash, US government securities, or a Letter of Credit from a bank.

Securities lenders domiciled in certain foreign jurisdictions (e.g., the United Kingdom, the European Union, or Switzerland) may in addition accept collateral in the form of securities (other than the ones loaned), wherein an appropriate haircut is applied to the value of the securities collateral such that their discounted value is equal to or greater than the value of the loaned securities.

The agreement is a contract enforceable under relevant law, which is specified in the agreement. It is possible, and not uncommon, for an entity domiciled in the United States to borrow securities from a securities lender domiciled in a foreign country, and pledge other securities as collateral.

When a security is loaned, the title of the security transfers to the borrower. This means that the borrower has the advantages of holding the security, as they become the full legal and beneficial owner of it. Specifically, the borrower will receive all coupon and/or dividend payments, and any other rights such as voting rights. In most cases, these dividends or coupons must be passed back to the lender which is referred to as "manufactured dividends".

As payment for the loan, the parties negotiate a fee 308, quoted as an annualized percentage of the value of the loaned securities. If the agreed form of collateral is cash, then the fee may be quoted as a "short rebate", meaning that the lender will earn all of the interest which accrues on the cash collateral, and will "rebate" an agreed rate of interest to the borrower.

FIG. 3b: Phantom Securities Basic Mechanics

Phantom securities 314 is a contractual agreement between a grantor 310 and a grantee 312 of phantom securities that bestow upon the grantee the right to a payment 316 made in cash or securities at a designated time or in association with a designated event in the future, which payment is to be in an amount tied to the market value, and optionally any income generated (e.g., dividends), of an equivalent number of the actual securities underlying the phantom securities contractual agreement. Phantom securities are a liability of the grantor 310 to the grantee 312, which is a bookkeeping debit entry into a phantom account kept for the grantee under the plan. The grantee, therefore, is not actually granted equity in the company. As a result, the grantee does not attain the rights of a minority shareholder such as the right to receive notice of shareholder meetings or any voting rights.

In an example, phantom cash, also known as deferred cash, may also be used as a deferred compensation instrument, wherein the underlying instrument in reference is cash. In a phantom cash example, the grantor is obligated to pay the cash amount agreed upon, plus any interest, at the payout date.

Phantom securities liability 318 is a contractual agreement between a grantor 310 and a grantee 312 of phantom securities liability that bestow upon the grantee the obligation to pay at a designated time or in association with a designated event in the future, which payment 320 is to be in an amount tied to the market value of an equivalent number of the actual securities underlying the phantom securities liability contractual agreement. Phantom securities liability are a liability of the grantee 312 to the grantor 310, which is a bookkeeping credit entry into a phantom account kept for the grantee under the plan.

FIG. 3c: Swap Basic Mechanics

A "Swap" (e.g., a Total Return Swap) may be a bilateral financial contract in which a Party 301 agrees to pay a Counterparty 303 the total return, i.e., interest, dividend and any capital appreciation, of an underlying asset or assets 305 in return for the total return of another underlying asset or assets 307. In one particular type of Total Return Swap, payments exchanged between a party and a counterparty are based on the product of a "notional principal amount" multiplied by the difference in total returns of the reference assets. For example: party 301 and counterparty 303 might agree that:

(1) party 301 will pay counterparty 303 an amount equal to the difference in total returns between commencement and termination of the swap contract, if positive, between assets 305 and assets 307 times the notional principal amount.

(2) party 303 will pay counterparty 301 an amount equal to the difference in total returns between commencement and termination of the swap contract, if positive, between assets 307 and assets 305 times the notional principal amount.

The total return swap may include a fee 309 paid by party 301 to counterparty 303. Furthermore, the total return swap may also require that margin collateral 311 be pledged by party 301 to counterparty 303 at the commencement of the swap contract to secure any future payoff, which is returned at the termination of the swap contract to party 301 if all payoffs were made as the contract specified.

The Total Return Swap provides a mechanism for Party 301 to (i) accept the economic benefit of ownership in, and to establish a long investment position, in assets 305, without having to purchase those assets; and (ii) assume the economic liability of a securities borrow and short-sale of, and establish a short investment position in, assets 307, without having to borrow and short-sell those assets.

This particular example of a total return swap can be constructed with two separate swap agreements, wherein in one swap agreement the total return of assets 305 is exchanged with a LIBOR based fee plus a spread, and wherein in another swap agreement the total return of assets 307 is exchanged with a LIBOR based fee minus a spread, wherein the LIBOR based fees cancel each other.

FIG. 3d: Secured Loan Basic Mechanics

A secured loan 317 is the provision of one of cash, securities, or a letter of credit from lender 315 to borrower 313, wherein borrower 313 pledges collateral 319 to secure the loan. A fee 321, often express as an interest rate, is usually due from borrower 313 to lender 315 for the collateral loan 317 provision.

In an example, borrower 313 retains legal ownership of collateral 319, but in the event that borrower 313 defaults, lender 315 may take possession of the securities used as collateral and may sell them to regain some or all of the amount loaned.

In another example, the secured loan transaction is constructed as a repurchase agreement, or as a sell and buy-back agreement, wherein legal ownership of the collateral 319 is transferred to the lender at the time the secured loan is made.

A repurchase agreement, also known as a Repo, is the sale of securities together with an agreement for the seller to buy back the securities at a later date. The repurchase price should be greater than the original sale price, the difference effectively representing interest, sometimes called the Repo rate. The party that originally buys the securities effectively acts as a lender. The original seller is effectively acting as a borrower, using their security as collateral for a secured cash loan at a fixed rate of interest.

A Repo is economically similar to a secured loan, with the buyer (effectively the lender) receiving securities for collateral to protect herself against default by the seller (effectively the borrower). Unlike a secured loan, however, legal title to the securities passes from the seller to the buyer. Securities income (e.g., dividends or interest payable to the owner of the securities) falling due while the Repo buyer owns the securities are usually passed directly onto the Repo seller. A key aspect of Repos is that they are legally recognized as a single transaction and not as a disposal and a repurchase for tax purposes.

FIG. 4a: Securities Example ("System 100")

FIG. 4a illustrates an example method that can be practiced by system 100. (System 100 is disclosed in further detail in FIG. 4d, FIG. 4g, and in FIGS. 5-8).

In step 450, a predetermined amount of sponsor securities 101 are contributed, via a processor of a computer, to a deferred compensation plan account, wherein the contribution constitutes a security-based deferred compensation incentive award associated with a predetermined restriction date or condition (e.g., continued employment), and wherein the award has a fair market value.

In step 451, a statistical procedure is run by a processor and operates on a database to automatically determine a peer securities 103 constituency and a quantity of each peer security in which to establish a short investment position. This step is one of the inventive concepts of a preferred embodiment of the present invention.

In step 452, the determined quantities of peer securities are automatically borrowed from one or more securities lender, wherein the plan account assumes the securities loan liability.

In step 453, the borrowed peer securities are sold short on behalf of the plan account on the securities markets, wherein cash proceeds are received from the short sale.

In step 454, investment assets 105 which were previously selected by the plan participant are automatically purchased on the securities market.

The borrowing and short-selling of the peer securities 103 and the purchasing of investment assets 105 are done without requiring any further capital contributions into the plan account and such that the fair market value of the award remains the same (notwithstanding securities trading, securities borrowing, and other costs).

FIG. 4b: Phantom Securities Example ("System 200")

FIG. 4b illustrates an example method that can be practiced by system 200. (System 200 is disclosed in further detail in FIG. 4e, FIG. 4h, and in FIGS. 5-8).

In step 460, a predetermined amount of phantom sponsor securities, referencing actual sponsor securities 101, are debited as an asset to a deferred compensation phantom plan account, via a processor of a computer, wherein the debiting of the predetermined phantom sponsor securities constitutes a security-based deferred compensation incentive award associated with a predetermined restriction date or condition (e.g., continued employment), and wherein the award has a fair market value.

In step 461, a statistical procedure is run by a processor and operates on a database to automatically determine a peer securities 103 constituency and a quantity of each peer security in which to establish a short investment position. This step is one of the inventive concepts of a preferred embodiment of the present invention.

In step 462, the determined quantities of phantom peer securities, referencing actual peer securities 103, are automatically credited as a liability to the deferred compensation plan account.

In step 464, phantom investment assets, referencing actual investment asset 105 previously selected by the plan participant, are automatically debited as an asset to the deferred compensation phantom plan account.

The crediting of the phantom peer securities and the debiting of the phantom investment assets are done such that the fair market value of the award remains the same.

FIG. 4c: Swap Example ("System 300")

FIG. 4c illustrates an example method that can be practiced by system 300. (System 300 is disclosed in further detail in FIG. 4f, FIG. 4i, and in FIGS. 5-8).

In step 470, a predetermined amount of sponsor securities 101 are contributed to a deferred compensation plan account, via a processor of a computer, wherein the contribution constitutes a security-based deferred compensation incentive award associated with a predetermined restriction date or condition (e.g., continued employment), and wherein the award has a fair market value.

In step 471, a statistical procedure is run by a processor and operates on a database to automatically determine a peer securities constituency and a quantity of each peer security in which to establish a short investment position. This step is one of the inventive concepts of a preferred embodiment of the present invention.

In step 472, a total return swap is automatically contracted with one or more swap dealers to establish a short investment position in the determined quantities of peer securities 103.

In step 474, a total return swap is automatically contracted with one or more swap dealers to establish a long investment position in an amount of investment assets 105, which were previously selected by the plan participant.

The contracting of the short investment position in the peer securities 103 and the long investment position in the investment assets 105 is done such that the fair market value of the total return swaps at initiation is zero such that the fair market value of the award remains the same.

FIG. 4d: Securities Example ("System 100")

In a preferred example, a predetermined amount of sponsor securities 101 are contributed by a plan sponsor 400, via a financial transactions engine 433 in communication with a plan administration computer 444, to a deferred compensation plan account 402.

The contribution constitutes a security-based deferred compensation incentive award which is associated with a predetermined restriction date and/or condition (e.g., continued employment), referred to as the payout date, and wherein the award has a fair market value.

In an example, the predetermined amount of sponsor securities constitutes compensation for goods or services provided, or which will be provided, by the plan participant to the plan sponsor.

In another example, the predetermined amount of sponsor securities are purchased by the plan participant, e.g., a stock purchase plan, wherein the payment is made at the time the sponsor securities are purchased, or wherein the plan sponsor or a third party provides a loan to the plan participant to finance their purchase.

Plan account 402, in different examples, is a separate entity trust, a Rabbi trust, an account owned by plan participant 408, or an account owned by plan sponsor 400. In another example, plan account 402 holds sponsor securities 101 and another account (not shown in FIG. 4d) is used to set up a short investment position in peer securities 103 and a long investment position in investment assets 105.

In another example, plan account 402 is a commingled account of a plurality of plan participants 408, wherein sponsor securities 101 are the aggregate sponsor securities holdings of the plurality of plan participants 408.

Furthermore at the time of the deferred award granting, or at the time of an existing plan's transformation at a point in time during the deferral period 200, plan administration computer 444 performs the steps, main one of which is a statistical procedure, which are required to (disclosed in further detail in FIGS. 5-8):
  (i) determine a peer securities constituency; and
  (ii) determine a quantity of each peer security in the peer securities constituency, according to a disclosed statistical procedure, in which a short investment position will be established; wherein plan administration computer 444 communicates (i) and (ii) above to a securities borrowing and lending engine 477 (a standard in the financial industry, e.g., 4Sight™, Sungard™, Equilend™, or AQS™ securities borrowing and lending engines), and to a securities trading engine 488 (a standard in the financial industry, e.g., Sungard™ securities trading engine), together with:
  (iii) an investment assets constituency, and the respective quantities of each investment asset, which were preselected by the plan participant 408, via a user interface 466, and stored on a database included in plan administration computer 444.

Further still, the following steps are taken simultaneously or with close enough proximity so as to avoid non-delivery on settlement date (e.g., same trading day):
  a) Securities borrowing and lending engine 477, in communication with plan administration computer 444, automatically borrows the determined quantities of peer securities 103 from one or more securities lender 406, wherein plan account 402 assumes the peer securities loan liability.
  b) Securities trading engine 488, in communication with plan administration computer 444, automatically short sells peer securities 103 on behalf of plan account 402 on securities markets 412, wherein cash proceeds 413 are received from the short sale.

c) Securities trading engine 488, in communication with plan administration computer 444, automatically purchases the pre-selected quantities of investment assets 105 on securities markets 412.

The short investment position in the peer securities 103 and the long investment position in the investment assets 105 are established without requiring any further capital contributions by neither plan sponsor 400 nor plan participant 408, such that the fair market value of the award remains the same, notwithstanding any trading costs.

Cash serves as the investment asset of default if no other choice of investment assets is made as to how to invest the peer securities short sale cash proceeds.

d) Securities borrowing and lending engine 477, in communication with plan administration computer 444, automatically pledges a collateral 415 ("Collateral Pledge") to securities lender 406 to secure the peer securities 103 loan. The form of collateral (e.g., cash or securities) must be one that is acceptable by securities lender 406 and is hitherto referred to as securities-lender-eligible collateral. The required value of collateral pledge 415 is usually either 100% or 102% of the value of the peer securities loan, wherein a haircut is usually applied to non-cash collateral.

In an example wherein securities lender 406 is willing and able to accept investment assets 105 and sponsor securities 101 as eligible collateral (e.g., a securities lender domiciled in the United Kingdom or Switzerland that is willing to accept equity shares as collateral), securities borrowing and lending engine 477, in communication with plan administration computer 444, automatically pledges the required amount of investment assets 105 and sponsor securities 101 as collateral pledge 415 to securities lender 406 to secure the peer securities loan liability. Notice in this example that the peer securities short sale cash proceeds 413 are used to purchase investment assets 105.

In another example, wherein securities lender 406 is unwilling or unable to accept investment assets 105 and sponsor securities 101 as eligible collateral in collateral pledge 415 (e.g., a securities lender domiciled in the United States specifying cash the only eligible form of collateral), then two additional steps are required, together commonly referred to as a "collateral transformation" or "collateral upgrade". In this example, secured loan administration engine 499, in communication with plan administration computer 444, automatically:

e.1) borrows the required amount of securities-lender-eligible collateral 426 (e.g., cash, US treasury debt, or a letter of credit) from collateral lender 414; and e.2) pledges a required amount of investment assets 105 and sponsor securities 101 in collateral pledge 423 to collateral lender 414 to secure the securities-lender-eligible collateral loan 426.

Furthermore in this example, the beneficial owner of plan account 402 agrees to pay a fee 424 to collateral lender 414 for lending securities-lender-eligible collateral 426.

Lastly in this example, the following step completes the "collateral transformation":

f) Securities borrowing and lending engine 477, in communication with plan administration computer 444, automatically pledges the borrowed securities-lender-eligible collateral 426 in collateral pledge 415 to securities lender 406 to secure the peer securities loan liability.

A skilled artisan would recognize that securities-lender-eligible collateral 426 in the form of cash and the short sale cash proceeds 413 are fungible, and could be used interchangeably to either purchase investment assets 105 or as a cash collateral pledge 415 to securities lender 406.

Commingled Account and Pooled Collateral

In an example wherein plan account 402 is a commingled account of a plurality of plan participants 408, the quantities of peer securities borrowed and sold short is the aggregation of all participants' peer securities, and the quantities of investment assets purchased is the aggregation of all participants' investment assets.

Furthermore in an example wherein plan account 402 is a commingled account of a plurality of plan participants, securities held in the commingled account are pooled together when pledged as collateral pledge 415 to secure the peer securities loan liability, and if a "collateral transformation" is required, also when pledged as collateral pledge 423 to secure the securities-lender-eligible collateral loan. Plan administration computer then keeps an internal recordkeeping accounting system tracking each participant's assets and liabilities. It has been long known that pooling assets minimizes risk, which in this example means that aggregate investment positions of a plurality of plan participants 408 is less risky than if taken separately, and in this lies the benefit of this example, which leads under most circumstances to lower overall requirement for collateral pledge 415 by securities lender 406, and if applicable, as lower overall requirement for collateral pledge 423 by collateral lender 414.

Optionally (not shown in Figure), plan sponsor 400 or plan participant 408, provide securities lender 406, and/or to collateral lender 414, if applicable, an additional indemnity to cover any losses above and beyond the equity capital in plan account 402. The indemnity may in an example include pledging of additional assets.

During the Remainder of the Deferral Period

Adding/Subtracting to Collateral Pledge(s)

During the remainder of the restriction period, prices of sponsor securities 101, peer securities 103, and investment assets 105 change, which may lead to a change in securities lender's 406 requirement for collateral 415, and if relevant, also to a change in collateral lender's 414 requirement for collateral pledge 423. In this case, step d), and if applicable, also steps e.1), e.2), and f) are either repeated or reversed, commensurate with either an increase or decrease in minimum collateral requirements. The change in required collateral is communicated via securities borrowing and lending engine 477, and if relevant, also via secured loan administration engine 499, to plan administration computer 444, and in response, investment assets 105 and sponsor securities 101 are automatically either added to or subtracted from collateral pledge 415, and if relevant, also to/from collateral pledge 423, as needed in order to meet the changed collateral requirement(s).

Rebalancing

An additional feature of the system is the periodic rebalancing of the investment positions of the deferred compensation plan. Rebalancing is changing the investment positions without requiring any additional capital contributions to plan account 402, such that the existing fair market value of the award stays the same (notwithstanding trading costs). For example, a rebalancing is selling some of investment assets 105 and using the cash proceeds from the sale to buy-back some of the short-sold peer securities 103.

In a preferred example, any rebalancing is between peer securities 103, between investment assets 105, or between peer securities 103 and investment assets 105. The long investment position in sponsor securities 101 is left as-is during the deferral period, since it is imposed upon the plan participant until the payout date. Reducing the sponsor securities position is against the interest of the sponsor, as it reduces the alignment of incentives. Adding to the sponsor securities position is not in the benefit of the plan participant, as she would become more exposed to the concentration risk.

In an example, rebalancing automatically takes place periodically, e.g., every month. In another example, rebalancing automatically takes place according to a pre-set rule, e.g., if the market values of the investment positions deviate by more than a pre-set threshold relative to the market values prescribed by the statistical procedure.

Rebalancing to Meet Margin Requirement

A combination of declines in the values of sponsor securities 101 and investment assets 105, and increase in the value of peer securities 103, can in severe circumstances lead to collateral requirements by securities lender 406 that exceed the available collateral in plan account 402. In this case, steps a), b), and c) above are partially reversed, wherein securities trading engine 488, in communication with plan administration computer 444, automatically sells an amount of investment assets 105 and buys-back an amount of peer securities 103, without requiring any additional capital contribution, and wherein securities borrowing and lending engine 477, in communication with plan administration computer 444, automatically returns the bought-back peer securities 103 to securities lender 406. Steps a), b), and c) are so reversed until the required collateral 415 by securities lender 406 declines to a level commensurate with the available collateral in plan account 402.

Switching Investment Assets

In an example, plan participant 408 is allowed, via user interface 466 in communication with plan administration computer 444, to change the investment assets constituency or the investment proportions of each investment asset. Upon a change in investment assets choice, securities trading engine 488, in communication with plan administration computer 444, automatically issues sell and buy orders on securities markets 412, to adjust the investment assets holdings to the newly selected allocation, wherein no additional capital contribution into the plan account 402 are required.

Rebalancing to Recalibrated Quantities

In an optional example, plan administration computer 444 periodically (e.g., in real-time, daily, weekly, etc. . . . ) repeats the steps required to:
(i) determine the peer securities constituency; and
(ii) determine the quantities of each peer security in the constituency; wherein new data is incorporated into the disclosed statistical procedure, or wherein the methodology of the statistical procedure is revised, which results in different quantities and potentially also a different constituency of peer securities 103, in which a short investment position is to be maintained on balance on behalf of plan participant 408.

Plan administration computer 444 then automatically communicates the new constituency and recalibrated quantities of peer securities 103 to securities borrowing and lending engine 477 and to securities trading engine 488, which in turn automatically issues orders to borrow and sell-short, or buy-back and return, individual peer securities so as to bring the quantities of peer securities 103 borrowed and sold-short on balance to the quantities determined by the re-calibrated statistical procedure. Furthermore in this example, any net cash proceeds 413 from the rebalancing of peer securities 103 is automatically invested into investment assets 105 in the proportions pre-selected by plan participant 408, wherein no additional capital contribution is required. Conversely in this example, any net cash outlay from the rebalancing is automatically obtained by selling investment assets 105 in the proportions pre-selected by plan participant 408, wherein no additional capital contribution is required.

The main benefit of recalibrating and rebalancing is that it increases on average the effectiveness of the return offset between sponsor securities 101 and peer securities 103.

At Payout Date

At payout date of the deferred compensation plan, the deferred compensation positions are automatically liquidated, via the following steps, taken simultaneously or with close enough proximity so as to avoid non-delivery on settlement date (e.g., same trading day):
g) Securities trading engine 488, in communication with plan administration computer 444, automatically sells investment assets 105 and sponsor securities 101, and automatically buys-back peer securities 103, in securities markets 412.
h) Securities borrowing and lending engine 488, in communication with plan administration computer 444, automatically returns borrowed peer securities 103 to securities lender 406, pays any securities lending fee 417, and terminates collateral pledge 415;
and additionally in an example requiring collateral transformation:
i) Secured loan administration engine 499, automatically returns borrowed securities-lender-eligible collateral 426, plus any fee 424, to collateral lender 414, and automatically terminates collateral pledge 423.

Cash left over from the liquidation of the deferred compensation positions, i.e., the plan's net assets at payout date 411, is automatically transferred, via financial transactions engine 433, in communication with plan administration computer 444, to plan participant 408.

A skilled artisan would recognize that instead of full liquidation and transfer of residual cash to plan participant 408 at the payout date, it is possible, in another example, to arrange for a transfer of the plan account's assets and liabilities as-is to plan participant 408.

The disclosure allows the short investment position in peer securities 103 and the long investment position in investment assets 105 to be flexibly liquidated before the payout date for any reason.

Limited Liability

Optionally, a limit is set on the net asset value of plan account 402. For example, the value of the account may be floored at zero, a situation which may arise under severe circumstances due to a combination of a decrease in the value of sponsor securities 101, an increase in the value of peer securities 103, or a decrease in the value of investment assets 105, which erases the entire value of the deferred award. The limit may be achieved by an explicit guarantee by the plan sponsor 400, or it may be achieved by purchasing a put option, or a combination of options, to provide the desired payoff schedule.

FIG. 4e: Phantom Securities Example ("System 200")

In a preferred example, financial transactions engine 433 enters a predetermined amount of phantom sponsor securities 435 as a bookkeeping debit entry registered on a database included in plan administration computer 444 (e.g., plan administration database 507), under plan account 402, which is kept for plan participant 408.

In an example, the predetermined amount of sponsor securities constitutes compensation for goods or services provided, or which will be provided, by the plan participant to the plan sponsor.

The bookkeeping debit entry constitutes a security-based deferred compensation incentive award which is associated with a predetermined restriction date or condition (e.g., continued employment), referred to as the payout date, and wherein the award has a fair market value.

Phantom sponsor securities 435 are a contractual agreement between plan sponsor 400 and plan participant 408 that bestow upon plan participant 408 the right to a payment made at the deferred compensation plan's designated payout date, which is to be an amount tied to the market value of an equivalent number of actual sponsor securities 101 (e.g., equity shares issued by the sponsor company) underlying the phantom securities contractual agreement.

Furthermore at the time of the deferred award granting, or at the time of an existing plan's transformation at a point in time during the deferral period, plan administration computer 444 performs the steps, main one of which is a statistical procedure, which are required to (disclosed in further detail in FIGS. 5-8):
  (i) determine a peer securities constituency; and
  (ii) determine a quantity of each peer security in the peer securities constituency, according to a disclosed statistical procedure, in which a short investment position will be established.

The determined quantities of peer securities are automatically entered by financial transactions engine 433 as a bookkeeping credit entry of phantom peer securities 437 ("Phantom Peer Securities Liability"), which is registered in a database included in plan administration computer 444, under plan account 402, and kept for plan participant 408. Phantom peer securities liability 437 are a contractual agreement between plan sponsor 400 and plan participant 408 that bestow upon plan sponsor 400 the right to a payment at a predetermined date, which is to be an amount tied to the market value of an equivalent number of the actual peer securities 103 underlying the phantom securities contractual agreement.

Furthermore stored on plan administration computer 444 are
  (iii) an investment assets constituency, and the respective quantities of each investment asset, which were pre-selected by plan participant 408, via a user interface 466, and stored on a database included in plan administration computer 444.

The pre-selected quantities of investment assets are automatically entered, by financial transactions engine 433, as a bookkeeping debit entry of phantom investment assets 439, which are registered in a database included in plan administration computer 444, under plan account 402, and kept for plan participant 408. Phantom investment assets 439 are a contractual agreement between plan sponsor 400 and plan participant 408 that bestow upon plan participant 408 the right to a payment made at a predetermined date, which is to be an amount tied to the market value of an equivalent number of the actual investment assets 105 underlying the phantom securities contractual agreement.

The fair liability value of the phantom peer securities 437 is equal to the fair asset value of the phantom investment assets 439, such that the fair value of the security-based deferred compensation incentive award remains the same after the short investment position in the peer securities 103 and the long investment position in the investment assets 105 are established.

Phantom cash serves as the default investment asset, if no other investment assets choice is made.

Taken together, phantom sponsor securities 435, phantom peer securities liability 437, and phantom investment assets 439 represent a net liability of plan sponsor 400 towards plan participant 408 to pay the net equivalent monetary value, in cash or securities, of actual sponsor securities 101, less the monetary value of actual peer securities 103, and plus the monetary value of actual investment assets 105.

In another example, a designated computer engine that is distinct from the financial transactions engine 433 performs the entering of bookkeeping debit and credit entries into the account of the plan participant.

In an example, plan sponsor 400 keeps the deferred compensation net liability towards plan participant 408 unfunded, i.e., the plan sponsor intends to pay the net assets at payout 411 from operating profits or other sources.

In another example, plan sponsor 400 funds the net liability towards plan participant 408 by commensurate purchasing or issuing of actual sponsor securities 101; by borrowing and short-selling of actual peer securities 103; and by purchasing of actual investment assets 105.

In another example, plan sponsor 400 funds the net liability towards plan participant 408 by commensurate purchasing or issuing of actual sponsor securities; by establishing a short investment position in peer securities 103 via a total return swap agreement with a swap dealer; and by establishing a long investment position in investment assets 105 via a total return swap agreement with a swap dealer.

During the Remainder of the Deferral Period

Rebalancing

An additional feature of the system is the periodic rebalancing of the investment positions of the deferred compensation plan. Rebalancing is changing the investment positions such that the fair market value of the award stays the same. For example, a rebalancing is financial transactions engine 433 entering a bookkeeping credit entry for some of the phantom investment assets 439, thus reducing the long position in investment assets 105, and simultaneously entering a bookkeeping debit entry for some of the phantom peer securities 437, thus reducing the short position in peer securities 103, such that the fair market value of the award remains unchanged.

In a preferred example, any rebalancing is between phantom peer securities liability 437, between phantom investment assets 439, or between phantom peer securities liability 437 and phantom investment assets 439. In the preferred example, the long investment position in sponsor securities 101, established via a debit entry of phantom sponsor securities 435, is left as-is during the deferral period, since it is imposed upon the plan participant until the payout date.

In an example, rebalancing automatically takes place periodically, e.g., every month. In another example, rebalancing automatically takes place according to a pre-set rule, e.g., if the market values of the investment positions deviate by more than a pre-set threshold relative to the market values prescribed by the statistical procedure.

Switching Investment Assets

In an example, plan participant 408 is allowed, via user interface 466 in communication with plan administration computer 444, to change the investment assets constituency or the investment proportions of each investment asset during the deferral period. Upon a change in investment assets choice, financial transactions engine 433, in communication with plan administration computer 444, automatically credits the appropriate amount of phantom investment assets 439 that were un-selected and debits an equivalent amount of the phantom investment assets 439 that were selected into plan account 402, such that the fair market value of the deferred award before the rebalancing remains unchanged.

Rebalancing to Recalibrated Quantities

Optionally in an example, plan administration computer 444 periodically (e.g., in real-time, daily, weekly, etc. . . . ) repeats the steps required to:
  (i) determine the peer securities constituency; and
  (ii) determine the quantities of each peer security in the constituency; wherein new data is incorporated into the disclosed statistical procedure, or wherein the methodology of the statistical procedure is revised, which results in different quantities and potentially also a different constituency of peer securities 103, in which a short investment position is to be maintained on balance.

Financial transactions engine 433, in communication with plan administration computer 444, then automatically debits or credits an appropriate amount of each phantom peer security to bring the balance of phantom peer securities 437 to equal the balance determined by the re-calibrated statistical procedure. Furthermore, financial transactions engine 433, in communication with plan administration computer 444, then automatically credits or debits, respectively, an appropriate amount of phantom investment assets 439, such that the fair market value of the award before the rebalancing remains unchanged.

At Payout Date

At payout date of the deferred compensation plan, a payment in either cash or securities for the monetary equivalent of the net assets value 411 of account 402 is automatically issued from plan sponsor 400 to plan participant 408, which is facilitated by financial transactions engine 433, in communication with plan administration computer 444.

A skilled artisan would recognize that it is possible to arrange for the transfer of actual sponsor securities 101, actual peer securities 103 short-sale liability, and actual investment assets 105, instead of their net monetary value at payout.

In an example, the payout date of the phantom peer securities 437 and phantom investment assets 439 is the same as the payout date of the phantom sponsor securities 435.

In another example, the payout date of the phantom peer securities 437 and/or phantom investment assets 439 is different than the payout date of the phantom sponsor securities 435 and in particular the former may pay-out before the phantom sponsor securities pays out. In a particular example, the phantom peer securities 437 and phantom investment assets 435 have daily maturity, i.e., any fair market value change is settled daily and then the same or other positions are rolled over into new or renewed phantom securities agreements.

The disclosure allows the short investment position in peer securities 103 and the long investment position in investment assets 105 to be flexibly liquidated, and any balance settled, before the payout date for any reason.

Limited Liability

Optionally, a limit is set on any net liability of the plan participant 408 towards the plan sponsor 400. Such net liability may arise under severe circumstances due to a combination of a decrease in the value of sponsor securities 101, an increase in the value of peer securities 103, or a decrease in the value of investment assets 105, which erases more than the value of the deferred award.

FIG. 4f: Swap Example ("System 300")

In a preferred embodiment, a predetermined amount of sponsor securities 101 are contributed by a plan sponsor 400, via financial transactions engine 433 in communication with a plan administration computer 444, to a deferred compensation plan account 402.

In an example, the predetermined amount of sponsor securities constitutes compensation for goods or services provided, or which will be provided, by the plan participant to the plan sponsor.

In another example, the predetermined amount of sponsor securities are purchased by the plan participant, e.g., a stock purchase plan, wherein the payment is made at the time the sponsor securities are purchased, or wherein the plan sponsor or a third party provides a loan to the plan participant to finance their purchase.

The contribution constitutes a security-based deferred compensation incentive award which is associated with a predetermined restriction date or condition (e.g., continued employment), referred to as the payout date, and wherein the award has a fair market value.

Plan account 402, in different examples, is a separate entity trust, a Rabbi trust, an account owned by plan participant 408, or an account owned by plan sponsor 400. In another example, plan account 402 holds sponsor securities 101 and another account (not shown in Figure) is utilized to establish a short investment position in peer securities 103 and a long investment position in investment assets 105.

In another example, plan account 402 is a commingled account of a plurality of plan participants 408, wherein sponsor securities 101 are the aggregate sponsor securities holdings of plan participants 408.

Furthermore at the time of the deferred award granting, or at the time of an existing plan's transformation at a point in time during the deferral period 200, plan administration computer 444 performs the steps, main one of which is a statistical procedure, which are required to (disclosed in further detail in FIGS. 5-8):
  (i) determine a peer securities constituency; and
  (ii) determine a quantity of each peer security in the peer securities constituency, according to a disclosed statistical procedure, in which a short investment position will be established; wherein plan administration computer 444 communicates (i) and (ii) above to a swap administration engine 455 (a standard in the financial industry, e.g., 4Sight™ or Sungard™ swap administration engines), together with:

(iii) an investment assets constituency, and the respective quantities of each investment asset, which were pre-selected by plan participant 408, via a user interface 466, and stored on a database maintained by plan administration computer 444.

Further still, swap administration engine 455, in communication with plan administration computer 444, automatically contracts a total return swap with one or more swap dealer 404, on behalf of plan account 402, to establish a short investment position in the determined quantities of peer securities 103 and a long investment position in the pre-selected amount of investment assets 105, wherein the swap contract specifies the parties agree that:

a) the notional principle amount of the swap equals the aggregate market value of the determined quantities of peer securities 103 and the pre-selected quantities of investment assets 105 at the time the swap agreement is contracted;

Cash balances, or cash borrowing, serve as the investment asset of default to equalize the aggregate market value of the peer securities 103 and investment assets 105.

b) an amount will be paid to swap dealer 404, by the beneficial owner of deferred compensation account 402, equaling the difference, if positive, between the total return 403 of peer securities 103 and the total return 405 of investment assets 105, accrued between commencement and termination of the swap contract, times the notional principal amount;

c) an amount will be paid by swap dealer 404, to the beneficial owner of deferred compensation account 402, equaling the difference, if positive, between the total return 405 of investment assets 105 and the total return 403 of peer securities 103, accrued between commencement and termination of the swap contract, times the notional principal amount;

d) a fee 407 will in addition be paid to swap dealer 404, by the beneficial owner of deferred compensation account 402; and e) the beneficial owner of plan account 402, upon commencement of the swap agreement, will pledge a certain amount of margin collateral 409 to swap dealer 404 to secure any future liability arising due to the swap agreement. The required value of margin collateral 409 is usually the $99^{th}$ percentile loss (of the swap agreement) over a 5-day period, wherein a haircut is usually applied to non-cash collateral.

Notice the fair market value of the swap contract is zero at initiation such that the fair market value of the security-based deferred compensation incentive award is unchanged by the establishing of the short investment position in peer securities 103 and long investment position in investment assets 105 via the total return swap agreement, notwithstanding the costs of setting up the swap.

In an example wherein swap dealer 404 is willing and able to accept sponsor securities 101 as eligible margin collateral 409, swap administration engine 455, in communication with plan administration computer 444, automatically pledges sponsor securities 101 as margin collateral 409 to swap dealer 404 to secure any future liability arising due to the swap agreement.

In another example, wherein swap dealer 404 is unwilling or unable to accept sponsor securities 101 as eligible margin collateral 409 (e.g., if the total return swap is cleared via a central counterparty (CCP) specifying cash the only eligible form of collateral), then two additional steps are required, together commonly referred to as a "collateral transformation" or "collateral upgrade". In this example, secured loan administration engine 499, in communication with plan administration computer 444, automatically:

f.1) borrows the required amount of swap-dealer-eligible collateral 425 (e.g., cash, US treasury debt, or a letter of credit) from one or more collateral lender 414; and f.2) pledges a required amount of sponsor securities 101 as a collateral pledge 423 to collateral lender 414 to secure the swap-dealer-eligible collateral loan 425.

Furthermore in this example, the beneficial owner of plan account 402 agrees to pay a fee 424 to collateral lender 414 for lending the swap-dealer-eligible collateral 425.

Lastly in this example, the following step completes the "collateral transformation":

g) Swap administration engine 455, in communication with plan administration computer 444, automatically pledges the borrowed swap-dealer-eligible collateral 425 as margin collateral 409 to swap dealer 404 to secure any future liability arising due to the swap agreement.

In an example, the short investment position in peer securities 103 and the long investment position in investment assets 105 are established via a plurality of total return swap agreements. For example, the short investment position in peer securities 103 is established via one total return swap and the long investment position in investment assets 105 is established via another total return swap. Another example is one wherein each position in a peer security and each position in an investment asset is established via a separate swap agreement.

In an example, the short investment position in peer securities 103 and the long investment position in investment assets 105 are established via a plurality of contracts for differences (CFDs), which are considered security-based swaps in the United States.

In an example, the same short investment position in peer securities 103 and the same long investment position in investment assets 105 are achieved via other financial derivatives (e.g., futures, forwards, or options).

Optionally (not shown in Figure), plan sponsor 400 or plan participant 408, provide swap dealer 404, and/or to collateral lender 414, if applicable, an additional indemnity to cover any losses above and beyond the equity capital in plan account 402. The indemnity may in an example involve pledging of additional assets.

Commingled Account and Pooled Collateral

In an example wherein plan account 402 is a commingled account of a plurality of plan participants 408, the swap agreement specifies the short investment position in peer securities 103 is the aggregation of all plan participants' short investment positions, and the long investment position in investment assets 105 is the aggregation of all plan participants' long investment positions. Plan administration computer 444 then keeps an internal accounting system of each participant's assets and liabilities. It has been long known that pooling assets minimizes risk, which in this example means that aggregate investment positions of a plurality of plan participants 408 is less risky than if taken separately, and in this lies the benefit of this example, which leads under most circumstances to lower overall requirement for margin collateral 409 by swap dealer 404.

During the Remainder of the Deferral Period and Swap Life

Adding/Subtracting to Collateral

During the span of the swap contract, prices of sponsor securities 101, peer securities 103, and investment assets 105 change, which may lead to a change in swap dealer's 404 requirement for margin collateral 409, and if relevant, also to a change in collateral lender's 414 requirement for collateral 423. The change in required collateral is communicated via swap administration engine 455, and if relevant, also via secured loan administration engine 499, to plan administration computer 444, and in response, sponsor securities 101 are automatically either added to or subtracted from margin collateral 409, and if relevant, to collateral pledge 423, as needed in order to meet the changed collateral requirement(s).

Rebalancing

An additional feature of the system is the periodic rebalancing of the investment positions of the deferred compensation plan. Rebalancing is changing the investment positions without requiring any additional capital contributions to plan account 402 such that the fair market value of the award stays the same (notwithstanding swap and other costs). For example, a rebalancing is novating the swap agreement such that on balance a smaller short position is maintained in peer securities 103 and a smaller long position is maintained in investment assets 105 on balance, such that the fair market value of the swap remains the same after the rebalancing.

In a preferred example, any rebalancing is between peer securities 103, between investment assets 105, or between peer securities 103 and investment assets 105. In a preferred example, the long investment position in sponsor securities 101 is left as-is during the deferral period, since it is imposed upon the plan participant until the payout date.

In an example, rebalancing automatically takes place periodically, e.g., every month. In another example, rebalancing automatically takes place according to a pre-set rule, e.g., if the market values of the investment positions deviate by more than a pre-set threshold relative to the market values prescribed by the statistical procedure.

Rebalancing to Meet Margin Requirement

A combination of declines in the values of sponsor securities 101 and investment assets 105, and increase in the value of peer securities 103, can in severe circumstances lead to collateral requirements by swap dealer 404 that exceed the available collateral in plan account 402. In this circumstance, the existing swap agreement is automatically novated by swap administration engine 455, in communication with plan administration computer 444, by reducing the long investment position in investment assets 105 and reducing the short investment position in peer securities 103, such that the fair market value of the swap remains unchanged, until the required margin collateral 409 by swap dealer 404, and if applicable also the requirement for collateral 423 by the collateral lender, declines to a level commensurate with the available collateral in plan account 402.

Switching Investment Assets

In an example, plan participant 408 is allowed, via user interface 466 in communication with plan administration computer 444, to change the investment assets constituency or the investment proportions of each investment asset during the deferral period. Upon a change in investment assets choice, swap administration engine 455, in communication with plan administration computer 444, automatically novates the existing swap agreement to the newly selected investment assets constituency, such that the net present value of the swap remains the same and without requiring any additional capital contribution by plan sponsor 400 or plan participant 408.

Rebalancing to Recalibrated Quantities

Optionally in an example, plan administration computer 444 periodically (e.g., in real-time, daily, weekly, etc. . . . ) repeats the steps required to:
  (i) determine a peer securities constituency; and
  (ii) determine a quantity of each peer security in the peer securities constituency;
    wherein
new data is incorporated into the disclosed statistical procedure, or wherein the methodology of the statistical procedure is revised, which results in different quantities and potentially also a different constituency of peer securities 103, in which a short investment position is to be maintained on balance via the total return swap.

Plan administration computer 444 then automatically communicates the re-calibrated constituency and quantities of peer securities 103 to swap administration engine 455, which in turn automatically novates the existing swap agreement, or contracts for a new swap agreement, for the re-calibrated peer securities constituency and quantities. Furthermore in this example, any net reduction in the aggregate short investment position in peer securities 103 due to the rebalancing to the recalibrated quantities is accompanied by a reduction in the aggregate long investment position in investment assets 105, in the pre-selected investment assets proportions, such that the existing fair market value of the swap remains the unchanged due to the rebalancing.

Conversely in this example, any net increase in the aggregate short investment position in peer securities 103 due to the rebalancing to the recalibrated quantities is accompanied by an increase the aggregate long investment position in investment assets 105, in the pre-selected investment assets proportions, such that the existing fair market value of the swap remains unchanged due to the recalibration.

At Payout Date

At payout date of the deferred compensation plan, the swap administration engine 455, in communication with plan administration computer 444, automatically performs, in simultaneity or with close enough proximity so as to avoid non-delivery on settlement date (e.g., same trading day), the following steps:
  h) returns margin collateral 409 from swap dealer 404 to plan account 402; and
  i) facilitates a payment made by swap dealer 404 to plan account 402, if the net payoff (inclusive of fee 407) of the swap contract is due from swap dealer 404; or j) facilitates a payment made from plan account 402 to swap dealer 404, if the net payoff (inclusive of fee 407) of the swap contract is due to swap dealer 404.

The form of payment is usually cash, which is raised by securities trading engine 488 (not shown in FIG. 4*f*), in communication with plan administration computer 444, automatically selling an amount of sponsor securities 101 of the required amount in securities market 412.

In an example, the financial transactions engine 433 facilitates the payment to or from swap dealer 404.

In an example wherein a collateral transformation was necessary, secured loan administration engine 499, in communication with plan administration computer 444, automatically performs the following additional steps:

k) returns swap-dealer-eligible collateral 425 from plan account 402 to collateral lender 414.

l) returns sponsor securities collateral pledge 423 from collateral lender 414 to plan account 402.

m) pays fee 424 to collateral lender out of plan account 402, which is raised by securities trading engine 488 (not shown in FIG. 4*f*), in communication with plan administration computer 444, which automatically sells an amount of sponsor securities 101 of the required amount in a securities market 412.

Finally, financial transactions engine 433, in communication with plan administration computer 444, facilitates the transfer of plan account's 402 net assets at payout 411, which is comprised of the remaining sponsor securities 101, plus or minus any net payment received from or paid to swap dealer 404, respectively, less fee 424 paid to collateral lender 414, if applicable.

A skilled artisan would recognize that instead of full liquidation and transfer of residual cash to plan participant 408 at the payout date, it is possible, in another example, to arrange for a transfer of the plan account's assets and liabilities as-is to plan participant 408.

In an example, the payout date of the total return swap providing a short investment position in the determined peer securities 103 and long investment position in the pre-selected investment assets 105 is the same as the payout date of the sponsor securities 101.

In another example, the payout date of the total return swap providing a short investment position in the determined peer securities 103 and long investment position in the pre-selected investment assets 105 is different than the payout date of the sponsor securities. In a particular example, the swap providing the short investment position in peer securities 103 and the swap providing the long investment position in investment assets 105 have daily maturity, i.e., any fair market value change is settled daily and then the same or other positions are rolled over via new or renewed swap agreements.

The disclosure allows the short investment position in peer securities 103 and the long investment position in investment assets 105 to be flexibly liquidated, and any balance settled, before the payout date for any reason.

Limited Liability

Optionally, a limit is set on the net asset value of plan account 402. For example, the value of the account may be floored at zero, a situation which may arise under severe circumstances due to a combination of a decrease in the value of sponsor securities 101, an increase in the value of peer securities 103, or a decrease in the value of investment assets 105, which erases the entire value of the deferred award. The limit may be achieved by an explicit guarantee by the plan sponsor 400, or it may be achieved by purchasing a put option, or a combination of options, or this feature may be incorporated in the swap agreement, to provide the desired payoff schedule.

FIG. 4*g*: Securities Example ("System 100")

FIG. 4*g* shows the main computer engines comprising system 100. The different computers can be separate computer systems or one system including essentially the same components.

In particular, FIG. 4*g* shows the plan administration computer 444, which is disclosed in further detail in FIGS. 5-8. Also shown are the financial-industry standard computer engines:

Financial transactions engine 433, e.g., a SWIFT-based financial transactions engine, which is used to send cash and securities from one account to another.

Securities borrowing and lending engine 477, e.g., 4Sight™, Sungard™, Equilend™, or AQS™ securities borrowing and lending engines, which is used to borrow (and lend) securities, and to pledge and return collateral to secure the liability arising from a securities loan.

Securities transactions engine 488, e.g., Sungard™ trading engine, which is used to buy and sell securities on the securities markets.

Secured loan administration engine 499 (optionally), e.g., 4Sight™ or Sungard™ Repo trading engines, which is used to borrow and return securities-lender-eligible collateral, and to pledge and return securities as collateral to secure the securities-lender-eligible collateral loan in a process known as "collateral transformation" or "collateral upgrade".

Lastly shown is the user interface 466, of which examples are disclosed in FIGS. 13*a*-13*c*, and through which the plan participant freely chooses an investment assets portfolio out of a pre-populated menu.

FIG. 4*h*: Phantom Securities Example ("System 200")

FIG. 4*h* shows the main computer engines comprising system 200. The different computers can be separate computer systems or one system including essentially the same components.

In particular, FIG. 4*h* shows the plan administration computer 444, which is disclosed in further detail in FIGS. 5-8. Also shown are the financial-industry standard computer engines:

Financial transactions engine 433, e.g., a SWIFT-based financial transactions engine, which is used to send cash from one account to another, and to enter debit and credit bookkeeping entries of phantom securities into a plan account kept for the plan participant.

Lastly shown is the user interface 466, of which examples are disclosed in FIGS. 13*a*-13*c*, and through which the plan participant freely chooses an investment assets portfolio out of a pre-populated menu.

FIG. 4*i*: Swap Example ("System 300")

FIG. 4*i* shows the main computer engines comprising system 300. The different computers can be separate computer systems or one system including essentially the same components.

In particular, FIG. 4*i* shows the plan administration computer 444, which is disclosed in further detail in FIGS. 5-8. Also shown are the financial-industry standard computer engines:

Financial transactions engine 433, e.g., a SWIFT-based financial transactions engine, which is used to send cash and securities from one account to another.

Swap administration engine 455, e.g., 4Sight™ or Sungard™ swap administration engines, which is used to contract for total return swaps with a swap dealer, and to pledge and return collateral to secure any future liability arising from a swap agreement.

Secured loan administration engine 499 (optionally), e.g., 4Sight™ or Sungard™ Repo trading engines, which is used to borrow and return swap-dealer-eligible collateral, and to pledge and return securities as collateral to secure the swap-dealer-eligible collateral loan in a process known as "collateral transformation" or "collateral upgrade".

Lastly shown is the user interface 466, examples of which are disclosed in FIGS. 13a-13c, and through which the plan participant freely chooses an investment assets portfolio out of a pre-populated menu.

It is noted that a "system" according to this disclosure can come in several different configurations. In a first example, a "black box" that covers the embodiment can just cover the plan administrator computer 444. In this example, the plan administration computer performs certain steps as disclosed herein and then transmits instructions to an external engine or engines for performing certain steps as disclosed herein. However, the other engines are not part of the "system" in this first example.

In a second example, the "system" can include the plan administration computer 444 and one or more other external engines (such as one or more of the financial transactions engine 433, the swap administration engine 455, the user interface 466, the securities borrowing and lending engine 477, the securities trading engine 488, and the secured loan administration engine 499). Thus, the "black box" can encompass two or more devices. Similarly, other embodiments such as the method embodiments can also be considered as steps practiced just by a single device under the control of the plan administration computer 444 or as steps that are practiced by the plan administration computer 444 plus at least one other device.

Combinations of Systems 100, 200, and 300

Phantom sponsor securities 435, referencing actual sponsor securities 101, are commonly awarded by plan sponsors to plan participants. The phantom sponsor securities 435 do not however, in most cases, have any collateral value towards third parties. Therefore, phantom sponsor securities 435 cannot be pledged as collateral to a securities lender 406 to secure a securities loan, and they cannot be pledged as collateral to a swap dealer 404 to secure any liability arising due to a swap agreement. System 200 contemplates a short position in peer securities 103 and a long position in investment assets 105 which are established via the crediting and debiting, respectively, of corresponding phantom securities for the very reason that they do not require the pledging of collateral to any third party. The disadvantage of crediting phantom peer securities liability 437 and debiting phantom investment assets 439 to plan participants' accounts is that it requires the plan sponsor (e.g., a company) to be willing and able to do so, which requires approval by its appropriate governing body (e.g., the compensation committee of the board of directors), which may take time and coordination effort to achieve. Getting approval by the appropriate governing body within the sponsor company is challenging in particular because crediting a phantom peer securities liability 437 to plan participants' accounts as part of a deferred compensation plan is not practiced today at all.

Under these circumstances, it is still possible to establish the short position in peer securities 103 and long position in investment assets 105 even if the phantom sponsor securities 435 have no collateral value towards third parties and even if the plan sponsor does not offer corresponding phantom peer securities liability 437 or phantom investment assets 439. All that is required to circumvent the issue of lack of collateral is for the plan participant or plan sponsor to provide eligible collateral from other sources such as the participant's private wealth (e.g., other securities holdings or real estate).

Phantom Securities+Securities Example ("System 400")

System 400 is a useful example that combines elements from both the securities example ("system 100") and the phantom securities example ("system 200"). In this example, the long position in sponsor securities 101 is established via a bookkeeping debit entry of phantom sponsor securities 435. The short position in peer securities 103 is established via borrowing them from securities lender 406 and short-selling them on securities markets 412, wherein cash proceeds are received from the short sale. The long position in investment assets 105 is established via outright purchases on securities markets 412. Collateral pledged to securities lender 406 to secure the peer securities loan is in the form of investment assets 105, and if required, additional assets or indemnity provided by either plan participant 408 or by plan sponsor 400. If needed, a collateral transformation is performed wherein the additional assets by the plan participant are pledged to collateral lender 414 in exchange for a securities-lender-eligible collateral loan, wherein the latter is then pledged to securities lender 406.

Phantom Securities+Swap Example ("System 500")

System 500 is another useful example that combines elements from both the swap example ("system 300") and the phantom securities example ("system 200"). In this example, the long position in sponsor securities 101 is established via a bookkeeping debit entry of phantom sponsor securities 435. The short position in peer securities 103 is established via contracting for it with swap dealer 404 via a total return swap agreement. The long position in investment assets 105 is also established via contracting for it with swap dealer 404 via a total return swap agreement. Collateral pledged to swap dealer 404 to secure any liability arising due to the swap agreements is in the form of additional assets or indemnity provided by either plan participant 408 or by plan sponsor 400. If needed, a collateral transformation is performed wherein the additional assets by the plan participant are pledged to collateral lender 414 in exchange for a swap-dealer-eligible collateral loan, wherein the latter is then pledged to swap dealer 404.

FIG. 5: Plan Administration Computer

FIG. 5 illustrates a computer system such as a plan administration computer 444 that includes various components. An exemplary system and/or computing device 444 includes a processing unit (CPU or processor) 502 and a system bus 512 that couples various system components including a representation of memory (including RAM, ROM, CACHE and any other type of non-transitory storage devices) 504. The processor 502 can include any general purpose processor and a hardware module or software module, such as the various modules specifically programmed to run on the system 444, such as the peer securities module 503 with its statistical module 509, the investment assets module 505 and the plan administration database 507. The processor 502 can be a self-contained computing system, containing multiple cores or processors, a bus, memory controller, cache, etc. A multi-core processor may be symmetric or asymmetric. The processor 502 can include multiple processors, such as a system having multiple, physically separate processors in different sockets, or a system having multiple processor cores on a single physical chip. Similarly, the processor 502 can include multiple distributed processors located in multiple separate computing devices, but working together such as via a communications network. Multiple processors or processor cores can share resources such as memory or cache, or can operate using independent resources. Virtual computer resources can apply as well. The processor 502 can include one or more of a state machine, an application specific integrated circuit (ASIC), or a programmable gate array (PGA) including a field PGA.

The system bus 512 can be any of several types of bus structures including a memory bus or memory controller, a peripheral bus, and a local bus using any of a variety of bus architectures. A basic input/output (BIOS) stored in memory like ROM 504, may provide the basic routine that helps to transfer information between elements within the computing device 444, such as during start-up. The computing device 444 further includes storage devices 514 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 514 is connected to the system bus 512 by a drive interface. In one aspect, a hardware module that performs a particular function includes the software component stored in a tangible computer-readable storage device in connection with the necessary hardware components, such as the processor 502, bus 512, display 508, and so forth, to carry out a particular function. In another aspect, the system can use a processor and computer-readable storage device to store instructions which, when executed by the processor, cause the processor to perform operations disclosed herein, a method or other specific actions. The basic components and appropriate variations can be modified depending on the type of device, such as whether the device 444 is a small, handheld computing device, a desktop computer, or a computer server.

When the processor 502 executes instructions to perform "operations", the processor 502 can perform the operations directly and/or facilitate, direct, or cooperate with another device or component to perform the operations.

Although the examples described herein employ the hard disk or storage device 514, other types of computer-readable storage devices which can store data that are accessible by a computer, such as magnetic cassettes, flash memory cards, digital versatile disks (DVDs), cartridges, random access memory (RAM), read only memory (ROM), a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 444, an input device 506 represents any number of input mechanisms, such as a microphone for speech, a touch-sensitive screen for gesture or graphical input, keyboard, mouse, motion input, speech and so forth. An output device 508 can also be one or more of a number of output mechanisms known to those of skill in the art. In some instances, multimodal systems enable a user to provide multiple types of input to communicate with the computing device 444. The communications interface 510 generally governs and manages the user input and system output. There is no restriction on operating on any particular hardware arrangement and therefore the basic hardware depicted may easily be substituted for improved hardware or firmware arrangements as they are developed.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments.

FIG. 6: Peer Securities Module

In step 601, peer securities module 503 receives confirmation to begin from plan administration computer 444.

In step 603, the sponsor security's main identifier, e.g., an International Securities Identification Number (ISIN), is saved in a sponsor securities database 604.

In step 605, the sponsor security's ISIN is inputted as part of a query to a vendor database of issuers and securities 606 (a standard in the financial industry, e.g., Thomson Reuters™ Datastream™), and a plurality of data fields associated with the sponsor security (e.g., type of security, issuer industry, competitors, index memberships) and a historical time series of total returns are retrieved and stored in step 607 in sponsor security database 604.

In step 609, vendor database 606 is queried again, with the saved data fields associated with the sponsor security as query inputs, to retrieve a list of peer securities 103 ("a peer securities constituency"), wherein the peer securities constituency is saved, in step 611, in a peer securities database 608.

Asset-Class/Industry/Domicile Classification

In an example, securities comprising the peer securities constituency are in the same asset class as the sponsor security (e.g., equity shares). In another example, securities comprising the peer securities constituency are issued by companies that belong to the same industry as the sponsor company. Popular industry classification databases are the US Standard Industrial Classification (SIC), the Industry Classification Benchmark (ICB™), or the Global Industry Classification Standard (GICS™). In a similar example, securities comprising the peer securities constituency are issued by companies domiciled in the same country, or which have significant business activity in the same domicile, as the sponsor company.

Competitors

In another example, securities comprising the peer securities constituency are issued by companies which are competitors of the sponsor company, as defined, for example, in its own financial reports or by a third party. A short investment position in the competitors' securities creates an incentive for the plan participant to take actions that will reduce the market value of the competitors' securities. The incentive to reduce the market value of the competitor's securities may lead to an increase in the alignment of incentives between the plan participant and the plan sponsor by, for example, increasing the incentive to gain profitable market share at the expense of competitors.

Wider Scope of Peer Securities

The disclosure is inclusive of examples in which a short investment position is established in peer securities that do not necessarily belong to the same industry, domicile, geography, or other classification as the sponsor security, wherein the peer securities constituency and the quantities of each peer security are determined according to a disclosed statistical procedure. Widening the scope of peer securities can result in a more effective statistical offset and is often associated with lower short investment position set-up costs.

Index Constituency

In another example, the peer securities are chosen to be the constituents of a published index that tracks the performance of securities of the same asset class issued by companies in the same industry, domicile, or other classification as the sponsor security and company. If the sponsor security itself is a constituent of the index then it must be excluded from the peer securities constituency.

ETFs/Funds

In an example, the peer securities are chosen to be Exchange Traded Funds (ETFs) or mutual funds which holdings are securities in the same industry, domicile, or asset class as the sponsor security.

Note the short investment position in the peer securities does not trigger an adverse regulatory or other event, as would be the case with an offsetting short investment position in the sponsor security itself, because it avoids the designation of a constructive sale, as set by Section 1259 of Title 26 of the U.S. Code. This is because the peer securities are distinct from the sponsor security and do not qualify as the same or substantially identical property, as the rule sets out.

In step 613, a data integrity filter is applied to the peer securities constituency, wherein the filter checks that historical return data exists for the sample period required (e.g., 3 years of historical daily data), and eliminates peer securities from the peer securities constituency and database 608 which do not have sufficient historical data, or which have too many missing observation, or which have unreliable data due to insufficient trading volume.

Optionally, step 615 applies a short availability filter:

In an example wherein peer securities 103 are borrowed and sold short ("system 100"), the short availability filter queries with securities lender(s) 406 for availability and cost of borrowing each peer security, eliminates peer securities in which a short investment position may not be established, and saves the data in peer securities database 608.

In an example wherein a short investment position in peer securities 103 is established via a bookkeeping credit entry of phantom securities ("system 200"), the short availability filter may optionally be applied by querying securities lender(s) 406 and/or swap dealer(s) 404 for shorting availability and cost. Applying the short availability filter in this example is useful in case plan sponsor 400 intends to fund the phantom peer securities liability by setting up short investment position in peer securities 103 via borrowing and short selling or via a total return swap agreement.

In an example wherein a short investment position in peer securities 103 is established via a total return swap ("system 300"), the short availability filter queries with swap dealer(s) 404 for availability and cost of borrowing each peer security, eliminates peer securities in which a short investment position may not be established, and saves the data in peer securities database 608.

Optionally, step 617 applies a liquidity filter. The liquidity filter queries securities markets 412 (e.g., a securities exchange), retrieves an estimate of market liquidity for trading each peer security 103 (e.g., bid-ask spreads), eliminates peer securities with a market liquidity that is lower than a pre-set threshold, and saves the data in peer securities database 608.

In step 619, all peer securities combination subsets are enumerated and saved in a statistical database 612. For example, with three peer securities there are 7 peer securities combination subsets: {Peer Security 1}, {Peer Security 2}, {Peer Security 3}, {Peer Security 1, Peer Security 2}, {Peer Security 1, Peer Security 3}, {Peer Security 2, Peer Security 3}, {Peer Security 1, Peer Security 2, Peer Security 3}.

Figure 7:
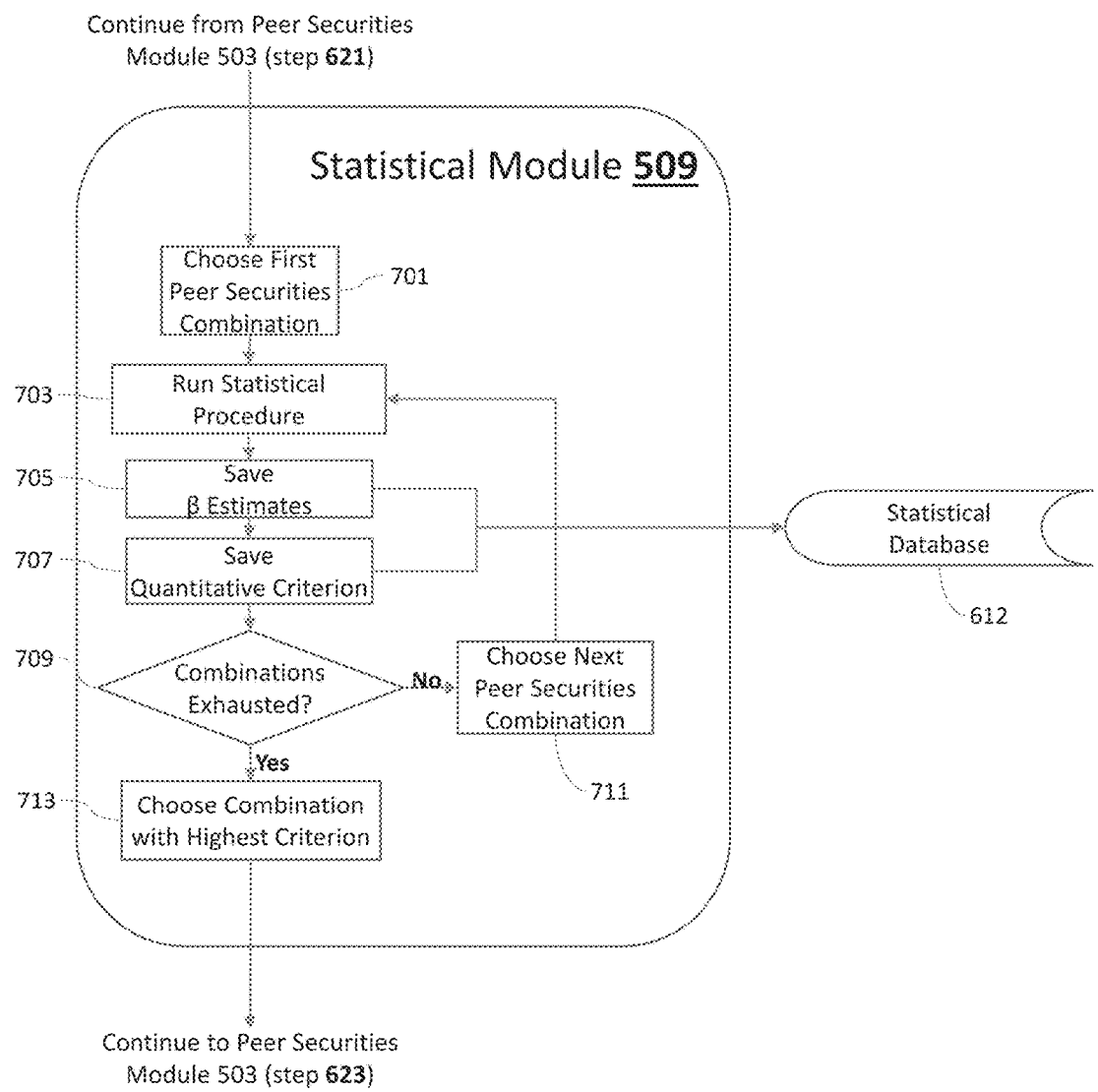
FIG. 7 illustrates the steps performed by the statistical module.

In step 621, statistical module 509 is run in a loop for each enumerated peer securities subset in statistical database 612, as disclosed in further detail in FIG. 7. The output of statistical module 509 is the optimal peer securities constituency and optimal parameters estimates, $\beta_1, \ldots, \beta_N$, corresponding to each peer security n=1, N, wherein N is the number of peer securities in the optimal constituency.

Step 623 updates the optimal peer securities constituency in plan administration database 507 and saves the optimal parameters estimates, $\beta_1, \ldots, \beta_N$.

In step 625, each parameter $\beta_n$, for each peer security n=1, N, is multiplied by the market value of sponsor securities 101, ($Q^{sponsor}P^{sponsor}$), by the market price of sponsor security 100, $P^{sponsor}$, multiplied by the pre-determined quantity of sponsor securities 101, $Q^{sponsor}$. Step 625 gives the optimal market value of the short investment position in each peer security, and is saved on plan administration database 507.

In step 627, the result of step 625 is divided by the market price of each peer security n, $P_n$, and rounded to the nearest integer. Rounding to nearest integer is necessary in the securities borrowing and short selling example ("system 100") because the quantity of a security borrowed and sold short must be a positive integer. Rounding to nearest integer is optional in the phantom securities example ("system 200") and in the swap example ("system 300"), as these examples can accommodate fractional quantities. Step 627 gives the quantity, $Q_n$, of each peer security n=1, ..., N, in which a short investment position is to be established, and is saved on plan administration database 507.

In step 629, in a securities borrowing and short selling example ("system 100"), the quantities of each peer security are automatically communicated to securities borrowing engine 477 and securities trading engine 488 so that these quantities will be borrowed and sold short, and if applicable also to secured loan administration engine 499 to facilitate any required "collateral transformation".

In step 629, in a phantom securities example ("system 200"), the quantities of each peer security are automatically communicated to financial transactions engine 433, which then enters equivalent quantities of phantom peer securities bookkeeping credit entries under account 402, which is kept for plan participant 408.

In step 629, in a swap example ("system 300"), the quantities of each peer security are automatically communicated to swap administration engine 455 so that a short investment position for these quantities will be contracted via a total return swap.

FIG. 7: Statistical Module

The main purpose of the second element of the deferred compensation plan, the short investment position in peer securities 103, is to provide the most effective and efficient offset to the systematic risk component that is embedded in sponsor securities 101. In order to achieve this offset, statistical module 509, a component of peer securities module 503, automatically determines (1) which peer securities, i.e., a peer securities constituency, and (2) the quantities of each peer security in which a short investment position will be established.

Step 701 chooses the first enumerated peer securities subset. In step 703, a statistical procedure is run using historical or simulated returns of the sponsor security and of the subset of peer securities.

One skilled in the art would recognize there are many possible statistical procedures. The disclosure is meant to be inclusive of any statistical procedure and any obvious or non-novel variation thereof. Conversely, the disclosure does not attempt to monopolize the use of any statistical procedure for any other application but the one narrowly defined, i.e., as a computer-based system designed to determine the optimal short investment positions in a plurality of peer securities 103, in the sole context of a security-based deferred compensation incentive plan as disclosed in systems 100, 200, or 300.

In the preferred example, N parameters, $\beta_1, \ldots \beta_N$, corresponding to N peer securities in a given peer securities subset, are fitted over a sample of T time periods to a linear model:

$$R_t^{sponsor} = \beta_1 R_t^{peer,1} + \ldots + \beta_N R_t^{peer,N} + \varepsilon_t \quad (1)$$

where $R_t^{sponsor}$ is the total return, including dividends, interest, and other income of a fixed amount invested in the sponsor security during period t=1, ..., T (day, week, month, etc. ...); where $R_t^{peer,n}$ is the total return of peer security n=1, ..., N; and where $\varepsilon_t$ is a statistical error term.

The investment return of a portfolio of N peer securities that has $\$\beta_1, \ldots, \$\beta_N$ invested in each peer security n=1, ..., N, equals $\beta_1 R_t^{peer,1} + \ldots + \beta_N R_t^{peer,N}$, and therefore a linear model is the appropriate one.

The main output of the statistical procedure are estimates of $\beta_1, \ldots \beta_N$, which correspond to the market value of the short investment position in each peer security n=1, ..., N, which will be established for every $1 of long investment position in the sponsor security.

For every $1 of long investment position in the sponsor security, $\$\beta_1, \ldots, \$\beta_N$ of short investment positions are required in peer securities 1, ..., N in order to offset the systematic risk component embedded in sponsor securities 101. The aggregate market value of the peer securities short investment position for every $1 of long position in the sponsor security is $$\$\sum_{n=1}^{N} \beta_n,$$

wherein $$\sum_{n=1}^{N} \beta_n = \beta_1 + \ldots + \beta_N,$$

is the sum operator.

For example, say only two peer securities are used, and say the optimal offset is achieved with $\beta_1$=0.5 and $\beta_2$=0.75. It means that for every $100 in market value of long position in the sponsor security, $50 and $75 in market values of short positions in peer securities 1 and 2, respectively, are required, and this gives an aggregate market value for the short position of $125.

Rearranging equation (1) to isolate the error term, $\varepsilon_t = R_t^{sponsor} - (\beta_1 R_t^{peer,1} + \ldots + \beta_N R_t^{peer,N})$, makes it clear that the error term is the difference between the return of the sponsor security 100 and the return of the portfolio of peer securities 103. The purpose of the statistical procedure is to choose the parameters $\beta_1, \ldots, \beta_N$ that produce the best possible offset, or equivalently, the smallest possible error terms, $\varepsilon_t$, between the returns of the sponsor security 100 and the resulting weighted portfolio of peer securities 103.

Unconstrained OLS

The canonical unconstrained ordinary least squares (OLS) statistical procedure chooses the parameters $\beta_1, \ldots, \beta_N$ such that the sum of the squared residuals is minimized:

$$\min_{\beta_1,\ldots,\beta_N} \sum_{t=1}^{T} \varepsilon_t^2 \quad (2)$$

where $\min_z(\bullet)$ is the minimization function by choice of z. The OLS estimators of the parameters are:

$$\beta = (X'X)^{-1} X'Y \quad (3)$$

where $\beta = [\beta_1, \ldots, \beta_N]'$ is an Nx1 vector stacking of the parameters, $\beta_1, \ldots, \beta_N$; where and are the transpose and inversion operations, respectively; where $$X = [[R_1^{peer,1}, \ldots, R_T^{peer,1}]', \ldots, [R_N^{peer,1}, \ldots, R_N^{peer,1}]']$$

is a TxN matrix stacking of the n=1, ..., N peer securities' returns, $R_t^{peer,n}$, for the entire sample periods t=1, ... T; and where $Y = [R_1^{sponsor}, \ldots, R_T^{sponsor}]'$ is a Tx1 vector stacking of the sponsor security's returns during the sample period.

Below is an example source code to run an OLS algorithm.

MATLAB™ Source Code

Ordinary Least Squares (OLS)

```
Y=SPONS;
X=PEERS;
% Y is a T-by-1 vector of the total returns time-series of
the sponsor security.
% X is a T-by-N matrix of the total returns time-series of
the N peer securities.
% T is the number of sample period observations.
% N is the number of peer securities.
BETA_uncon=(X'*X)^-1*X'*Y;
% BETA_uncon is an N-by-1 vector of the optimal β
estimates, corresponding to the optimal market value of the
short investment positions in each of the N peer securities,
for each $1 of market value of long investment position in
the sponsor security.
```

Many variations of the canonical OLS example exist, including but not limited to the below, and any combination thereof.

Positive Loadings

In an example, the statistical problem is constrained to non-negative β parameters only.

$$\beta_1 \geq 0, \ldots, \beta_N \geq 0 \tag{4}$$

If a β coefficient on a certain peer security is estimated to be negative it implies that a long, as opposed to short, investment position is required in that peer security. It is possible that a given sponsor security is best offset with a combination of both short and long positions in different peer securities, but it is likely that a negative β estimate is due to estimation imprecision. The non-negativity constraints ensure the estimated β parameters imply a short investment position in the peer securities.

Non-Zero Intercept

In an example, the linear model in (1) is augmented by allowing for an intercept parameter, $\alpha$.

$$R_t^{sponsor} = \alpha + \beta_1 R_t^{peer,1} + \ldots + \beta_N R_t^{peer,N} + \varepsilon_t \tag{5}$$

The intercept parameter allows for the possibility that the sponsor security return, during the sample period, was truly higher or lower than the return of the offsetting peer securities portfolio. The above augmentation may result in more accurate estimation of the β parameters and in better offset to the systematic risk component going forward (i.e., with live data during the deferral period 200). Conversely, constraining the intercept parameter, a, to equal zero, as in equation (1), incorporates the hypothesis that the sponsor security's true excess return over the offsetting peer securities' portfolio is zero during the sample period.

Range Constraints

In an example, range inequality constraints are imposed on the β parameters:

$$\beta_1^{min} \leq \beta_1 \leq \beta_1^{max}$$

$$\beta_N^{min} \leq \beta_N \leq \beta_N^{max} \tag{6}$$

where $\beta_n^{min}$ and $\beta_n^{max}$ are pre-defined minimum and maximum values constraining the parameter estimate values, $\beta_n$, for n=1, . . . , N. By constraining the β parameters to a pre-defined range the statistical procedure may become more tractable and the estimates less sensitive to outlier data. In a related example, a Bayesian approach is taken in order to incorporate a prior probability distribution of the β parameters.

Dollar Offset

In an example, the value of the aggregate short investment position in the peer securities is constrained to equal the value of the long investment position in the sponsor security by adding the constraint $$\sum_{n=1}^{N} \beta_n = 1 \tag{7}$$

Below is an example source code to run a constrained OLS algorithm.

MATLAB™ Source Code

Constrained OLS

```
Y=SPONS;
X=PEERS;
% Y is a T-by-1 vector of the total returns time-series of
the sponsor security.
% X is a T-by-N matrix of the total returns time-series of
the N peer securities.
% T is the number of sample period observations.
% N is the number of peer securities.
A=-eye (N); % A is an N-by-N identity matrix.
b=zero s (N, 1); % b is an N-by-1 vector of zeros.
Aeq=ones (1, N); % Aeq is a 1-by-N vector of ones.
beq=1; % beq is a scalar.
BETA_con=lsqlin (X, Y, A, b, Aeq, beq); % lsqlin (•) is a
built-in MATLAB function, wherein BETA_con=lsqlin (X,
Y, A, b, Aeq, beq) solves the linear system X*BETA_con=Y
in the least-squares sense, subject to A*BETA_con≤b, which
corresponds to the N non-negativity constraints on each of
the β parameters, and furthermore subject to a linear equality
constraint Aeq*BETA_con=beq, which corresponds to the
constraint that the sum of the β parameters equal unity.
% BETA_con is an N-by-1 vector of the optimal β
estimates, corresponding to the optimal market value of the
short investment positions in each of the N peer securities,
for each $1 of market value of long investment position in
the sponsor security.
```

Partial Offset

In an example, the market value of the aggregate short investment position in the peer securities is constrained to equal a pre-set proportion, p, of the market value of the long investment position in the sponsor security by adding the constraint $$\sum_{n=1}^{N} \beta_n = p \tag{8}$$

Short Set-Up Costs

In an example, the short investment position set-up costs are constrained not to exceed a pre-set ceiling.

$$\sum_{n=1}^{N} \beta_n c_n \leq C \quad (9)$$

where $C_n$ is the expected percentage cost of obtaining a short position in peer security n over the deferral period, and C is a pre-set maximal aggregate percentage cost. The short investment position set-up costs include the peer securities' borrowing cost, trading commission, bid-ask spread, market impact, or swap dealer fee.

Frequency

The disclosure is inclusive of statistical procedures that employ data in any frequency. For example, data used in estimation of equation (1) has a daily, weekly, or monthly frequency.

Sample

The disclosure is inclusive of statistical procedures that employ any historical sample periods. For example, the sample periods t=1, ..., T are the T most recent observations before the transformation of a traditional security-based deferred compensation incentive plan to a plan under the invention. In another example, the sample periods are chosen from a particular historical period. In another example the sample data are generated simulations of total returns.

Observation Weighting

In an example, each observation receives an equal weighting in estimation. In another example, different observations receive different weightings in estimation. For example, the objective function is augmented with an exponentially decaying weighting function, wherein the relative weighting of a time-period observation increases as observations become more recent:

$$\min_{\beta_1,...,\beta_N} \sum_{t=1}^{T} e^{-\lambda(T-t)} \varepsilon_t^2 \quad (10)$$

where $e^{(\cdot)}$ is the exponential function and $\lambda$ is a pre-set parameter, or a parameter that is estimated as part of the statistical procedure. This approach is useful in many cases because recent observations contain more relevant information about the statistical correlation between the sponsor security and the peer securities.

Outlier Data

The disclosure is inclusive of examples wherein the quantities of peer securities 103, in which a short investment position is established, are determined via a statistical procedure that is robust to outlier data. As a particular example, the disclosure is inclusive of the use of any loss function, e.g., the statistical procedure minimizes the average absolute return deviation:

$$\min_{\beta_1,...,\beta_N} \sum_{t=1}^{T} |\varepsilon_t| \quad (11)$$

where $|\cdot|$ is the absolute value function. The above loss function reduces the sensitivity of the $\beta$ estimates to outlier data in the sample.

Excess/Log/Net/Currency Returns

The disclosure is inclusive of examples wherein returns of the sponsor security, $R_t^{sponsor}$, and of peer security n, $R_t^{peer,n}$, represent returns in excess of another interest rate. For example, $R_t^{sponsor}$ and $R_t^{peer,n}$ represent returns in excess of a risk free rate such as the rate offered on a United Stated Treasury note or bill. In another example, $R_t^{sponsor}$ and $R_t^{peer,n}$ represent logarithmic returns or continuously compounded returns. In another example, $R_t^{sponsor}$ and $R_t^{peer,n}$ represent returns net of fees, including costs of setting up the short position, e.g., securities borrowing and trading costs. In another example, $R_t^{sponsor}$ and $R_t^{peer,n}$, are returns expressed in foreign currencies and wherein systems 100, 200, and 300 include an additional step that establishes positions in foreign currency futures or forwards.

Dimensionality Reduction

In case that many peer securities are identified, an issue may arise due to the high dimensionality of the statistical procedure, i.e., the issue of having to estimate many $\beta$ parameters at once. The issue is that as the number of peer securities, N, grows, the number of data observations, T, required to precisely estimate the $\beta$ parameters grows geometrically. The issue is compounded if the peer securities are highly correlated, i.e., if there is high multicollinearity between the explanatory variables. The high dimensionality issue may lead to imprecise estimates of the $\beta$ parameters, e.g., estimates that are unstable over time, concentrated in only a few peer securities, or which are sensitive to only a few data observations in the sample. Imprecision in the estimation of the $\beta$ parameters may produce a poor offset between the returns of the sponsor security 100 and the peer securities 103 out-of-sample (i.e., with actual positions during a deferral period 200).

Factor-Based Models

One way to address the issue of high dimensionality and multicollinearity of the statistical procedure utilizes the statistical fact that a relatively few common factors drive the returns of many of the peer securities. The key to the success of a factor-based approach is that the identified factors are relatively few, they explain a relatively large proportion of the variation in the returns of the peer securities, and that the factor-based approach itself avoids to a large extent the same instability issue. For example, while the number of peer securities, N, is relatively large and may be in the dozens, the number of factors, K, effectively capturing most of the variation in the peer securities is relatively small and may be only about three to five. The main output of a factor-based model are robust estimates of the $\beta$ parameters, which may produce a better offset to the systematic risk component embedded in the sponsor security. The factors themselves can be observable, unobservable, or a combination of both. If they are unobservable they need to be uncovered by further modeling and estimation.

Assume each peer security return, $R_t^{peer,n}$, follows a linear factor structure $$R_t^{peer,n} = \gamma_1^n F_t^1 + \ldots + \gamma_K^n F_T^k + v_t^n \text{ for } n=1, \ldots, N \quad (12)$$

where $F_t^k$ is the realization of factor $k=1, \ldots, K$ in period $t=1, \ldots, T$; where K is the total number of factors; where $\gamma_k^n$, a parameter, is the factor loading of peer security n on factor k; and where $v_t^n$ is a statistical error term specific to peer security n. Equation (12) is the representation of peer security n's return as a linear combination of K factor realizations plus an error term.

The factors can be translated into linear combinations, i.e., portfolios, of the peer securities.

$$F_t^k = w_k^1 R_t^{peer,1} + \ldots + w_k^N R_t^{peer,N} + v_t^k \text{ for } k=1, \ldots, K \quad (13)$$

where $w_k^n$, a parameter, is the loading of factor k on peer security n; and where $v_t^k$ is a statistical error term specific to factor k. Equation (13) is the representation of factor k's realizations as a linear combination, i.e., portfolio, of N peer securities' returns plus an error term. The loadings $w_k^1, \ldots, w_k^N$ are also known as the investment weights of peer securities $1, \ldots, N$ in a factor-mimicking portfolio of factor k.

The loadings of each factor k on each peer securities n, $w_k^n$, are obtained using the specific factor-based methodology employed, which under some assumptions is more robust than an ordinary least squares regression, and which is meant to alleviate the original high dimensionality issue.

The parameters in equations (12) and (13) are related by the following $$W = (\Gamma'\Gamma)^{-1}\Gamma' \quad (14)$$

assuming $(\Gamma'\Gamma)^{-1}$ exists, where $\Gamma = [[\gamma_1^1, \ldots, \gamma_1^N]', \ldots, [\gamma_K^1, \ldots \gamma_K^N]']$ is an N×K matrix stacking of the $\gamma_k^n$ parameters and $W = [[w_1^1, \ldots, w_K^1]', \ldots, [w_1^N, \ldots, w_K^N]']$ is a K×N matrix stacking of the $w_k^n$ parameters.

Once $F_t^1, \ldots, F_f^K$ and W are identified then substitution of equation (12) into equation (1) gives the following equation:

$$R_t^{sponsor} = \gamma_1^* F_t^1 + \ldots + \gamma_K^* F_t^K + v_t^*;$$

Equation (15) is more tractable than equation (1), because the dimensionality on the right-hand-side is reduced from N peer securities to only K factors, and is readily estimable using a straightforward statistical procedure (e.g., OLS) over the sample periods $t=1, \ldots, T$.

The resulting estimates of $\gamma_1^*, \ldots, \gamma_K^*$ are the optimal loadings of the sponsor security on factors $1, \ldots, K$. Equation (13) is then substituted into equation (15), which gives $$R_t^{sponsor} = \beta_1 R_t^{peer,1} + \ldots + \beta_N R^{peer,N} + \varepsilon_t^* \quad (16)$$

Equation (16) above pins down the optimal market values of the short positions that need to be established in each peer security $n=1, \ldots, N$ for every \$1 of market value of long position in the sponsor security, wherein $$\beta_n^* = \gamma_1^* w_1^n + \ldots + \gamma_K^* w_K^n \text{ for } n=1, \ldots N. \quad (17)$$

Observable and Investable Factors (Indices as Factors)

In an example, K observable and investable factors are employed in a factor-based statistical procedure. For example, K published securities indexes are treated as factors.

Equation (15) is tractably estimated by a straightforward statistical procedure, e.g., OLS, which produces stable estimates of $\gamma_1^*, \ldots, \gamma_K^*$.

I. The indices' securities constituency is the peer securities constituency.
 II. The loadings, $w_k^n$, of each factor k on each peer security n is the published weight of each peer security n in index k.
 III. If the sponsor security itself is a constituent of the published index k, with a weighting $w_k^{sponsor}$ in the index, then it is automatically assigned a weight of zero in the index, $w_k^{sponsor,adj} = 0$, and is excluded from the peer securities constituency. The relative weights of the remaining constituents in the published index are adjusted to add up to unity in a fashion that maintains their relative weighting, $w_k^{n,adj} = w_k^n/(1 - w_k^{sponsor})$.
 IV. The optimal market values of the short investment positions in each peer security are $\beta_n^* = \gamma_1^* w_1^n + \ldots + \gamma_K^* w_K^n$ for $n=1, \ldots, N$ for every \$1 of market value of the long investment position in the sponsor security.

For example, the indices are based on the same industry, domicile, and asset class as the sponsor security. For example, shares of a US real estate investment trust are the sponsor security and the relevant factors are a published index of shares of global real estate investment trusts, a published index of all US listed shares, and a published index of all global shares.

In an example, customized indexes are created using known indexing techniques based on publicly available information which are used as factors. For example, a market capitalization weighted index of the securities which belong to the same asset class as the sponsor security, and which were issued by the sponsor company's competitors.

In an example, ready-made investable factors are used such as the Fama and French factors, adjusted as necessary to accommodate their specification in excess returns.

In an example, a short investment position in an index-based factor is achieved via a short investment position in a corresponding exchange traded fund, wherein the exchange traded fund's holdings are the index constituents.

In an example, a short investment position in an index-based factor is achieved via a short investment position in a corresponding derivatives contract, e.g., a total return swap or a futures contract, referencing the index as underlying.

Observable but Non-Investable Factors

In an example, K observable but not directly investable factors are identified and employed in a factor-based statistical procedure. For example, macroeconomic and financial variables, such as the gross domestic product (GDP) growth rate or the aggregate stock dividend yield.

I. Equation (12) is tractably estimated by a straightforward statistical procedure, e.g., OLS, which produces stable estimates of $\gamma_1^n, \ldots, \gamma_K^n$ for each peer security $n=1, \ldots, N$.
 II. The loadings, $w_k^n$, of each factor k on each peer security n are calculated via the relationship in equation (14).
 III. Equation (15) is tractably estimated by a straightforward statistical procedure, e.g., OLS, which produces stable estimates of $\gamma_1^*, \ldots, \gamma_K^*$ for the sponsor security.

IV. The optimal market value of the short investment positions in each peer security are $\beta_n^* = \gamma_1^* w_1^n + \ldots + \gamma_K^* w_K^n$ for $n=1, \ldots, N$ for every \$1 of market value of the long investment position in the sponsor security.

Fundamental Factors

In an example, observable variables are incorporated into the construction of the unobservable factors via a statistical methodology. For example, firm attributes such as industry classification, market capitalization, or accounting measures are incorporated as variables delineating different factors, e.g., the model assumes there are distinct factors for small and large capitalization firms.

Unobservable Factors

In an example, K unobservable factors are identified and employed in a factor-based statistical procedure. In this example, the factors commonly driving the returns of the peer securities are modeled to be unobservable variables, which are left for estimation using an additional statistical methodology.

Principal Component Analysis

In an example applying unobservable factors, principal component analysis (PCA) is employed in a factor-based statistical procedure. PCA is a technique used to decompose the sample covariance matrix of the peer securities, $$\Omega = \frac{1}{T} \sum_{t=1}^{T} [(R_t^{peers} - \overline{R}_t^{peers})'(R_t^{peers} - \overline{R}_t^{peers})],$$

into its principle components, where $R_t^{peers} = [R_t^{peer,1}, \ldots, R_t^{peer,N}]'$ is a Nx1 vector stacking of the N peer securities' returns in period t, and where $$\overline{R}_t^{peers} = \frac{1}{T} \sum_{t=1}^{T} R_t^{peers}$$

is its sample average. With N peer securities there are N principal components, and these principal components are linear combinations of the peer securities returns themselves. The principal components are constructed to be orthogonal to each other, normalized to have unit length, and ordered such that the first principal component explains the largest portion of the sample covariance matrix of the peer securities returns; the second principal component explains the next largest portion, and so on. Only the K most important principal components are the factors used in PCA examples.

I. The coefficients, $w_1^1, \ldots, w_1^N$, of the first factor and principle component, $F_t^1 = w_1^1 R_t^{peer,1} + \ldots + w_1^N R_t^{peer,N}$, solve $\max_{w_1} w_1'\Omega_1$ subject to $w_1'w_1=1$, where $w_1=[w_1^1, \ldots, w_1^N]'$ is a Nx1 vector stacking of the first factor loading on each peer security $n=1, \ldots, N$.

II. The coefficients, $w_2^1, \ldots, w_2^N$, of the second factor and principle component, $F_t^2 = w_2^1 R_t^{peer,1} + \ldots + w_2^N R_t^{peer,N}$, solve $\max_{w_2} w_2'\Omega w_2$ subject to $w_2'w_2=1$ and $w_2'w_1=0$.

III. This process is repeated until all N principal components are calculated.

IV. Only the first K principle components are used, wherein K is a predetermined number. Alternatively, the number of factors to use, K, is selected according to a selection algorithm so as to maximize a quantitative criterion.

V. Equation (15) is then tractably estimated by a straightforward statistical procedure, e.g., OLS, which produces stable estimates of $\gamma_1^*, \ldots, \gamma_K^*$ for the sponsor security.

VI. The optimal market value of the short investment positions in each peer security are $\beta_{n*} = \gamma_1^* w_1^n + \ldots + \gamma_K^* w_K^n$ for $n=1, \ldots, N$ for every \$1 market value of the long investment position in the sponsor security.

Below is an example source code to run a factor-based PCA statistical procedure.

MATLAB™ Source Code

Factor-Based Statistical Procedure—Principle Component Analysis (PCA)

```
Y=SPONS;
X=PEERS;
% Y is a T-by-1 vector of the total returns time-series of
the sponsor security.
% X is a T-by-N matrix of the total returns time-series of
the N peer securities.
% T is the number of sample period observations.
% N is the number of peer securities.
K=3; % K is the number of principal components used as
factors.
W=pca(X); % pca (•) is a built-in MATLAB function,
wherein W=pca (X) returns the principal component coef-
ficients for the T-by-N matrix of peer securities total returns,
X. Rows of X correspond to period observations and col-
umns correspond to peer securities. The coefficient matrix,
W, is a N-by-N matrix. Each column of W contains coeffi-
cients for one principal component, and the columns are in
descending order of component variance.
W_K=W (:, 1: K); % W_K is a N-by-K matrix of the
coefficients of the first K principal components, i.e., the K
factors.
F=X*W_K; % F is a T-by-K matrix of the realized values
of the factors.
GAMMA=(F'*F)^-1*F'*Y; % GAMMA is a K-by-1 vec-
tor of the sponsor security's estimated loadings on the
factors.
BETA_pca=W_K*GAMMA; % BETA_pca is an N-by-1
vector of the optimal β estimates, corresponding to the
optimal market value of the short investment positions in
each of the N peer securities, for each $1 market value of
long investment position in the sponsor security.
```

Forward Looking Assumptions

In another example, forward looking assumptions about the expected returns or about the expected covariance matrix of returns of peer securities 103, sponsor securities 101, or of any factors, are incorporated into the statistical procedure.

In step 705, the β coefficients associated with the chosen combination subset of peer securities are saved in statistical output database 612. In step 707, a quantitative criterion (e.g., the out-of-sample adjusted $R^2$ coefficient) of the statistical procedure is calculated and saved in statistical database 612.

In step 709, the algorithm determines if all peer securities combinations were run through the statistical procedure.

If no, i.e., there are more combination subsets of peer securities which haven't been run through the statistical procedure, then the algorithm chooses the next enumerated peer securities combination in step 711 and repeats steps 703,705,707, and 709 with the next combination subset.

If yes, i.e., all peer securities combinations were run through the statistical procedure, then the algorithm proceeds to step 713, in which the peer securities combination with the highest (or lowest) quantitative criterion is chosen.

When statistical module 509 is concluded, step 623 of peer securities module 503 follows.

Variable Selection

One approach described above is to enumerate all peer securities combination subsets, run each through a statistical procedure, then choose the subset which produces the highest quantitative criterion. This approach, commonly referred to as a variable selection algorithm, is meant to eliminate from the peer securities constituency the peer securities which have zero or negative marginal contribution to the effectiveness of the statistical offset to the sponsor security. This is accomplished by choosing the subset of peer securities that is the most effective at offsetting the systematic risk component of the sponsor security, as assessed by a quantitative criterion.

Methodology Selection

In an example, a similar approach is taken to facilitate choosing between several proposed methodologies used to determine the quantities of each peer security for a given peer securities subset. Firstly, the proposed methodologies are enumerated. Secondly, the statistical procedure is run for a given peer securities subset using each of the proposed methodologies, wherein a quantitative criterion that is comparable between methodologies is calculated and saved for each methodology. Lastly, the methodology producing the highest (or lowest) value of the quantitative criterion is chosen.

Different Criterions

The disclosure is inclusive of the use of any quantitative criterion (e.g., a goodness of fit criterion). For example, the adjusted $R^2$ coefficient of determination (see below formula), Akaike information criterion, Bayesian information criterion, or the p-value of the F-statistic of the null hypothesis that $\beta_1 = \ldots = \beta_N = 0$.

A higher value for the quantitative criterion implies that the total return variation of the sponsor security is to a more significant extent explained by, or attributable to, the total return variation of the optimal portfolio of peer securities, and therefore implies that the peer securities provide a better offset to the systematic risk component embedded in the sponsor security.

Adjusted $R^2$ Coefficient of Determination

One example of a quantitative criterion used to compare between statistical procedures that use different peer securities subsets and/or different methodologies is the adjusted $R^2$ coefficient of determination:

$$R_{adj}^2 = 1 - \frac{\sum_{t=1}^{T}(R_t^{sponsor} - \hat{R}_t^{sponsor})^2 / (T-N)}{\sum_{t=1}^{T}(R_t^{sponsor} - \bar{R}^{sponsor})^2 / T},$$

where $\hat{R}_t^{sponsor} = \hat{\beta}_1 R_t^{peer,1} + \ldots \hat{\beta}_N R_t^{peer,N}$ is the predicted sponsor security return; where $\hat{\beta}_1, \ldots, \hat{\beta}_N$ are the estimated coefficients; and where $\bar{R}^{sponsor}$ is the mean sponsor security return over the sample period.

The $R_{adj}^2$ coefficient is interpreted as the proportion of the total return variation of the sponsor security that is explained by, or attributable to, the optimal portfolio of peer securities. A higher value for $R_{adj}^2$ implies that the total return variation of the sponsor security is to a more significant extent explained by, or attributable to, the total return variation of the peer securities, and therefore implies that the peer securities provide a better offset to the systematic risk component embedded in the sponsor security.

Out-of-Sample

In an example, the $\beta$ parameters are estimated, as a first step, using a pre-set historical sample period; then, in a second step, a quantitative criterion is calculated for an out-of-sample period, i.e., with data generated during another sample period (e.g., more recent observations) while using the $\beta$ parameters obtained in the first step. For example, a quantitative criterion is the out-of-sample mean squared residual error, $$MSRE = \sum_{t'=1}^{T'} \varepsilon_{t'}^2, \text{ where } t' = 1, \ldots, T'$$

are the out-of-sample periods.

Stepwise Regression

One issue with the above approach is that it may be computationally costly to run the statistical procedure for every possible subset of peer securities because these can be very many. The disclosure is meant to be inclusive of any variable selection procedure. For example, the step-wise forward variable selection model begins with no peer securities in the regression model, then tests the addition of each peer security using a quantitative criterion, adds the peer security that improves the model the most, and repeats this process until none improve on the existing model.

Below is an example source code to run a variable selection procedure for a constrained OLS algorithm.

MATLAB™ Source Code

Variable Selection Algorithm

```
Y=SPONS;
X=PEERS;
% Y is a T-by-1 vector of the total returns time-series of
the sponsor security.
% X is a T-by-N matrix of the total returns time-series of
the N peer securities.
```

Figure 8:
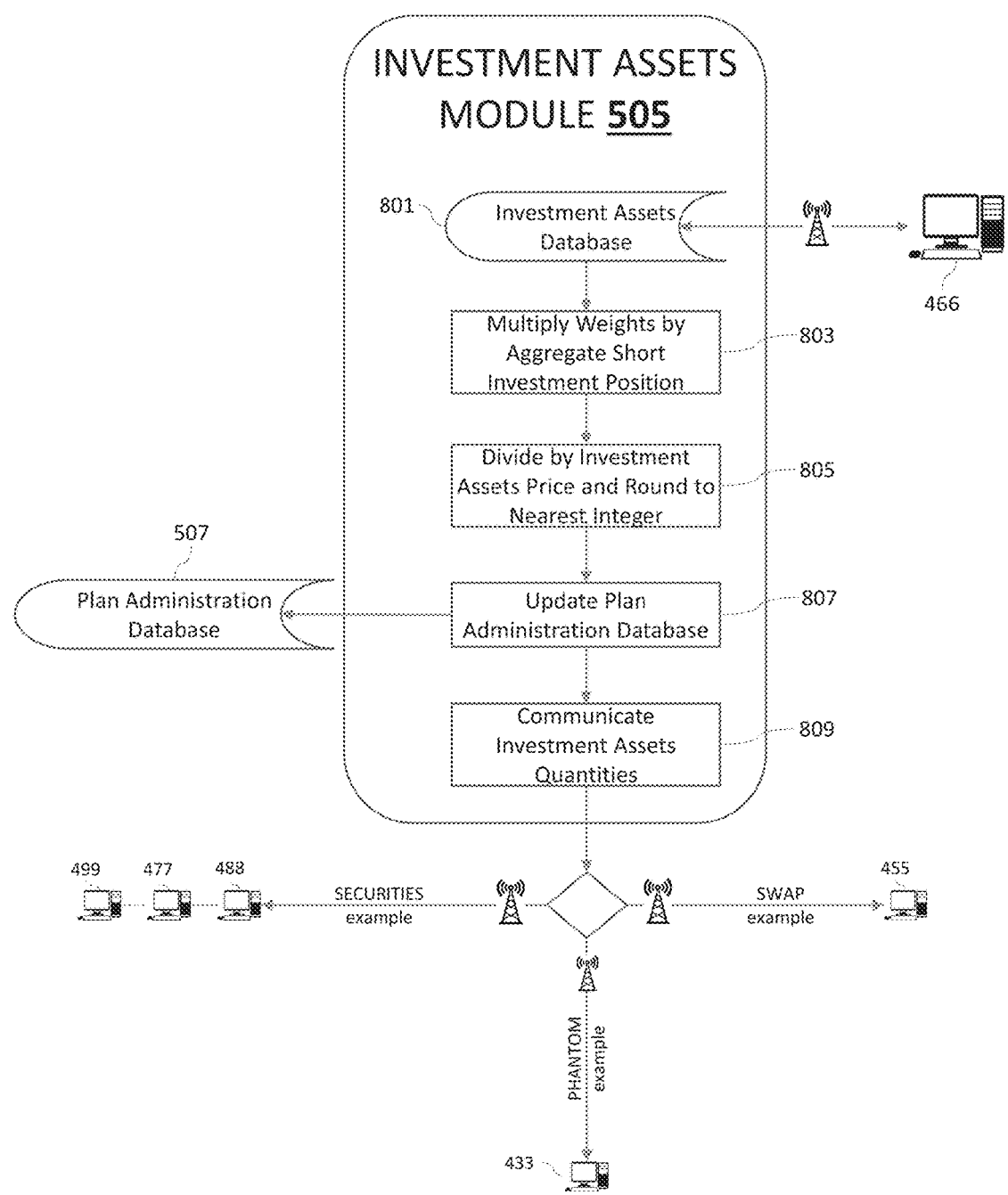
FIG. 8 illustrates the steps performed by the investment assets module.

% T is the number of sample period observations.
% N is the number of peer securities.
S=0; % Zero initialization of variable S.
for n=1:N $S=S+\text{factorial}(N)/(\text{factorial}(N-n)*\text{factorial}(n));$ end
% S is the number of peer securities combinations subsets, e.g., with N=10 peer securities there are S=1023 combinations subsets, wherein factorial (n) is a built-in MATLAB function that returns the product of all positive integers less than or equal to n.
B_uncon=zeros (N, 1, S); % B_uncon is a N-by-1-by-S zeros array.
R2_adj=zeros (1, S); % R2_adj is a 1-by-S zeros initialization vector.
s=0; % Zero initialization of variable s.
for n=1:N
 comb=combnk (1:N, n); % combnk (•) is a built-in MATLAB function that returns all combinations of the N elements in the vector 1: N, i.e., [1, 2, . . . , N], taken n at a time.
 for k=1:size(comb,1)
  s=s+1; % s is a running index of the S combination subsets.
  X_sub=X (:, comb (k, :));
 % X_sub is a T-by-n matrix of the total returns time-series of a given subset of n peer securities, wherein X is a T-by-N matrix of the total returns time-series of all N peer securities.
  A=−eye (n);
  b=zeros (n, 1);
  Aeq=ones (1, n);
  beq=1;
 % A, b, Aeq, and beq are the parameters disclosed in the source code to run a constrained OLS statistical procedure, wherein constraints are that the β parameters are non-negative and that they sum up to unity.
  B_con (comb (k, :), 1, s)=lsqlin (X_sub, Y, A, b, Aeq, beq);
 % B_con is a N-by-1-by-S array of the constrained β parameters corresponding to each of the S peer securities combination subsets.
  s2=mean ((Y X_sub*B_con (comb (k, :), 1, s)).^2);
  VAR_Y=mean ((Y-ones (T, 1)*mean (Y)).^2);
  R2=1−s2/VAR_Y;
  R2_adj (s)=1−((1−R2)*T/(T−N));
 % The four lines above calculate an example quantitative criterion of the statistical procedure—the adjusted $R^2$ coefficient of determination—for each of the S peer securities combinations subsets.
 end
end
[max max_ind]=max (R2_adj); % max_ind is the peer securities combination subset that produces the highest quantitative criterion, wherein max (•) is the built-in MATLAB maximum function.
BETA_sel=B_uncon (:, 1, max_ind); % BETA_sel is an N-by-1 vector of the optimal β estimates, corresponding to the optimal market values of the short investment positions in each of the N peer securities, for each $1 market value of long investment position in the sponsor security.
FIG. 8: Investment Assets Module The main purpose of the third element of the security-based deferred compensation incentive plan under the disclosure, the long investment position in the investment assets, is to provide the plan participant with exposure to an appropriate investment assets portfolio that is suitable to her financial needs, risk tolerance, and market outlook. For this purpose, a menu of investment assets is made available to the plan participant from which to freely choose investment assets. The long investment position in the investment assets replaces the systematic risk component that is inherent in the sponsor security, which is offset by the short investment position in the peer securities. Notice the short investment position in the peer securities serves as a source of funding that can be invested, wherein cash is the default investment asset.

Constituency

Investment assets module 505 utilizes an investment assets database 801, which is pre-populated with a menu of investment assets. The disclosure is inclusive of long investment positions in any investment assets. For example, global equities, bonds, cash, money market instruments, loans, currencies, commodities, real estates, hedge funds, or private equities. The disclosure is inclusive of any investment vehicle. For example, actual securities, direct holdings, mutual or exchange traded funds, pooled investment trusts, and any derivative contract. Specifically, cash serves as the investment asset of default if no other choice is made.

The menu of investment assets is communicated to plan participant 408, via a user interface 466, who then freely chooses one or more investment assets and their respective relative portfolio weights. The investment assets database is then updated with the investment assets choice made.

In an example, plan participant 408 chooses between a menu of portfolios of investment assets which were pre-constructed using a known asset allocation methodology by the plan sponsor or by a third party.

In an example, a menu of investment assets portfolios is made available to plan participant 408 to choose from, via a user interface 466, wherein the menu includes a plurality of portfolios constructed using a constrained risk-return (e.g., mean-variance) statistical procedure, and wherein each constructed portfolio provides a different level of ex-ante expected return corresponding to a different minimal level of ex-ante expected risk (e.g., expected variance of the return). This example provides plan participant 408 with a menu of efficient portfolios to choose from according to her risk tolerance and market outlook.

The disclosure is inclusive of examples wherein the plan participant communicates her investment assets choices in diverse ways including via a computerized device such as via a personal computer or a personal digital assistant (PDA), via voice communications over the phone, via written instructions, via in-person voice instruction, or via another person having the power of attorney to enter an investment assets choice on behalf of the plan participant. The choice is then saved unto the investment assets database, which is maintained on the plan administration computer's 444 storage device 514.

Eliminating Offsets

A skilled artisan will notice the possibility that some of the chosen investment assets 105 coincide with peer securities 103, and will recognize the opportunity to eliminate the offsetting long and short positions. In an example, plan administration computer 444 automatically identifies and eliminates any to-be offsetting positions.

In step 803, the investment assets' chosen relative weights are multiplied by the market value of the aggregate short investment position in peer securities 103. This gives the market value of the long investment position in each investment asset.

In step 805, the result of step 803 is divided, element by element, by the investment asset's market price, and rounded to the nearest integer. This gives the quantity of each investment asset in which a long investment position will be established.

In an example of phantom securities ("system 200") or swap agreement ("system 300"), rounding the quantities to the nearest integer is optional because fractional quantities of investment assets can be accommodated.

In step 807, the investment assets chosen and their respective quantities are saved to plan administration database 507.

In step 809, the investment assets quantities are communicated to the execution engines corresponding to the relevant example (i.e., "system 100", "system 200", or "system 300").

In a securities borrowing and short selling example ("system 100"), the investment assets quantities are communicated to securities trading engine 488, which in turn purchases the investment assets in the chosen quantities on securities markets 412. Furthermore, the investment assets quantities are also communicated to securities borrowing and lending engine 477 in an example wherein they are pledged as collateral 415 to securities lender 406 to secure the peer securities loan 103. Further still, the investment assets quantities are also communicated to secured loan administration engine 499 in an example wherein they are pledged as collateral 423 to collateral lender 414 as security against the securities-lender-eligible collateral loan 426, i.e., when collateral transformation is required.

In a phantom securities example ("system 200"), the investment assets quantities are communicated to financial transactions engine 433, which in turn enters those quantities as a bookkeeping debit-entry of phantom investment assets under account 402, which is kept for plan participant 408.

In a swap agreement example ("system 300"), the investment assets quantities are communicated to swap administration engine 455, which in turn contracts for a long investment position in the chosen quantities of investment assets via a total return swap with swap dealer 404.

FIG. 9: Sponsor Security Database ("Example")

Sponsor security database 604 contains data related to sponsor security 100. In particular, contained are the unique identifier (e.g. ISIN) and stock ticker associated with the sponsor security 100. Additionally, the issuer (e.g., Boston Properties Inc. (BXP)), asset class (e.g., equity shares), currency, industry, and domicile of the issuer (e.g., Real Estate Investment Trust domiciled in the United States) are contained in the sponsor security database 604. In an example, the entries in the data fields under assets class, industry, and domicile are used in a query sent to vendor database 606 to retrieve a peer securities constituency comprised of peer securities 103 of the same asset class, and issued by companies in the same industry and domicile.

In another example, database 604 contains the sector code (e.g., ICB™ sector code 8670, Real Estate Investment Trusts) of sponsor security 100, which is used in a query sent to vendor database 606 to retrieve a peer securities constituency comprised of peer securities 103 belonging to the same sector classification.

In another example, database 604 contains a list of competitors of the sponsor company (e.g., Simon Property Group Inc. (SPG), Equity Residential Trust Properties (EQR), . . . ), which are used as the peer securities constituency.

In another example, database 604 contains a list of published indices of which the sponsor security 100 is a constituent of, which are used in a query sent to vendor database 606 to retrieve the constituency list of at least one of the published indices, wherein the at least one published index constituency is used as the peer security constituency, excluding the sponsor security 100 itself.

Lastly, database 604 contains a historical time-series of total returns of sponsor security 100, which is used as input to statistical module 509. The illustrative example in FIG. 9 shows a five year history of daily return data spanning Feb. 26, 2002 to Feb. 28, 2007, which are used as input to a statistical procedure, as part of a security-based deferred compensation incentive plan under the disclosure, which was initiated in Mar. 1, 2007.

FIGS. 10a-10c: Securities and Issuers Vendor Database ("Example")

FIG. 10a-10c, taken together, illustrate relevant data contained in securities and issuers vendor database 606. In an illustrative example, the constituents of the Dow Jones™ U.S. Real Estate Index™ and their respective weights in the index are stored on securities and issuers vendor database 606.

In an example, the published index constituency, excluding the sponsor security itself (e.g., Boston Properties Inc.), is used as the peer securities constituency.

In another example, the published index is used as a factor in a factor-based statistical procedure, wherein the relative index weights are adjusted to the exclusion from the index of the sponsor security itself.

FIG. 11: Peer Securities Database ("Example")

Peer securities database 608 contains the peer securities 103 constituency, their related identifiers and data fields, and a history of total return data for each peer security. In the illustrative example, five peer securities are shown: Simon Property Group (SPG), Equity Residential Trust Properties (EQR), Avalonbay Communities (AVB), SL Green Realty (SLG), and Federal Realty Investment Trust (FRT), each one is the equity share issued by a real estate investment trust which are competitors to the sponsor company, Boston Properties Inc. (BXP), and which have the same ICB™ sector code.

FIG. 12: Statistical Output Database ("Example")

Statistical output database 612 contains the β coefficient estimates and quantitative criterion for each enumerated combination subset of the peer securities constituency. In an illustrative example with a peer securities constituencies containing five peer securities, there are thirty-one (31) combination subsets: subsets 1-5 contain a single peer security, subsets 6-15 contain two peer securities each, subsets 16-25 contain three peer securities each, subset 26-30 contain four peer securities each, and subset 31 contains all five peer securities. In the example illustrated in FIG. 12, the statistical methodology used was a constrained OLS, employing five years of daily return data up-to Feb. 28, 2007, wherein the β estimates were constrained to be non-negative and to add-up to unity. Furthermore, the quantitative criterion used in the illustrative example is the out-of-sample adjusted $R^2$ coefficient, wherein the first 50 days were used for initial calibration, wherein an expanding window of sample period was used thereafter. In the example, the highest quantitative criterion is achieved with the subset containing all five peer securities. The out-of-sample adjusted $R^2$ coefficient is a robust measure of the goodness-of-fit of a regression, wherein under some assumptions the adjusted $R^2$ coefficient is comparable between models with a different number of peer securities. The adjusted $R^2$ coefficient in the example is interpreted to mean that 88.1% of the variance of the total return of the sponsor security is attributable to, or explained by, the variation in the total returns of the five peer securities. The results of the statistical procedure in this example suggest that the vast majority of the variation in the return of the sponsor security is attributable to a systematic risk component that simultaneously drives the returns of both sponsor security 100 and peer securities 103.

FIG. 13a: User Interface: Investment Assets Constituency Selection ("Example")

FIG. 13a shows a component of user interface 466 associated with investment assets database 801, which is a component of plan administration computer 444. FIG. 13a shows an example menu of investment assets from which plan participant 408 chooses to a constituency of investment assets in which a long investment position will be established as part of a security-based deferred compensation incentive plan under the disclosure.

FIG. 13a shows a menu of various investment assets, their ISINs, instrument type (e.g., ETF, mutual fund, hedge fund, money market fund, etc. . . . ), and asset class (e.g., equities, fixed income, multi asset class, etc. . . . ). This component of user interface 466 allows plan participant 408 to choose one or more investment assets out of a pre-populated menu (illustrative selection shown as bolded check-marks), wherein the choices are registered on investment assets database 801.

The user interface 466 is a preferred component of the system, but is not necessary. Plan participant 408 can choose the investment assets portfolio in other ways, e.g., by contacting a plan sponsor representative by phone.

FIG. 13b: User Interface: Investment Assets Relative Weights Selection ("Example")

FIG. 13b illustrates another component of user interface 466 associated with investment assets database 801, which is a component of plan administration computer 444. FIG. 13b illustrates an example portfolio weights allocation made by plan participant 408 with respect to the chosen investment assets constituency. As an illustrative example, plan participant 408 allocates 5% to iShares™ MSCI™ Emerging Markets ETF, 5% to iShares™ MSCI™ Japan ETF, 50% to iShares™ National AMT-free Muni Bond ETF, etc . . . , wherein the portfolio weights add up to 100%. The investment assets portfolio weights allocation made by the plan participant are registered on investment assets database 801.

FIG. 13c: User Interface: Investment Assets Pre-Constructed Portfolios ("Example")

FIG. 13c illustrates another component of user interface 466 associated with investment assets database 801. FIG. 13c illustrates an example menu of pre-constructed investment assets portfolios, labelled as "Safest", "Safe", "Balanced", "Risky", "Riskiest", from which plan participant 408 has the ability to freely choose. This component of user interface 466 allows plan participant 408 to choose one pre-constructed portfolio of investment assets out of a pre-populated menu of investment assets portfolios (illustrative selection shown as a bolded check-mark).

FIG. 14a: Balance Report: Securities Example ("Example")

FIG. 14a illustrates an example balance report of plan account 402 kept for plan participant 408 of a security-based deferred compensation incentive plan under the disclosure corresponding to a securities example ("system 100").

The balance report is for an effective date (e.g., Mar. 1, 2007), and is an output of data maintained on plan administration database 507.

FIG. 14a shows the long investment position in sponsor securities 101 (e.g., 8,423 equity shares of Boston Properties Inc.), their market price (e.g., $118.73 per share), market value ("MV", e.g., $1,000,063), and restriction date (e.g., Feb. 28, 2010), i.e., the date in which the sponsor securities are released of all sale and other restriction.

FIG. 14a shows the short investment positions in peer securities 103 established via securities borrowing and short-selling (e.g., −1,908 equity shares of Simon Property Group, −3,086 equity shares of Equity Residential, . . . ), their market prices per share (e.g., $105,85, $49.87, . . . ), market values (e.g., −$201,962, −$153,899, . . . ), their corresponding β estimates (e.g., 0.2020, 0.1539, . . . ), an aggregate market value of all short investment positions (e.g., −$999,863), the sum of the β estimates (e.g., 1.00), and an indication that there is no restriction imposed on these positions.

The β estimates were determined according to an example statistical process disclosed herein. Notice the following relationship between the β estimates and short quantities of each peer security. The short quantity of each peer security equals its β estimate times the aggregate market value of the sponsor securities (e.g., $1,000,063), divided by the market price of that peer security, and rounded to the nearest integer.

FIG. 14a shows the long investment positions in investment assets 105 (e.g., 12,001 units of iShares™ 7-10 Years Treasury Bond ETF and a residual $60 cash), their market prices (e.g., $83.31 per unit), market values (e.g., $999,803 and $60), an aggregate market value (e.g., $999,863), and an indication that there is no restriction imposed on these positions.

Notice the aggregate market value of peer securities 103 and the aggregate market value of investment assets 105 cancel each other at the time the positions in peer securities 103 and investment assets 105 are first established.

Furthermore shown is the equity capital of plan account 402 (e.g., $1,000,063), which represents the net asset value of the account and the value of the security-based deferred compensation incentive award. Notice the equity capital equals the market value of the sponsor securities 101 implying that no additional capital contributions were required in order to establish the short investment position in the peer securities 103 and the long investment position in the investment assets 105 relative to a traditional security-based deferred compensation incentive plan containing only sponsor securities 101.

Furthermore shown is the collateral requirement by securities lender 406 (e.g., $1,019,861). In this example, the collateral pledge requirement is calculated as equaling 102% of the absolute value of the aggregate market value of peer securities 103.

In an example wherein investment assets 105 and sponsor securities 101 are accepted by securities lender 406 as eligible collateral, furthermore shown are the quantities of investment assets 105 and sponsor securities 101 that are pledged to securities lender 406 to secure the peer securities loan. In this example, all 12,001 units of the iShares™ 7-10 Years Treasury Bond ETF are pledged, wherein a 10% haircut is applied to their market value to derive their collateral value ("MV*Haircut"), the $60 cash is pledged as well, wherein no haircut is applied to cash, and 1,189 shares of Boston Properties Inc. are pledged, wherein a 15% haircut is applied to their market value. Notice the aggregate collateral value ("MV*Haircut") of the collateral pledged to the securities lender (e.g., $1,019,877) is sufficient to cover the collateral requirement (e.g., $1,019,861).

In an example wherein cash is required as collateral by the securities lender 406, furthermore shown is the amount of cash pledged (e.g., $1,019,861) to securities lender 406. In this example, the collateral transformation details are furthermore shown: the amount of cash collateral borrowed from collateral lender 414 (e.g., $1,019,801), and the collateral pledged to collateral lender 414 to secure the securities-lender-eligible collateral loan (e.g., 12,001 units of iShares™ 7-10 Years Treasury Bond ETF and 1,189 shares of Boston Properties Inc.). Notice in this example that out of $1,019,861 cash collateral requirement, $60 are pledged directly, which are the residual cash from the peer securities short sale cash proceeds that were not rolled into any other investment asset, and $1,019,801 is cash collateral borrowed from collateral lender 414.

FIG. 14*b*: Balance Report: Phantom Securities Example ("Example")

FIG. 14*b* illustrates an example balance report of plan account 402 kept for plan participant 408 of a security-based deferred compensation incentive plan under the disclosure corresponding to a phantom securities example ("system 200").

The balance report is for an effective date (e.g., Mar. 1, 2007), and is an output of data maintained on plan administration database 507.

FIG. 14*b* shows the long investment position in sponsor securities 101 established via a bookkeeping debit entry of phantom sponsor securities 435 (e.g., 8,423 equity shares of Boston Properties Inc.), their market price (e.g., $118.73 per share), market value ("MV", e.g., $1,000,063), and restriction date (e.g., Feb. 28, 2010), i.e., the phantom sponsor securities vesting or payout date.

FIG. 14*b* shows the short investment positions in peer securities 103 established via a bookkeeping credit entry of phantom peer securities 437 (e.g., −1,908 equity shares of Simon Property Group, −3,086 equity shares of Equity Residential, . . . ), their market prices per share (e.g., $105,85, $49.87, . . . ), market values (e.g., −$201,962, −$153,899, . . . ), their corresponding β estimates (e.g., 0.2020, 0.1539, . . . ), an aggregate market value of all short investment positions (e.g., −$999,863), the sum of the β estimates (e.g., 1.00), and an indication that there is no restriction imposed on these positions.

The β estimates were determined according to an example statistical process disclosed herein. Notice the following relationship between the β estimates and short quantities of each peer security. The short quantity of each peer security equals its β estimates times the aggregate market value of the sponsor securities (e.g., $1,000,063), divided by the market price of that peer security, and rounded to the nearest integer.

FIG. 14*b* shows the long investment positions in investment assets 105 established via a bookkeeping debit entry of phantom sponsor securities 437 (e.g., 12,001 share units of iShares™ 7-10 Years Treasury Bond ETF and a residual $60 cash), their market prices (e.g., $83.31 per unit), market values (e.g., $999,803 and $60), an aggregate market value (e.g., $999,863), and an indication that there is no restriction imposed on these positions.

Notice the aggregate market value of phantom peer securities 437 and the aggregate market value of phantom investment assets 439 cancel each other at the time these positions are first established.

Furthermore shown is the equity capital of plan account 402 (e.g., $1,000,063), which represents the net asset value of the account and the value of the security-based deferred compensation incentive award. Notice the equity capital equals the fair value of the phantom sponsor securities 435 implying that no additional capital contributions were required in order to establish the short investment position in the peer securities 103 (via phantom peer securities 437) and the long investment position in the investment assets 105 (via phantom investment assets 439) relative to a traditional security-based deferred compensation incentive plan containing only phantom sponsor securities 435.

FIG. 14*c*: Balance Report: Swap Example ("Example")

FIG. 14*c* illustrates an example balance report of plan account 402 kept for plan participant 408 of a security-based deferred compensation incentive plan under the disclosure corresponding to a swap example ("system 300").

The balance report is for an effective date (e.g., Mar. 1, 2007), and is an output of data maintained on plan administration database 507.

FIG. 14*c* shows the long investment position in sponsor securities 101 (e.g., 8,423 equity shares of Boston Properties Inc.), their market price (e.g., $118.73 per share), market value ("MV", e.g., $1,000,063) and restriction date (e.g., Feb. 28, 2010), i.e., the date in which the sponsor securities are released of all sale and other restriction.

FIG. 14*c* shows the short investment positions in peer securities 103 established via a total return swap contracted with swap dealer 404 (e.g., −1,908 equity shares of Simon Property Group, −3,086 equity shares of Equity Residential, . . . ), their market prices per share (e.g., $105,85, $49.87, . . . ), market values (e.g., −$201,962, −$153,899, etc. . . . ), their corresponding β estimates (e.g., 0.2020, 0.1539, . . . ), an aggregate market value of all short investment positions (e.g., −$999,863), the sum of the β estimates (e.g., 1.00), and an indication that there is no restriction imposed on these positions.

The β estimates were determined according to an example statistical process disclosed herein. Notice the following relationship between the β estimates and short quantities of each peer security. The short quantity of each peer security equals its β estimate times the aggregate market value of the sponsor securities (e.g., $1,000,063), divided by the market price of that peer security, and rounded to the nearest integer.

FIG. 14*c* shows the long investment positions in investment assets 105 established via a total return swap contracted with swap dealer 404 (e.g., 12,001 units of iShares™ 7-10 Years Treasury Bond ETF and a residual $60 cash), their market prices (e.g., $83.31 per unit), market values (e.g., $999,803 and $60), an aggregate market value (e.g., $999,863), and an indication that there is no restriction imposed on these positions.

Notice in this example the aggregate market value of peer securities 103 and investment assets 105 cancel each other at the time the positions in peer securities 103 (via swap agreement) and investment assets 105 (via swap agreement) are first established.

Furthermore shown on the balance report is the equity capital of plan account 402 (e.g., $1,000,063), which represents the net asset value of the account and the value of the security-based deferred compensation incentive award. Notice equity capital equals the market value of the sponsor securities 101 implying that no additional capital contributions were required in order to establish the short investment position in the peer securities 103 (via swap agreement) and the long investment position in the investment assets 105 (via swap agreement) relative to a traditional security-based deferred compensation incentive plan containing only sponsor securities 101.

Further shown is the margin collateral requirement by swap dealer 404 (e.g., $299,959). In this example the margin collateral is calculated as 15% of the absolute value of the aggregate value of peer securities 103 plus 15% of the aggregate value of investment assets 105.

In an example wherein sponsor securities 101 are accepted by swap dealer 404 as eligible collateral, further shown is the quantity of sponsor securities 101 pledged to swap dealer 404 to secure any future liability arising due to the swap agreement. In this example, the number of sponsor securities 101 pledged as collateral is 2,973 corresponding to a market value of $352,984, wherein a 15% haircut is applied to their market value to derive their collateral value ("MV*Haircut").

In an example wherein cash is required as margin collateral by swap dealer 404, furthermore shown is the amount of cash pledged (e.g., $299,959) to swap dealer 404. In this example, the collateral transformation details are furthermore shown: the amount of cash collateral borrowed from collateral lender 414 (e.g., $299,959), and the collateral pledged to collateral lender 414 to secure the swap-dealer-eligible collateral loan (e.g., 2,973 shares of Boston Properties Inc.), wherein a 15% haircut is applied.

Historical Simulation

"Boston Properties Inc. Example"

Take as a hypothetical example the equity shares of Boston Properties Inc. (BXP), a Real Estate Investment Trust (REIT) that trades on the New York Stock Exchange (NYSE). Boston Properties Inc. engages in the ownership and development of office properties in the United States and its properties are located in Boston, Washington, D.C., New York, San Francisco, and Princeton.

Consider an executive of Boston Properties Inc. that received a portion of her bonus for her performance during the 2006 calendar year in the form of BXP shares, restricted for three years. Assume the security-based deferred compensation incentive award was comprised of 8,423 BXP shares, given on Mar. 1, 2007, and worth $1,000,063 on that day, wherein the restriction date of the shares was Feb. 28, 2010, such that she was restricted from selling them for a period of three years.

Unfortunately, 2007-8 saw the worst performance of the US real estate market in history, a period known as the US subprime mortgage and financial crisis. BXP shares did not escape and provided a −33% cumulative total return to their owners between the grant and restriction dates. At their low for the period, in March 2009, the shares provided a −69% total return since the grant date. Furthermore, the total return was extremely volatile during the 3-year deferral period, wherein the realized standard deviation of the return was 64.6% annualized.

BXP's negative return was common to all of its industry peers. For example, five peer securities: Simon Property Group (SPG), Equity Residential (EQR), Avalonbay Communities (AVB), SL Green Realty (SLG), and Federal Realty Investment Trust (FRT), all are equity shares of US-based real estate investment trusts, fared very badly as well. The five peer securities' cumulative total return ranged between −14.9% and −61% for the entire 3-year deferral period, with corresponding realized annualized standard deviations ranging between 58.7% and 92.2%, and wherein at their lows, in March 2009, the five peer securities provided a total return since the grant date ranging between −45% and −96%. Notice the very similar return pattern common to BXP and to the five peer securities, SPG, EQR, AVB, SLG, and FRT.

In an example of the disclosure, the following linear regression model is estimated using historical total return data from the 5 years leading up to the award granting date:

$$R_t^{sponsor} = \beta_1 R_t^{peer,1} + \ldots + \beta_N R_t^{peer,N} + \varepsilon_t,$$

wherein the $\beta$ parameters are constrained to be non-negative, $\beta_1 \geq 0, \ldots, \beta_N \geq 0$, and wherein the sum of the $\beta$ parameters is constrained to equal unity, $$\sum_{n=1}^{N} \beta_n = 1.$$

The $\beta$ parameters come out to be 0.2020, 0.1539, 0.1639, 0.2745, and 0.2057, for SPG, EQR, AVB, SLG, and FRT, respectively. Under the disclosure, this means that for every $100-worth of long investment position in the sponsor security (BXP), required are $20.20, $15.39, $16.39, $27.45, and $20.57-worth of short investment positions in the five peer securities, SPG, EQR, AVB, SLG, and FRT, respectively. Therefore, in this example, against the 8,423 BXP shares worth $1,000,063, short investment positions in 1,908, 3,086, 1,222, 1,888, and 2,285 shares of SPG, EQR, AVB, SLG, and FRT, are required, respectively, corresponding to market values of $201,962, $153,899, $163,834, $274,496, and $205,673 (in absolute values), respectively.

A quantitative criterion of the above regression model, the out-of-sample adjusted $R^2$ coefficient, equals 88.1% in the example, and is interpreted as implying that 88.1% of BXP's total return variation is attributable to, or explained by, the total return variation of the five peer securities, SPG, EQR, AVB, SLG, and FRT. Notice in FIG. 15 how closely the cumulative return of the sponsor security, BXP, follows that of its peer securities, SPG, EQR, AVB, SLG, and FRT. Such a high value for the adjusted $R^2$ coefficient implies that the total return variation of the sponsor security is to a very large extent explained by, or attributable to, the total return variation of the peer securities. Such a degree of correlation implies that the peer securities provide a very good offset to the systematic risk component embedded in the sponsor security because they are all driven to a very large extent by the same economic factors.

The short investment positions in the five peer securities, each weighted according to the corresponding $\beta$ parameter above, provided a cumulative return of +31.6% over the 3-year deferral period, a total return which offset with a high degree of correlation the cumulative return of −33.0% provided by the sponsor security, BXP, during the same period.

As an illustrative example, the plan participant chose to have a long investment position in investment assets comprised of 12,001 shares of iShares™ 7-10 Year Treasury Bond ETF (IEF), valued at $999,803, wherein $60 remain as residual from the short investment position. The iShares™ 7-10 Year Treasury Bond ETF is an exchange traded fund holding United States Treasury bonds with a remaining maturity of 7-10 years, which is considered a safe investment by investment professionals, reflecting the plan participant's high degree of risk averseness in this example. The investment asset, IEF, provided a cumulative total return of 22.8% over the 3-year deferral period, with a realized standard deviation of 8.8% annualized.

The cumulative total return on equity (RoE) of a plan under the disclosure during the 3-year deferral period is 21.3%, with an annualized standard deviation of 14.9%. This is in comparison with a cumulative total return on equity (RoE) of a traditional plan during the 3-year period of −33.0%, with an annualized standard deviation of 64.6%. Furthermore, the cumulative return under the disclosure did not turn negative at any point in time during the 3-year deferral period, not even during the height of the financial crisis in March 2009. The difference in total returns between the plan under the disclosure and the traditional plan is a staggering $479,000 (47.9%), which was furthermore achieved with an impressive reduction in investment volatility of over three quarters (i.e., 77% less volatility).

The reason the investment volatility of the plan under the disclosure was so low relative to the volatility of the traditional plan is that the peer securities served as a very good offset to the sponsor security, and because the bond fund was significantly less volatile than the five peer securities.

Having the participant's deferred compensation be largely sheltered from the real estate market crash, due to the short position in the peer securities in the plan under the disclosure, would have been especially important to the plan participant during the crisis and its aftermath. This is because the real estate sector was at the heart of the financial crisis, with many layoffs looming, and the executive's employment itself was at risk at that time.

The plan sponsor, Boston Properties Inc., was assured throughout the deferral period that its shareholders' interest are taken into consideration by the executive to the exact same extent in the plan under the disclosure as with a traditional plan. This is because the same number of BXP shares, 8,423, were awarded to the plan participant under both plans, and because the peer securities and the investment assets returns are beyond the control of the plan participant and therefore do not change her incentives to create value to Boston Properties Inc.'s shareholders.

The total returns of the security-based deferred compensation incentive plan under the disclosure would have been identical, except for potentially different set-up costs, if implemented as in the securities example ("system 100"), as in the phantom securities example ("system 200"), or as in the swap example ("system 300"), and this is because the established investment positions are identical under each example.

Similar results obtain for banking and financial services stocks during the same financial crisis in 2008-9, for technology stocks during the dot-com bust during 2001-2, for commodity trading companies' shares during the severe slowdown in that industry in 2013-15. In each of these example most, if not all, of the losses could have been avoided if a short investment positions in an appropriate quantities of peer securities would have been established and a diversified portfolio of investment assets chosen by the plan participant.

The invention is not however a panacea for higher returns on security-based deferred compensation incentive awards. In fact, a plan under the disclosure provides a lower return than a traditional plan if (and only if) the portfolio of investment assets provides a lower return than the portfolio of peer securities, which in many cases is just as likely to occur as a higher return. Albeit, under most circumstances the overall level of volatility can be significantly reduced without compromising the expected return, while in addition significantly alleviating the correlation risk to the participant's employment, and while optimally catering to the participant's risk tolerance and market outlook.

FIG. 15: Historical Simulation ("Boston Properties Inc. Example")

The top panel of FIG. 15 shows the cumulative investment returns of a plan under the disclosure and of a comparable traditional plan, as described in the historical simulation example above.

In the top panel of FIG. 15, label 1501 refers to the cumulative investment return (21.3%) for the 3-year deferral period of a plan under the disclosure, and below it in parenthesis is its realized standard deviation 1502 (14.9% annualized).

Label 1503 refers to the cumulative investment return (−33.0%) for the entire 3-year deferral period of the comparable traditional plan, and below it in parenthesis is its realized standard deviation 1504 (64.6% annualized).

Label 1505 refers to the five peer securities constituency and their respective β parameter estimates. Label 1506 refers to the quantitative criterion of the statistical procedure, the out-of-sample adjusted $R^2$ coefficient (88.1%).

The bottom panel of FIG. 15 shows the cumulative simple return of the components of the security-based deferred compensation incentive plan under the disclosure: the sponsor security, BXP, the peer securities, SPG, EQR, AVB, SLG, and FRT, and the investment asset, IEF. Notice how closely the cumulative return of the sponsor security, BXP, follows that of its peer securities, SPG, EQR, AVB, SLG, and FRT.

Label 1507 refers to the cumulative investment return (22.8%) for the 3-year deferral period of investment asset IEF, and below it in parenthesis is its realized standard deviation 1508 (8.8% annualized).

Label 1509 refers to the cumulative investment return (−14.9%) for the 3-year deferral period of the peer security that provided the best investment performance out of the five peer securities, and below it in parenthesis is its realized standard deviation 1510 (58.7% annualized).

Below, labels 1503 and 1504 refer again the cumulative investment return (−33.0%) and the realized standard deviation (64.6% annualized), respectively, of the sponsor security, BXP.

Label 1513 refers to the cumulative investment return (−61.0%) for the 3-year deferral period of the peer security that provided the worst investment performance out of the five peer securities, and below it in parenthesis is its realized standard deviation 1514 (−92.2% annualized).

Label 1515 refers to a legend including the sponsor security, BXP, the five peer securities, SPG, EQR, AVB, SLG, and FRT, and the investment asset, IEF.

The various examples described above are provided by way of illustration only and should not be construed to limit the scope of the disclosure. Various modifications and changes may be made to the principles described herein without following the examples and applications illustrated and described herein, and without departing from the spirit and scope of the disclosure. For example, a system or device used herein can be a mobile device communicating with a network-based server over the Internet and/or over a wireless communication system. At least part of the steps disclosed herein can also be performed or controlled by an application downloaded onto a mobile device of a user. Claim language reciting "at least one of" or "one of" a set indicates that one member of the set or multiple members of the set satisfy the claim.

What is claimed is:

1. A system for calibrating and managing a deferred compensation plan by a plan sponsor, wherein the plan includes, for each plan participant (i) sponsor securities, (ii)

peer securities, and (iii) investment assets, the system comprising a plan administration computer including a processor and a non-transitory computer-readable medium, the non-transitory computer-readable medium storing instructions which, when executed by the processor, causes the processor to perform operations comprising:

(a) maintaining account data for the plan participants;

(b) maintaining a periodically updated database of total return data;

(c) transmitting a first instruction to a financial transactions engine that causes the financial transactions engine to automatically contribute a predetermined amount of sponsor securities to an account of the plan participant to yield a contribution of sponsor securities, wherein the contribution of sponsor securities constitutes a long investment position and a security-based deferred compensation incentive award, and wherein the award has a fair market value;

(d) operating on the total return database and determining quantities of a plurality of peer securities in which to establish a short investment position to yield determined quantities of peer securities, wherein the peer securities are distinct from the sponsor securities, according to a statistical procedure that fits N parameters, $\beta_1, \ldots, \beta_N$, corresponding to N peer securities, over a sample of T time periods, to the following linear model:

$$R_t^{sponsor} = \beta_1 R_t^{peer,1} + \ldots + \beta_N R_t^{peer,N} + \varepsilon_t$$

wherein $R_t^{sponsor}$ is the total return, including dividends, interest, and other income, of a fixed amount invested in the sponsor security during period $t=1, \ldots, T$; wherein $R_t^{peer,n}$ is the period total return of peer security $n=1, \ldots, N$; and wherein $\varepsilon_t$ is a statistical error term; and wherein the quantity of each peer security in which a short investment position is to be established, $Q_n$, corresponds to:

$$Q_n = \left(\frac{\beta_n}{P_n}\right) * (Q^{sponsor} P^{sponsor})$$

rounded to nearest integer; where $Q^{sponsor}$ and $P^{sponsor}$ are the respective quantity and market price of the contributed sponsor securities, and where $\beta_n$ and $P_n$ are the respective estimated parameter and market price of peer security n at the time the short investment position is established;

(e) transmitting a second instruction to a securities borrowing and lending engine that causes the securities borrowing and lending engine to automatically borrow the determined quantities of peer securities from a securities lender to yield borrowed peer securities, wherein the plan participant's account assumes the loan liability resulting from the borrowed peer securities;

(f) transmitting a third instruction to a securities trading engine that causes the securities trading engine to automatically short-sell the borrowed peer securities in the securities market on behalf of the plan participant to yield short-sold peer securities, and that causes the securities trading engine to receive cash proceeds from the short-selling; and (g) transmitting a fourth instruction to the securities trading engine that causes the securities trading engine to automatically purchase an amount of investment assets that were previously selected by the plan participant for the account of the plan participant, such that no further capital contributions to the account of the plan participant are required such that the fair market value of the incentive award remains the same;

(h) periodically rerunning the statistical procedure to yield recalibrated quantities of peer securities in which a short investment position is to be maintained;

(i) when the recalibrated quantities are larger than the existing quantities of peer securities, transmitting a fifth instruction to the securities borrowing and lending engine that causes the securities borrowing and lending engine to borrow additional peer securities from the securities lender to yield additionally borrowed peer securities;

(j) transmitting a sixth instruction to the securities trading engine that causes the securities trading engine to short-sell the additionally borrowed peer securities on the securities market, wherein additional cash proceeds are received from the short-sale, such that the balances of short-sold peer securities is equalled to the recalibrated quantities of peer securities; and (k) transmitting a seventh instruction to the securities trading engine that causes the securities trading engine to purchase additional investment assets, which were previously selected by the plan participant.

2. The system of claim 1 wherein each time a contribution of a predetermined amount of sponsor securities to an account of the plan participant occurs, a corresponding determination of quantities of a plurality of peer securities in which to establish a short investment position, a corresponding borrowing and short-selling of the determined quantities of peer securities, and a corresponding purchasing of investment assets that were previously selected by the plan participant automatically occurs with respect to the account of the plan participant.

3. The system of claim 1 wherein the automatic purchasing of investment assets is made with the cash proceeds received from the short-selling.

4. The system of claim 1 wherein the investment assets are comprised of at least some cash.

5. The system of claim 1 wherein the peer securities are shares of at least one exchange-traded fund.

6. The system of claim 1 wherein the peer securities are securities of a plurality of competitors of the plan sponsor.

7. The system of claim 1 wherein the peer securities are securities in the same (i) industry, (ii) domicile, or (iii) asset class as the sponsor security.

8. The system of claim 1 wherein the statistical procedure to fit N parameters is a constrained statistical procedure to fit N non-negative parameters.

9. The system of claim 1 wherein the peer securities to be borrowed and sold-short are determined according to a variable selection algorithm based on a quantitative criterion of the statistical procedure.

10. The system of claim 1 wherein the statistical procedure used to determine the quantities of peer securities to be borrowed and sold-short is chosen according to a methodology selection algorithm based on a quantitative criterion of the statistical procedure.

11. The system of claim 1 wherein the account of the plan participant is an internal recordkeeping account of a commingled deferred compensation trust comprised of the assets and liabilities of a plurality of plan participants.

12. The system of claim 1 wherein the non-transitory computer-readable medium stores further instruction which, when executed by the processor, cause the processor to perform operations comprising:

(l) transmitting an eighth instruction to the securities borrowing and lending engine that causes the securities borrowing and lending engine to automatically pledge an amount of the investment assets and sponsor securities in a collateral pledge to the securities lender.

13. The system of claim 1 wherein the non-transitory computer-readable medium stores further instructions which, when executed by the processor, cause the processor to perform operations comprising:
(l) transmitting an eighth instruction to a secured loan administration engine that causes the secured loan administration engine to pledge an amount of investment assets and sponsor securities as collateral to a collateral lender who, in turn, provides a loan of securities-lender-eligible collateral to yield loaned securities-lender-eligible collateral; and
(m) transmitting a ninth instruction to the securities borrowing and lending engine that causes the securities borrowing and lending engine to pledge the loaned securities-lender-eligible collateral in a collateral pledge to the securities lender.

14. The system of claim 1, wherein the non-transitory computer-readable medium stores further instructions which, when executed by the processor and operates on the total return database, cause the processor to periodically rerun the statistical procedure to yield recalibrated quantities of peer securities, in which a short investment position is to be maintained, and in case the recalibrated quantities are smaller than the existing quantities of peer securities, to perform operations comprising:
(l) transmitting an eighth instruction to the securities trading engine that causes the securities trading engine to sell at least some of the purchased investment assets, wherein cash proceeds are received from the sale;
(m) transmitting a ninth instruction to the securities trading engine that causes the securities trading engine to buy-back at least some of the short-sold peer securities on the securities market to yield bought-back peer securities,
such that the balances of short-sold peer securities is equalled to the recalibrated quantities of peer securities; and
(n) transmitting a tenth instruction to the securities borrowing and lending engine that causes the securities borrowing and lending engine to return the bought-back peer securities to the securities lender.

15. A system for calibrating and managing a deferred compensation plan by a plan sponsor, wherein the plan includes, for each plan participant (i) phantom sponsor securities, (ii) phantom peer securities, and (iii) phantom investment assets, in reference to (i) sponsor securities, (ii) peer securities, and (iii) investment assets, respectively, the system comprising a plan administration computer including a processor and a non-transitory computer-readable medium, the non-transitory computer-readable medium storing instructions which, when executed by the processor, cause the processor to perform operations comprising:
(a) maintaining phantom account data for the plan participants;
(b) maintaining a periodically updated database of total return data;
(c) transmitting a first instruction to a financial transactions engine that causes the financial transactions engine to automatically enter a bookkeeping debit entry of a predetermined amount of phantom sponsor securities to a phantom account of the plan participant to yield debit-entered phantom sponsor securities, wherein the bookkeeping debit-entry of phantom sponsor securities constitutes a long investment position and a security-based deferred compensation incentive award, and wherein the award has a fair market value;
(d) operating on the total return database to determine quantities of a plurality of peer securities in which to establish a short investment position, to yield determined quantities of phantom peer securities, wherein the peer securities are distinct from the sponsor securities, according to a statistical procedure that fits N parameters, $\beta_1, \ldots, \beta_N$, corresponding to N peer securities, over a sample of T time periods, to the following linear model:

$$R_t^{sponsor} = \beta_1 R_t^{peer,1} + \ldots + \beta_N R_t^{peer,N} + \varepsilon_t$$

wherein $R_t^{sponsor}$ is the total return, including dividends, interest, and other income, of a fixed amount invested in the sponsor security during period $t=1, \ldots, T$; wherein $R_t^{peer,n}$ is the period total return of peer security $n=1, \ldots, N$; and wherein $\varepsilon_t$ is a statistical error term; and wherein the quantity of each phantom peer security to be entered as a bookkeeping credit entry, $Q_n$, corresponds to:

$$Q_n = \left(\frac{\beta_n}{P_n}\right) * (Q^{sponsor} P^{sponsor})$$

where $Q^{sponsor}$ and $P^{sponsor}$ are the respective quantity and price of the debit-entered Le phantom sponsor securities, and where $\beta_n$ and $P_n$ are the respective estimated parameter and price of phantom peer security n at the time the short investment position is established; and (e) transmitting a second instruction to the financial transactions engine that causes the financial transactions engine to automatically enter a bookkeeping credit entry of the determined quantities of phantom peer securities to the phantom account of the plan participant, thereby establishing a short investment position in the plurality of peer securities, and to yield credit-entered phantom peer securities; and
(f) transmitting a third instruction to the financial transactions engine that causes the financial transactions engine to automatically enter a bookkeeping debit entry of an amount of phantom investment assets that were previously selected by the plan participant to the phantom account of the plan participant, such that the fair market value of the incentive award remains the same;
(g) periodically rerunning the statistical procedure to yield recalibrated quantities of phantom peer securities to be maintained as a bookkeeping credit entry in the phantom account of the plan participant;
(h) transmitting a fourth instruction to the financial transactions engine that causes the financial transactions engine to enter a bookkeeping credit or debit entry, respectively, of phantom peer securities to the phantom account of the plan participant, such that the balances of credit-entered phantom peer securities is equalled to the recalibrated quantities of phantom peer securities; and
(i) transmitting a fifth instruction to the financial transactions engine that causes the financial transactions engine to enter a bookkeeping debit or credit entry, respectively, of phantom investment assets, which were previously selected by the plan participant, to the phantom account of the plan participant.

16. The system of claim 15 wherein each time a bookkeeping debit entry is made for a predetermined amount of phantom sponsor securities to a phantom account of the plan participant, a corresponding determination of quantities of phantom peer securities, a corresponding bookkeeping credit entry of the determined quantities of phantom peer securities, and a corresponding bookkeeping debit entry of an amount of phantom investment assets that were previously selected by the plan participant automatically occurs with respect to the phantom account of the plan participant.

17. The system of claim 15 wherein the phantom investment assets are comprised of at least some phantom cash.

18. The system of claim 15 wherein the phantom peer securities are phantom shares of at least one exchange-traded fund.

19. The system of claim 15 wherein the phantom peer securities are phantom securities referencing securities of a plurality of competitors of the plan sponsor.

20. The system of claim 15 wherein the phantom peer securities are phantom securities referencing peer securities in the same (i) industry, (ii) domicile, or (iii) asset class as the sponsor securities.

21. The system of claim 15 wherein the statistical procedure to fit N parameters is a constrained statistical procedure to fit N non-negative parameters.

22. The system of claim 15 wherein the peer securities in which to establish a short investment position via phantom peer security bookkeeping credit entry are determined according to a variable selection algorithm based on a quantitative criterion of the statistical procedure.

23. The system of claim 15 wherein the statistical procedure used to determine the quantities of credit-entered phantom peer securities is chosen according to a methodology selection algorithm based on a quantitative criterion of the statistical procedure.

24. A system for calibrating and managing a deferred compensation plan by a plan sponsor, wherein the plan includes, for each plan participant (i) sponsor securities, (ii) a total return swap in reference to peer securities, and (iii) a total return swap in reference to investment assets, the system comprising a plan administration computer including a processor and a non-transitory computer-readable medium, the non-transitory computer-readable medium storing instructions which, when executed by the processor, cause the processor to perform operations comprising:

(a) maintaining account data for the plan participants;

(b) maintaining a periodically updated database of total return data;

(c) transmitting a first instruction to a financial transactions engine that causes the financial transactions engine to automatically contribute a predetermined amount of sponsor securities to an account of the plan participant to yield a contribution of sponsor securities, wherein the contribution of sponsor securities constitutes a long investment position and a security-based deferred compensation incentive award, wherein the award has a fair market value;

(d) operating on the total return database to determine quantities of a plurality of peer securities in which to establish a short investment position to yield determined quantities of peer securities, wherein the peer securities are distinct from the sponsor securities, according to a statistical procedure that fits N parameters, $\beta_1, \ldots, \beta_N$, corresponding to N peer securities, over a sample of T time periods, to the following linear model:

$$R_t^{sponsor} = \beta_1 R_t^{peer,1} + \ldots + \beta_N R_t^{peer,N} + \varepsilon_t$$

wherein $R_t^{sponsor}$ is the total return, including dividends, interest, and other income, of a fixed amount invested in the sponsor security during period $t=1, \ldots, T$; wherein $R_t^{peer,n}$ is the period total return of peer security $n=1, \ldots, N$; and wherein $\varepsilon_t$ is a statistical error term; and wherein the quantity of each peer security in which a short investment position is to be established, $Q_n$, corresponds to:

$$Q_n = \left(\frac{\beta_n}{P_n}\right) * (Q^{sponsor} P^{sponsor})$$

where $Q^{sponsor}$ and $P^{sponsor}$ are the respective quantity and market price of the contributed sponsor securities, and where $\beta_n$ and $P_n$ are the respective estimated parameter and market price of peer security n at the time the short investment position is established;

(e) transmitting a second instruction to a swap administration engine that causes the swap administration engine to automatically contract on behalf of the plan participant for a total return swap agreement with a swap dealer for a short investment position in the determined quantities of peer securities;

(f) transmitting a third instruction to the swap administration engine that causes the swap administration engine to automatically contract on behalf of the plan participant for a total return swap agreement with a swap dealer for a long investment position in an amount of investment assets that were previously selected by the plan participant, such that no further capital contributions to the account of the plan participant are required such that the fair market value of the incentive award remains the same;

(g) periodically rerunning the statistical procedure to yield recalibrated quantities of peer securities, in which a short investment position is to be maintained;

(h) transmitting a fourth instruction to the swap administration engine that causes the swap administration engine to contract for a total return swap agreement, or novate the existing total return swap agreement, with respect to the account of the plan participant, such that the balances of peer securities in which a short investment position is maintained is equalled to the recalibrated quantities of peer securities; and (i) transmitting a fifth instruction to the swap administration engine that causes the swap administration engine to contract for a total return swap agreement, or novate the existing total return swap agreement, with respect to the account of the plan participant, for a long investment position in an amount of investment assets, which were previously selected by the plan participant.

25. The system of claim 24 wherein each time a contribution of a predetermined amount of sponsor securities to an account of the plan participant occurs, a corresponding determination of quantities of a plurality of peer securities in which to establish a short investment position, a corresponding contracting for a total return swap agreement, or a novation of the existing total return swap agreement, for a short investment position in the determined quantities of peer securities, and a corresponding contracting for a total return swap agreement, or novation of the existing total return swap agreement, for a long investment position in an amount of investment assets automatically occurs with respect to the account of the plan participant.

26. The system of claim 24 wherein the investment assets referenced by the total return swap are comprised of at least some cash.

27. The system of claim 24 wherein the peer securities referenced by the total return swap agreement are shares of at least one exchange-traded fund.

28. The system of claim 24 wherein the peer securities referenced by the total return swap agreement are securities of a plurality of competitors of the plan sponsor.

29. The system of claim 24 wherein the peer securities referenced by the total return swap agreement are securities in the same (i) industry, (ii) domicile, or (iii) asset class as the sponsor security.

30. The system of claim 24 wherein the statistical procedure to fit N parameters is a constrained statistical procedure to fit N non-negative parameters.

31. The system of claim 24 wherein the peer securities in which to establish a short investment position are determined according to a variable selection algorithm based on a quantitative criterion of the statistical procedure.

32. The system of claim 26 wherein the statistical procedure used to determine the quantities of peer securities in which to establish a short investment position is chosen according to a methodology selection algorithm based on a quantitative criterion of the statistical procedure.

33. The system of claim 24 wherein the account of the plan participant is an internal recordkeeping account of a commingled deferred compensation trust comprised of the assets and liabilities of a plurality of plan participants.

34. The system of claim 24 wherein the non-transitory computer-readable medium stores further instructions which, when executed by the processor, cause the processor to perform operations comprising:
   (j) transmitting a sixth instruction to the swap administration engine that causes the swap administration engine to automatically pledge an amount of the sponsor securities as collateral to the swap dealer.

35. The system of claim 24 wherein the non-transitory computer-readable medium stores further instruction which, when executed by the processor, cause the processor to perform operations comprising:
   (j) transmitting a sixth instruction to a secured loan administration engine that causes the secured loan administration engine to pledge an amount of sponsor securities as collateral to a collateral lender who, in turn, provides a loan of swap-dealer-eligible collateral to yield loaned swap-dealer-eligible collateral; and
   (k) transmitting a seventh instruction to the swap administration engine that causes the swap administration engine to pledge the loaned swap-dealer-eligible collateral to the swap dealer.

* * * * *